(12) United States Patent
Kim et al.

(10) Patent No.: US 12,381,918 B2
(45) Date of Patent: Aug. 5, 2025

(54) COMMUNICATION RELATED TO CHANGE OF APPLICATION SERVER

(71) Applicant: LG Electronics Inc., Seoul (KR)

(72) Inventors: Hyunsook Kim, Seoul (KR); Laeyoung Kim, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 471 days.

(21) Appl. No.: 17/631,327

(22) PCT Filed: Apr. 16, 2020

(86) PCT No.: PCT/KR2020/005089
§ 371 (c)(1),
(2) Date: Jan. 28, 2022

(87) PCT Pub. No.: WO2021/029512
PCT Pub. Date: Feb. 18, 2021

(65) Prior Publication Data
US 2022/0360977 A1      Nov. 10, 2022

(30) Foreign Application Priority Data

| Aug. 9, 2019 | (KR) | ......................... 10-2019-0097579 |
| Sep. 20, 2019 | (KR) | ......................... 10-2019-0116154 |
| Jan. 7, 2020 | (KR) | ......................... 10-2020-0002066 |

(51) Int. Cl.
| H04L 65/1063 | (2022.01) |
| H04W 8/08 | (2009.01) |
| H04W 8/26 | (2009.01) |
| H04W 68/00 | (2009.01) |

(52) U.S. Cl.
CPC .......... H04L 65/1063 (2013.01); H04W 8/08 (2013.01); H04W 8/26 (2013.01); H04W 68/00 (2013.01)

(58) Field of Classification Search
CPC .......... H04W 8/26; H04W 8/08; H04W 68/00
See application file for complete search history.

(56) References Cited

U.S. PATENT DOCUMENTS

| 10,419,980 B2* | 9/2019 | Lee ...................... H04L 12/4633 |
| 10,462,840 B2* | 10/2019 | Dao ....................... H04L 67/143 |
| 2017/0156048 A1* | 6/2017 | Zeng ................... H04L 65/1043 |
| 2018/0192390 A1* | 7/2018 | Li ......................... H04W 72/53 |
| 2018/0270778 A1 | 9/2018 | Bharatia |
| 2019/0059067 A1 | 2/2019 | Lee et al. |

(Continued)

FOREIGN PATENT DOCUMENTS

| KR | 20190044661 | 4/2019 |
| WO | WO2019042912 | 3/2019 |
| WO | WO2019101292 | 5/2019 |

*Primary Examiner* — Huy D Vu
*Assistant Examiner* — Robert Ma
(74) *Attorney, Agent, or Firm* — Fish & Richardson P.C.

(57) ABSTRACT

One disclosure of the present specification provides a communication method related to a change of an application server performed by an SMF node. The method may comprise: a step for transmitting a notification message related to a change of a user plane path to an AF node; a step for receiving a response message from the AF node in response to the notification message; and a step for transmitting a message including information on an IP address of the changed application server to a terminal through an AMF node.

15 Claims, 35 Drawing Sheets

(56) References Cited

U.S. PATENT DOCUMENTS

| | | | |
|---|---|---|---|
| 2019/0110238 A1* | 4/2019 | Buckley | H04W 8/06 |
| 2021/0029628 A1* | 1/2021 | Kim | H04W 48/18 |
| 2021/0243826 A1* | 8/2021 | Hoffmann | H04W 76/14 |
| 2022/0053056 A1* | 2/2022 | Won | H04W 76/32 |

* cited by examiner

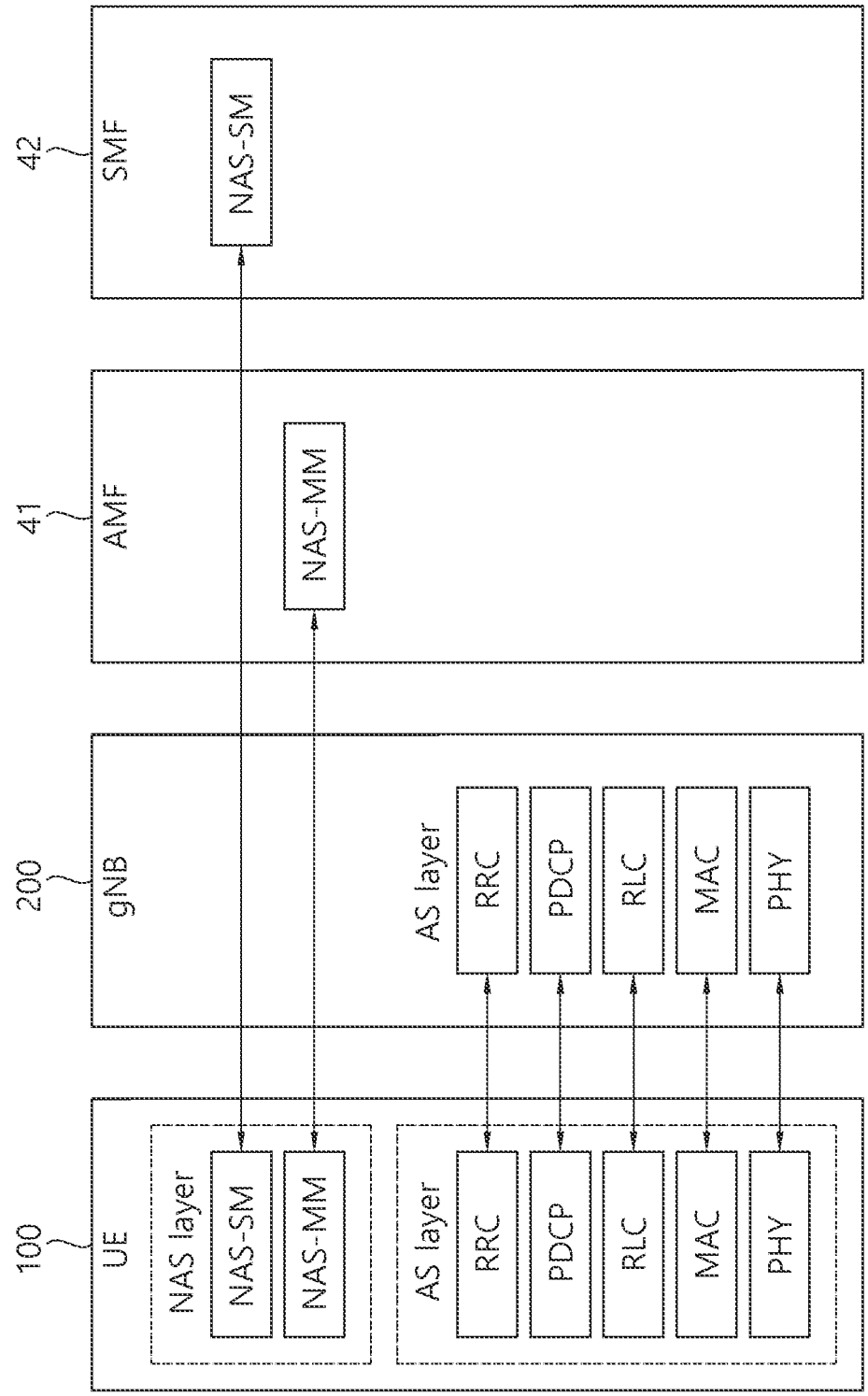

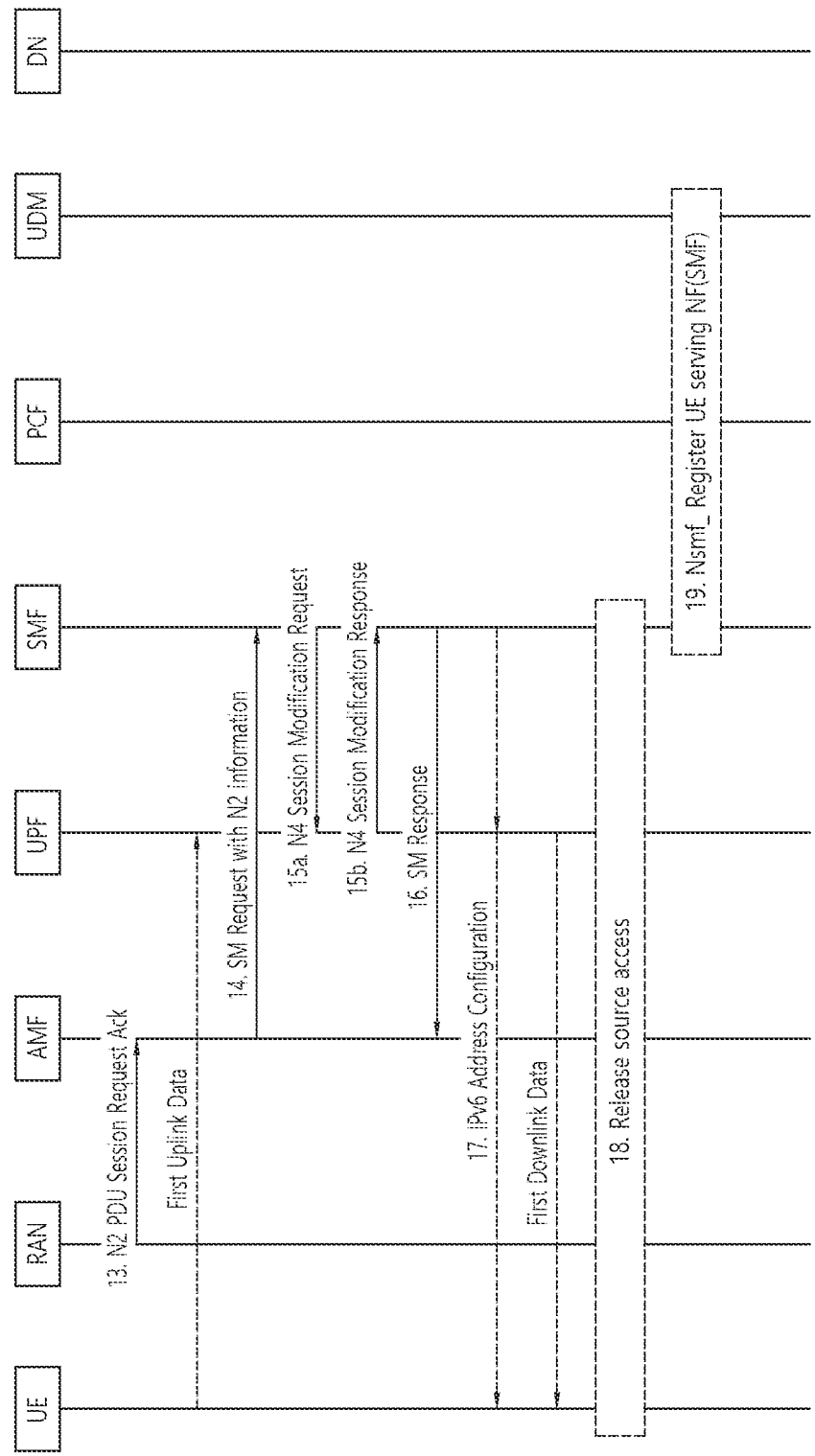

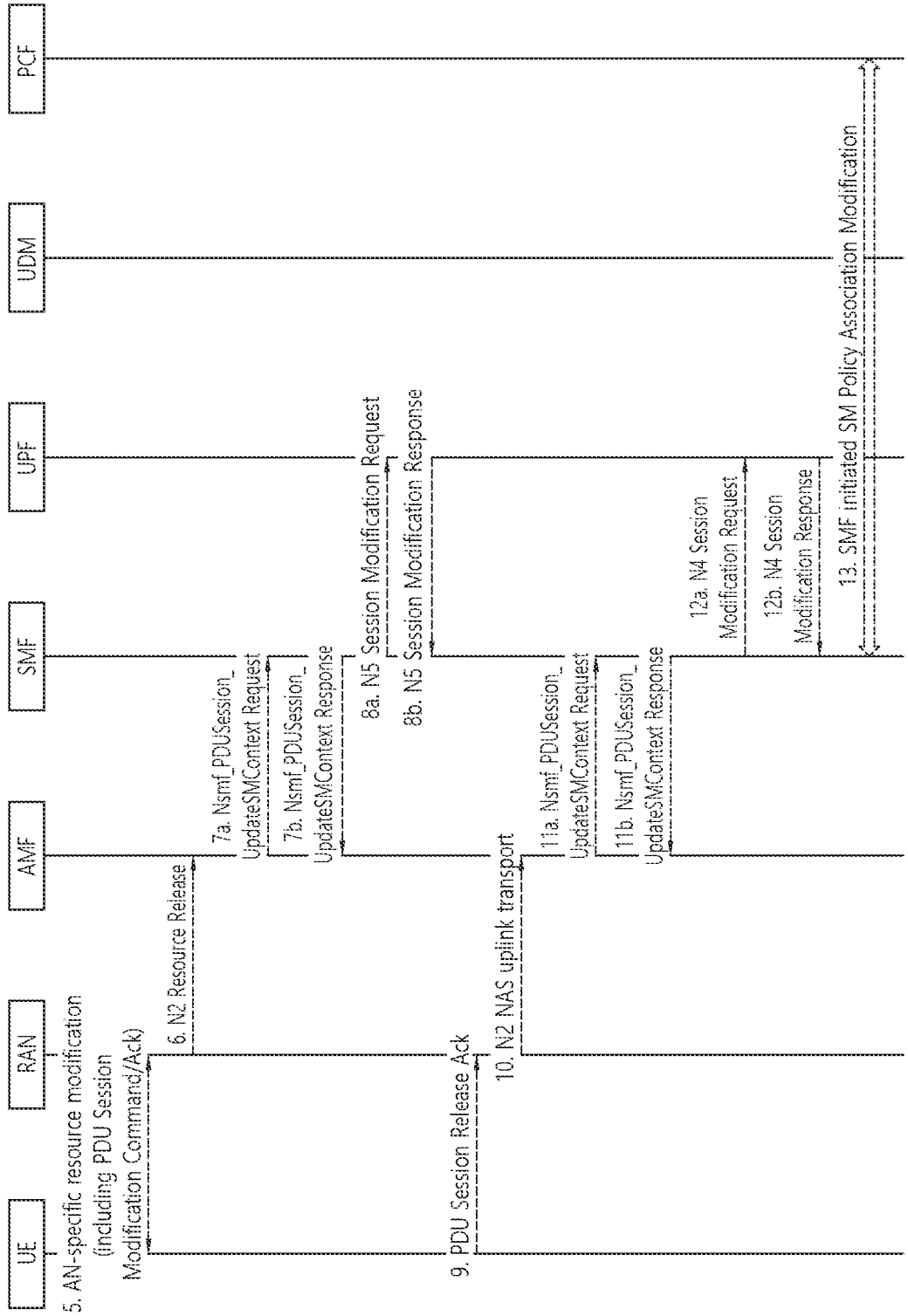

COMMUNICATION RELATED TO CHANGE OF APPLICATION SERVER

CROSS-REFERENCE TO RELATED APPLICATIONS

This application is a National Stage application under 35 U.S.C. § 371 of International Application No. PCT/KR2020/005089, filed on Apr. 16, 2020, which claims the benefit of Korean Patent Application No. 10-2019-0097579, filed on Aug. 9, 2019, Korean Patent Application No. 10-2019-0116154, filed on Sep. 20, 2019, and Korean Patent Application No. 10-2020-0002066, filed on Jan. 7, 2020. The disclosures of the prior applications are incorporated by reference in their entirety.

TECHNICAL FIELD

The present disclosure generally relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

Introduction of edge computing technology to mobile communication systems is being discussed. As various 5G services based on edge computing technology are provided, there is a possibility that communication between a terminal and an application server in a specific area is required more often.

For example, as the terminal moves, there may be more cases where communication between the terminal and an application server in a specific area (eg, the area to which the terminal has moved) is required. When the terminal is provided with a service while moving its location, the terminal needs to communicate with the most appropriate application server among one or more application servers located in each region. For this reason, there may be a case where it is necessary to change the application server that communicates with the terminal.

However, conventionally, a communication method related to the change of the application server has not been clearly defined. For example, the terminal did not recognize the change of the application server, and did not recognize the information about the changed application server. As another example, the network fails to notify the terminal of the change of the application server, and fails to notify the changed information on the application server.

SUMMARY

Accordingly, a disclosure of the present specification has been made in an effort to solve the aforementioned problem.

In order to solve the above-mentioned problems, one disclosure of the present specification provides a communication method related to the change of the application server performed by the SMF node. The method includes: transmitting a notification message related to the change of the user plane path to the AF; receiving a response message from the AF in response to the notification message; and transmitting a message including information on the IP address of the changed application server to the terminal through the AMF node.

In order to solve the above problems, one disclosure of the present specification provides a communication method related to a change of an application server performed by a device. The method includes: receiving, by the NAS layer of the device, a message including information on the IP address of the changed application server from the AMF node; obtaining, by the NAS layer of the device, information on the IP address of the changed application server based on the message; and transmitting, by the NAS layer of the device, information on the IP address of the changed application server to the application layer of the device.

In order to solve the above problems, one disclosure of the present specification provides an SMF node that performs communication related to a change of an application server. The SMF node, at least one processor; and at least one memory for storing instructions and operably electrically connectable with the at least one processor, wherein the operation performed based on the instructions being executed by the at least one processor comprises: transmitting a notification message related to a change of a user plane path to AF; receiving a response message from the AF in response to the notification message; and transmitting a message including information on the IP address of the changed application server to the terminal through the AMF node.

In order to solve the above problems, one disclosure of the present specification provides a device for performing communication related to change of an application server. The device includes at least one processor; and at least one memory to store instructions and operably electrically connectable with the at least one processor, wherein the operations performed based on the instructions being executed by the at least one processor comprises: the apparatus receiving, by the NAS layer, a message including information on the IP address of the changed application server from the AMF node; obtaining, by the NAS layer of the device, information on the IP address of the changed application server based on the message; and transmitting, by the NAS layer of the device, information on the IP address of the changed application server to the application layer of the device.

In order to solve the above problems, one disclosure of the present specification provides a device in mobile communication. The device includes at least one processor; and at least one memory for storing instructions and operably electrically connectable with the at least one processor, the instructions including: obtaining, by the NAS layer of the device, a message including information about the IP address of the changed application server; obtaining, by the NAS layer of the device, information on the IP address of the changed application server based on the message; and transmitting, by the NAS layer of the device, information on the IP address of the changed application server to the application layer of the device.

In order to solve the above problems, one disclosure of the present specification provides a non-volatile computer-readable storage medium recording instructions. The instructions, when executed by the one or more processors, cause the one or more processors to: receive, from the AMF node, a message including information about the IP address of the changed application server; obtaining information on the IP address of the changed application server based on the message; and transmitting information on the IP address of the changed application server to the application layer.

Accordingly, a disclosure of the present specification has been made in an effort to solve the aforementioned problem.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 4 is another exemplary diagram showing a structure of a radio interface protocol between a UE and a gNB.

FIGS. 6a and 6b is a signal flowchart illustrating an exemplary PDU session establishment procedure.

FIGS. 7a and 7b are signal flow diagrams illustrating an exemplary PDU session modification procedure.

DESCRIPTION OF EXEMPLARY EMBODIMENTS

Figure 1:
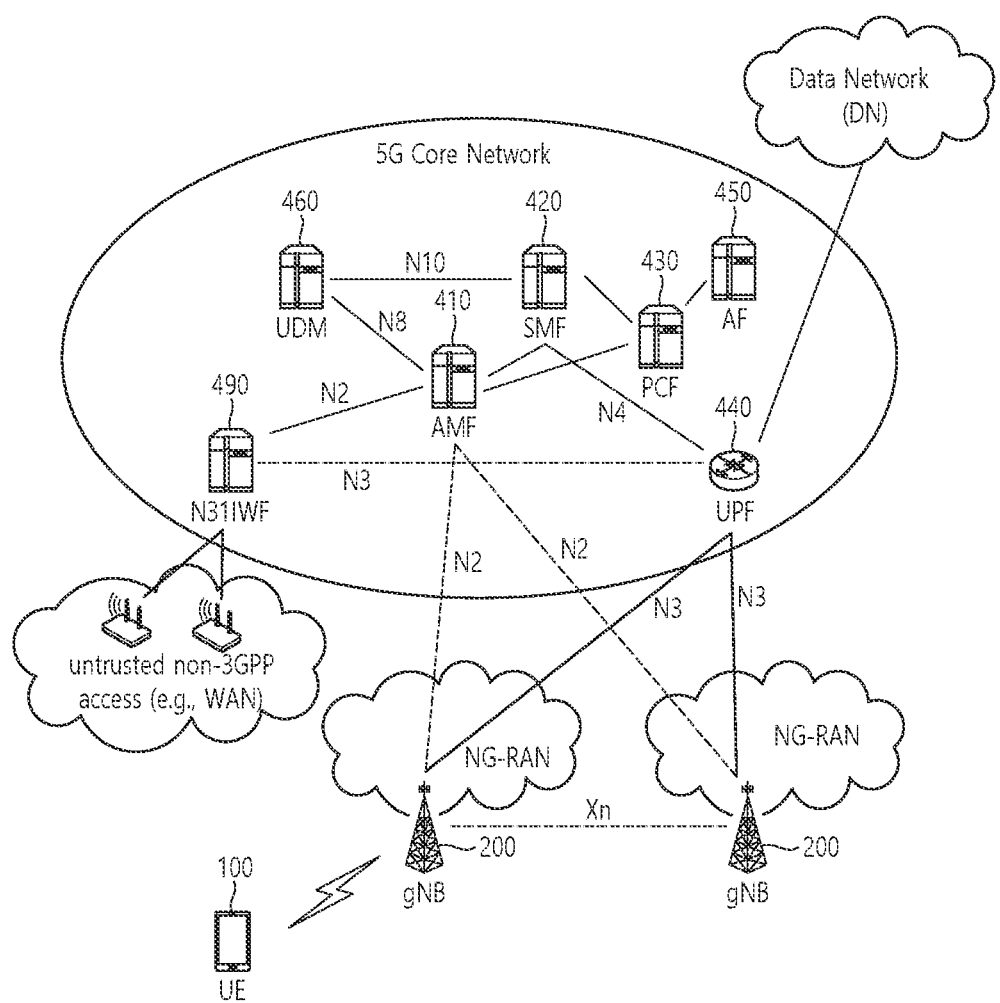
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF(Access and Mobility Management Function)may mean an AMF node, SMF(Session Management Function)may mean an SMF node, and UPF(User Plane Function)may mean a UPF node.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point) and gNB (Next generation NodeB).

I. Techniques and Procedures Applicable to the Disclosure of this Specification

<Next-Generation Mobile Communication Network>

Thanks to the success of LTE (long term evolution)/LTE-Advanced (LTE-A) for 4th generation mobile communication, interest in next-generation, that is, 5th generation (so-called 5G) mobile communication is increasing, and research is being conducted one after another.

5G mobile communication, defined by the International Telecommunication Union (ITU), refers to providing a data transmission rate of up to 20 Gbps and a perceived transmission speed of at least 100 Mbps anywhere. The official name is 'IMT-2020', and it aims to commercialize it worldwide in 2020.

The ITU proposes three usage scenarios, for example, enhanced Mobile BroadBand (eMBB), massive Machine Type Communication (mMTC) and Ultra Reliable and Low Latency Communications (URLLC).

URLLC relates to usage scenarios that require high reliability and low latency. For example, services such as autonomous driving, factory automation, and augmented reality require high reliability and low latency (eg, latency of 1 ms or less). Currently, the delay time of 4G (LTE) is statistically 21-43 ms (best 10%) and 33-75 ms (median). This is insufficient to support services requiring latency of 1 ms or less. Next, the eMBB usage scenario relates to a usage scenario requiring mobile ultra-wideband.

That is, the 5th generation mobile communication system aims at a higher capacity than the current 4G LTE, increases the density of mobile broadband users, and can support D2D (Device to Device), high stability, and MTC (Machine type communication). 5G R&D also aims to achieve lower latency and lower battery consumption than 4G mobile communication systems to better realize the Internet of Things. For such 5G mobile communication, a new radio access technology (New RAT or NR) may be proposed.

FIG. 1 is a Structural Diagram of a Next-Generation Mobile Communication Network.

5GC(5G Core) may include various components, part of which are shown in FIG. 1, including an access and mobility management function (AMF) 41, a session management function (SMF) 42, a policy control function (PCF) 43, a User Plane Function (UPF) 44, an application function (AF) 45, a unified data management (UDM) data network 46, and a non-3GPP interworking function (N3IWF) 49.

A UE 10 is connected to a data network via the UPF 44 through a Next Generation Radio Access Network (NG-RAN) including the gNB 20.

The UE 10 may be provided with a data service even through untrusted non-3GPP access, e.g., a wireless local area network (WLAN). In order to connect the non-3GPP access to a core network, the N3IWF 49 may be deployed.

The illustrated N3IWF 49 performs a function of managing interworking between the non-3GPP access and the 5G system. When the UE 10 is connected to non-3GPP access (e.g., WiFi referred to as IEEE 801.11), the UE 10 may be connected to the 5G system through the N3IWF 49. The N3IWF 49 performs control signaling with the AMF 41 and is connected to the UPF 44 through an N3 interface for data transmission.

The illustrated AMF 41 may manage access and mobility in the 5G system. The AMF 41 may perform a function of managing NAS security. The AMF 41 may perform a function of handling mobility in an idle state.

The illustrated UPF 44 is a type of gateway through which user data is transmitted/received. The UPF 44 may perform the entirety or a portion of a user plane function of a serving gateway (S-GW) and a packet data network gateway (P-GW) of 4G mobile communication.

The UPF 44 operates as a boundary point between a next generation radio access network (NG-RAN) and the core network and maintains a data path between the gNB 20 and the SMF 42. In addition, when the UE 10 moves over an area served by the gNB 20, the UPF 44 serves as a mobility anchor point. The UPF 44 may perform a function of handling a PDU. For mobility within the NG-RAN (which is defined after 3GPP Release-15), the UPF 44 may route packets. In addition, the UPF 54 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 43 is a node that controls an operator's policy.

The illustrated AF 45 is a server for providing various services to the UE 10.

The illustrated UDM 46 is a kind of server that manages subscriber information, such as home subscriber server (HSS) of 4G mobile communication. The UDM 46 stores and manages the subscriber information in a unified data repository (UDR).

The illustrated SMF 42 may perform a function of allocating an Internet protocol (IP) address of the UE. In addition, the SMF may control a protocol data unit (PDU) session.

For reference, hereinafter, reference numerals for AMF (41), SMF (42), PCF (43), UPF (44), AF (45), UDM (46), N3IWF (49), gNB (20), or UE (10) may be omitted.

The 5$^{th}$ generation mobile communcation supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band is defined as two types of frequency ranges (FR1, FR2). FR1 is 410 MHz-7125 MHz, and FR2 is 24250 MHz-52600 MHz, which may mean millimeter wave (mmW). For convenience of explanation, among the frequency ranges used in the NR system, FR1 may mean "sub 6 GHz range" and FR2 may mean "above 6 GHz range" and may be called millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
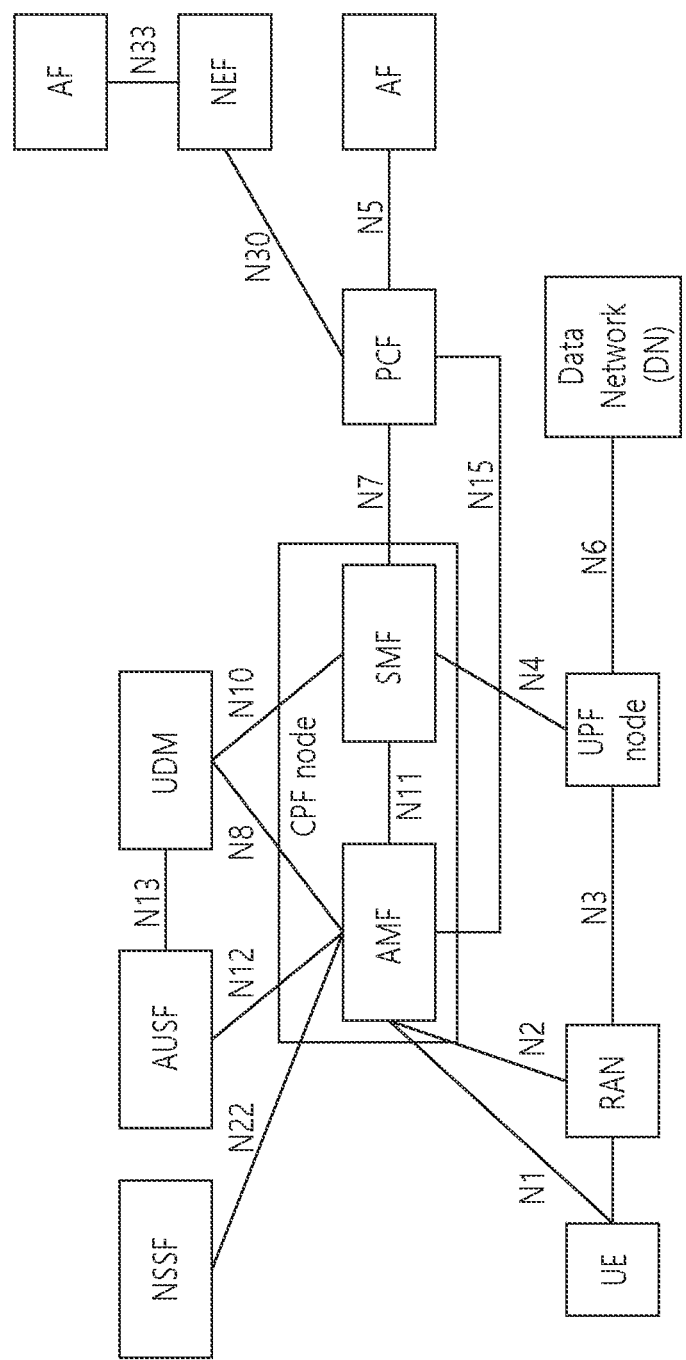
FIG. 2 is an exemplary diagram illustrating a predicted structure of a next generation mobile communication in terms of a node.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
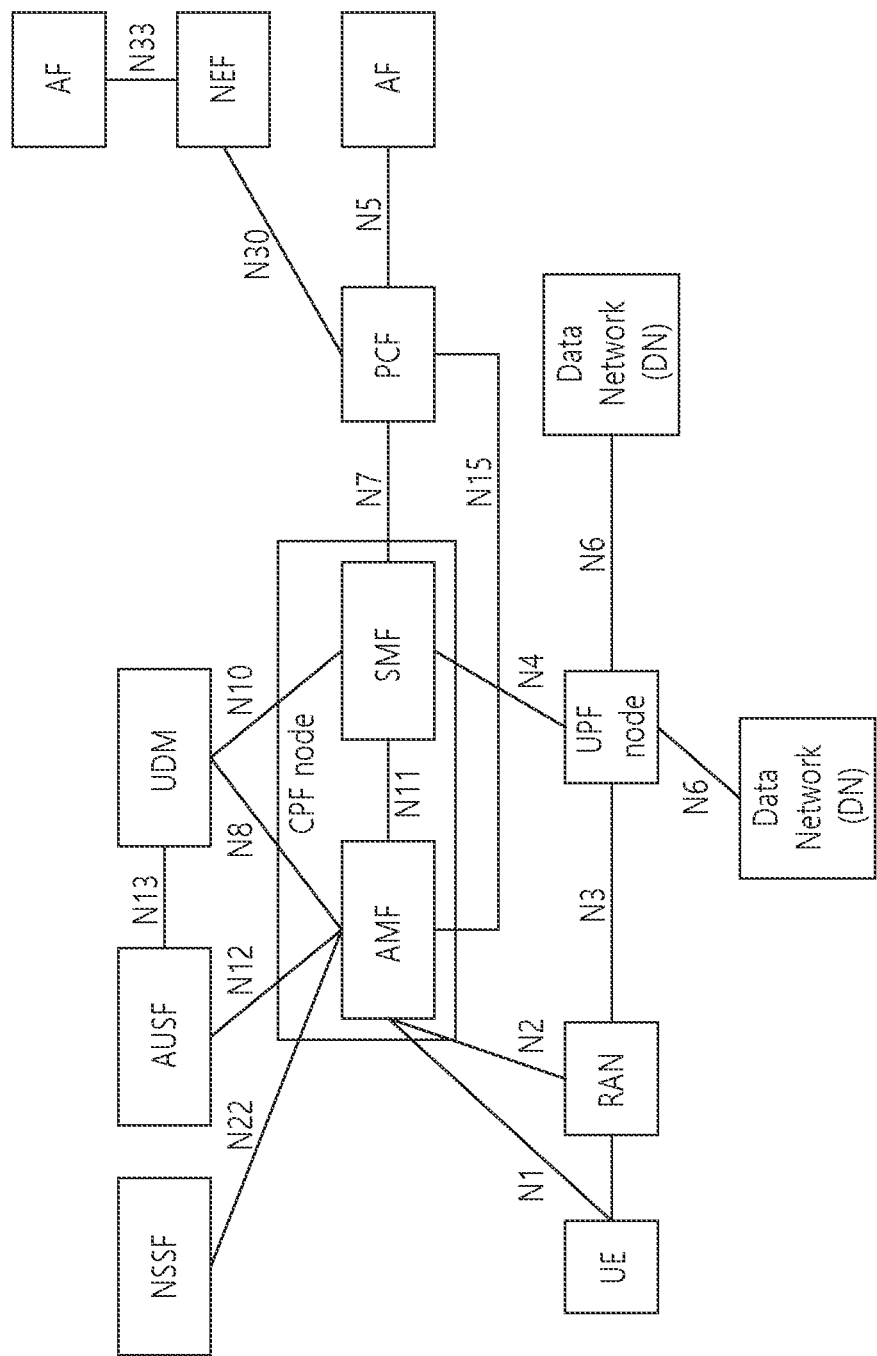
FIG. 3 is an exemplary diagram illustrating an architecture for supporting a concurrent access through two data networks.

In FIG. 3, the UE may simultaneously access two data networks using multiple PDU sessions.

FIG. 3 is an Exemplary Diagram Illustrating an Architecture for Supporting a Concurrent Access Through Two Data Networks.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

FIG. 4 is Another Exemplary Diagram Showing a Structure of a Radio Interface Protocol Between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
NAS procedures related to AMF include the following.
Registration management and access management procedures. AMF supports the following functions.
Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
The NAS entity for the MM creates a NAS-MM message that derives how and where to deliver an SM signaling message through a security header representing the NAS transmission of SM signaling and additional information on a received NAS-MM.
Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new tracking area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 5A:
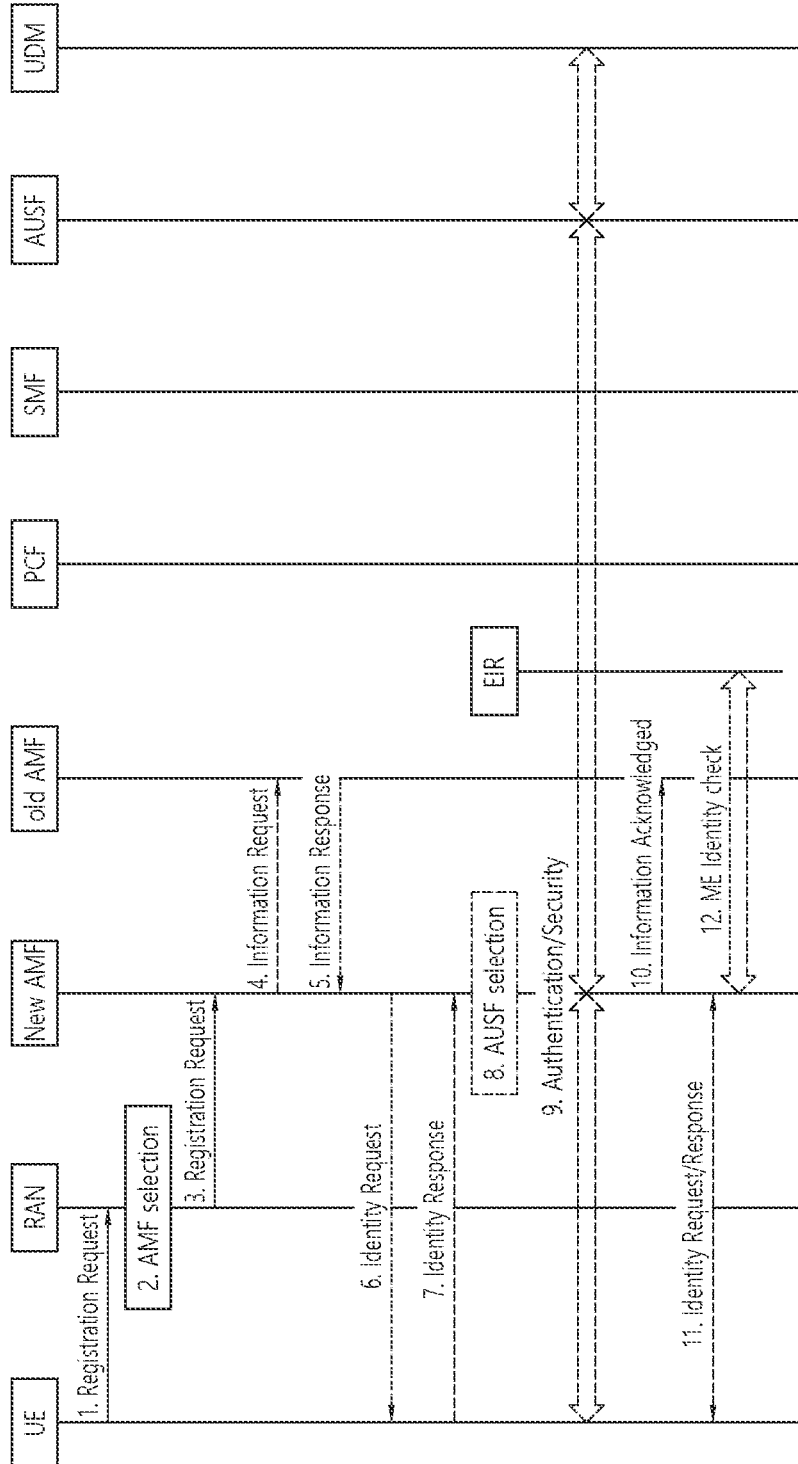
FIGS. 5a and 5b is a signal flow chart showing an exemplary registration procedure.
Figure 5B:
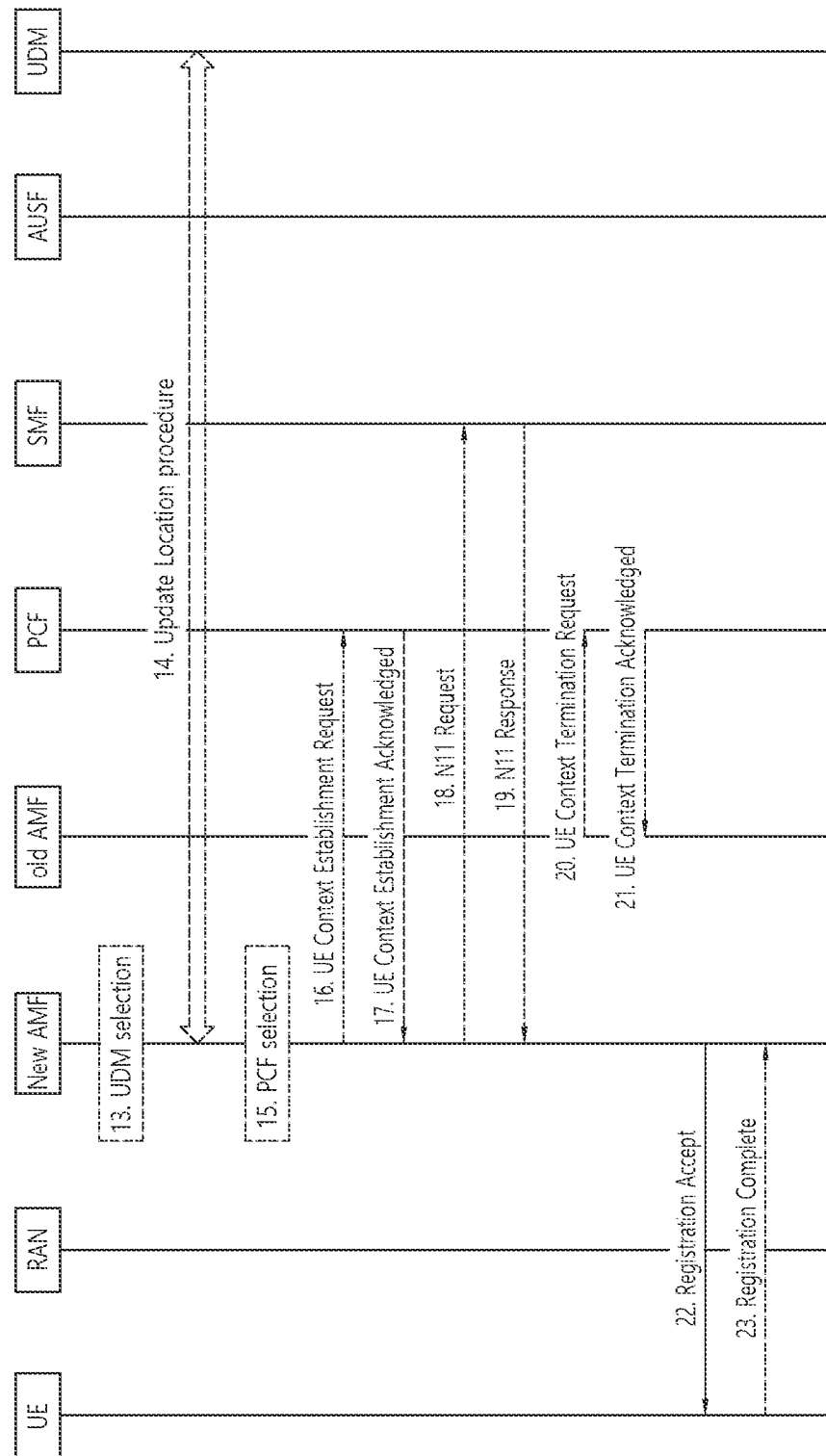

FIGS. 5a and 5b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.
16) The new AMF transmits a UE Context Establishment Request message to the PCF. The AMF may request an operator policy for the UE to the PCF.
17) The PCF transmits a UE Context Establishment Acknowledged message to the new AMF.
18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.
20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.
22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI of the allowed NSSAI to the S-NASSI of the NSSAI configured for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.
A PDU Session Establishment procedure initiated by the network. For this, the network may transmit a Device Trigger message to an application (or applications) of the UE.

Figure 6A:
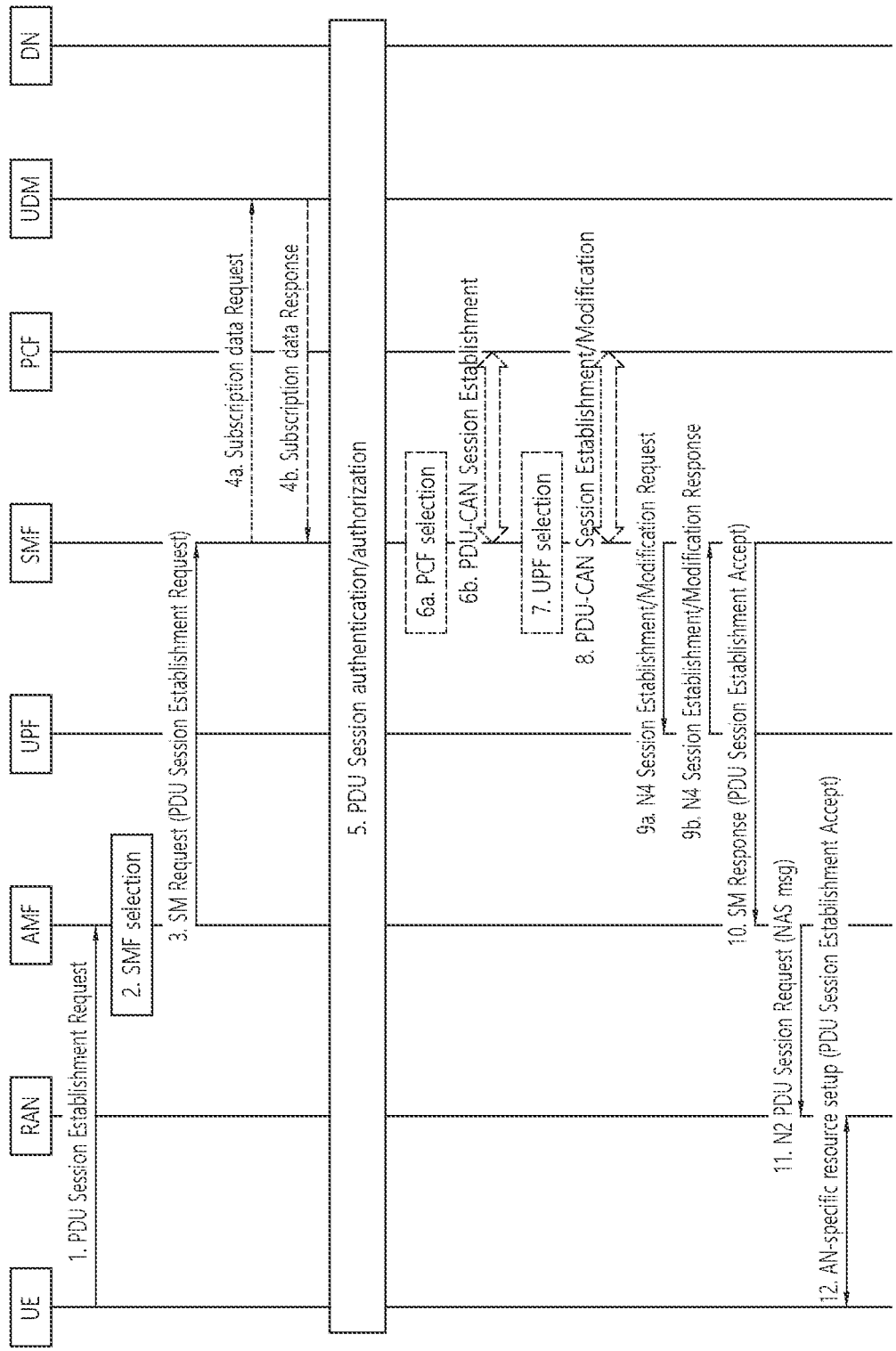

FIGS. 6a and 6b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 5a and 5b. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM Register UE serving NF service" including an SMF address and DNN. The UDM may store the ID, address, and DNN of the SMF.

During the procedure, if the PDU Session Establishment is not successful, the SMF notifies this to the AMF.

<PDU Session Modification Procedure>

Figure 7A:
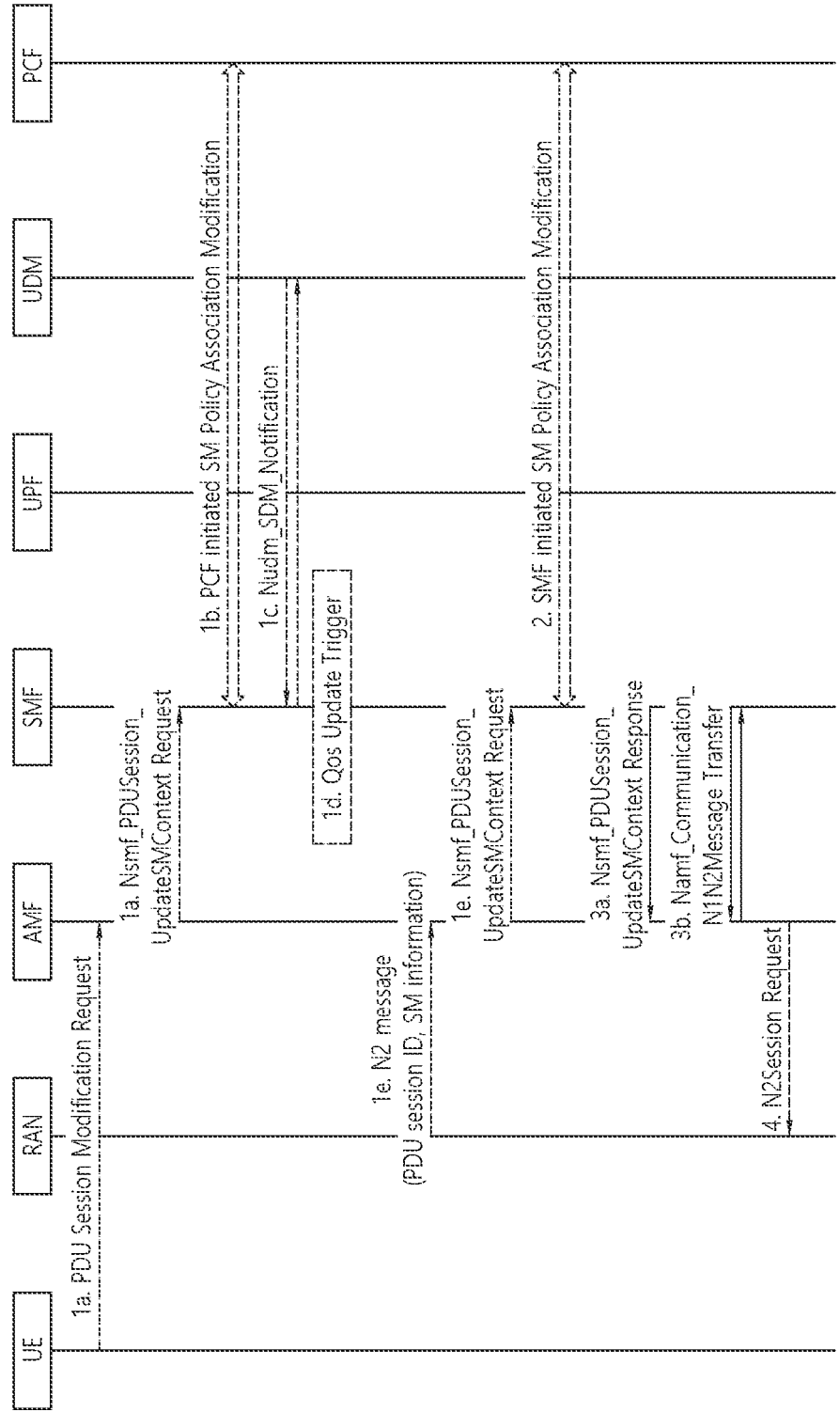

FIGS. 7a and 7b are Signal Flow Diagrams Illustrating an Exemplary PDU Session Modification Procedure.

The PDU session modification procedure may be used when one or more Quality of Service (QoS) parameters exchanged between the UE and the network are modified.

The signal flow diagram shown in FIGS. 7a and 7b is an example of a PDU session modification procedure, and specifically, a UE or network requested PDU Session Modification procedure (non-roaming case and roaming with local breakeout case) is shown as an example.

An example of a PDU session modification procedure may be triggered by the following exemplary events (steps 1a) to 1e)):

1a) (UE-initiated modification) The UE may initiate a PDU session modification procedure by sending a NAS message.

For example, the UE may send a PDU session modification request message. Here, the NAS message may include an N1 SM container, a PDU session ID, and a UE Integrity Protection Maximum Data Rate. N1 SM container may include PDU session modification request (PDU Session ID, Packet Filters, Operation, Requested QoS, Segregation, 5GSM Core Network Capability, Number of Packet Filters, if Always-on PDU Session is requested, Always-on PDU Session Requested).

Depending on the access type, if the UE was in the CM-IDLE state, a service request procedure may be preceded before this SM-NAS message is transmitted. (Depending on the Access Type, if the UE was in CM-IDLE state, this SM-NAS message is preceded by the Service Request procedure.) (R) AN is delivered to the AMF along with the indication of the user location information (User location Information).

The AMF may invoke the SM context associated with the PDU session update. For example, AMF may call Nsmf_PDUSession_UpdateSMContext. Nsmf_PDUSession_UpdateSMContext may include an SM context ID and an N1 SM container (including a PDU session modification request).

When the UE requests a specific QoS handling for the selected Service Data Flow (SDF), the PDU session establishment request may include a packet filter describing the SDF, the requested packet filter operation (add, modify or delete) for the indicated packet filter, and the requested QoS. The PDU session establishment request may optionally include a Segregation indication. When the UE requests the network to bind the applicable SDF to a distinct and dedicated QoS Flow (eg, even if an existing QoS flow can support the requested QoS), segregation indication may be included in the PDU session establishment request. The network must comply with the UE's request, but the network may bind the selected SDF for the existing QoS flow instead of the UE's request.

Note 1: Only one QoS flow can be used for traffic segregation. When the UE makes a subsequent request for segregation of the additional SDF, the additional SDF is multiplexed in the existing QoS flow used for segregation.

If the UE is outside the availability area of the LADN (Local Area Data Network), the UE does not trigger a PDU session modification procedure for the PDU session corresponding to the LADN.

For a PDU session established in EPS, when the UE first moves from EPS to 5GS, when the UE wants to change the PDU session to an always-on PDU session, the UE may include an indication that an Always-on PDU session is requested in the PDU session modification request message.

1b) (Modification requested by SMF) The PCF may perform a PCF initiated SM Policy Association Modification procedure to notify the SMF of the modification of the policy. The PCF-initiated SM policy association modification procedure may be triggered, for example, by a policy decision or may be triggered when an application function (AF) requests.

1c) (Modification requested by SMF) The UDM may use Subscriber Data Management (SDM) notifications to update the subscription data of the SMF. For example, the SDM notification may be Nudm_SDM Notification (including Subscription Permanent Identifier (SUPI) and Session Management Subscription Data). The SMF may acknowledge by updating the session management subscription data and returning SUPI and Ack.

1d) (Modification requested by SMF) The SMF may decide to modify the PDU session. Step 1d) may also be triggered from a locally configured policy or (R)AN. Step 1d) may also be triggered when the SMF marks that the UP (User Plane) connection is active and the status of one or more QoS flows has been deleted in 5GC but not synchronized with the UE.

When the SMF receives one of the triggers of steps 1b) to 1d), the SMF may initiate a PDU session modification procedure requested by the SMF.

1e) (AN-initiated modification) Regardless of whether a notification control is set or not, when an AN resource to which a QoS flow is mapped is released, (R)AN must indicate to the SMF. (R) AN may transmit an N2 message (including PDU session ID and N2 SM information) to the AMF. The N2 SM information may include a QoS flow ID (QFI), user location information, and an indication that a QoS flow has been released.

The AMF may call the SM context request associated with the update of the PDU session. For example, the AMF may invoke Nsmf_PDUSession_UpdateSMContext (including SM context ID and N2 SM information).

(AN Initiated Notification Control) When notification control is set for a GBR flow, if (R)AN determines that the QoS target of the QoS flow cannot be met or that the QoS target of the QoS flow can be met again, respectively, (R)AN may transmit an N2 message (including PDU session ID and N2 SM information) to the SMF. The N2 SM information may include an indication that the QoS target of the QFI and QoS flow cannot be met or an indication that the QoS target of the QoS flow may be met again, respectively. The AMF may call the SM context request associated with the update of the PDU session. For example, the AMF may invoke Nsmf_PDUSession_UpdateSMContext (including SM context ID and N2 SM information). When the PCF subscribed to the event, the SMF may report this event to the PCF for each PCC rule for which notification control is set (see step 2). Alternatively, if the dynamic PCC does not apply to this DNN and depends on a locally set policy, the SMF may initiate the PDU session modification procedure requested by the SMF as in the example of step 3b).

2) The SMF may report some subscribed events to the PCF by performing the SMF initiation SM policy association modification procedure. Step 2) may be omitted when the PDU session modification procedure is triggered by step 1b or 1d. If the dynamic PCC is not deployed (deployed), the SMF may apply a local policy to determine whether to change the QoS profile.

Steps 3) to 7) may not be invoked when only an operation (eg gating) in UPF is required for PDU session modification.

3a) For UE-initiated modification or AN-initiated modification, SMF may respond to AMF via PDU session update SM context. For example, the PDU session update SM context may be Nsmf_PDUSession_UpdateSMContext. Nsmf_PDUSession_UpdateSMContext may include N2 SM information (PDU session ID, QFI, QoS profile, session-Aggregate Maximum Bit Rate (AMBR)), and N1 SM container (including PDU Session Modification Command). PDU session modification command may include PDU session ID, QoS rule, QoS rule operation, QoS flow level QoS parameters if necessary for QoS related to QoS rule, Session-AMBR, Always-on PDU Session Requested if Always-on PDU Session is requested.

When PDU session modification has been requested by the UE, in order to modify the PDU session always-on PDU session, the SMF may include an Always-on PDU Session Granted indication in the PDU session modification command. The Always-on PDU session grant indication may be included to indicate whether the PDU session is changed to an Always-on PDU session or not.

The N2 SM information may carry information to be provided by the AMF to the (R)AN. To notify the (R)AN that one or more QoS flows have been added or modified, the N2 SM information may include a QoS profile and a corresponding QFI. The N2 SM information may include only the QFI to notify the (R)AN that one or more QoS flows have been removed. If the PDU session modification is triggered by the (R)AN release of step 1e), the SM information may carry the acknowledgment of the (R)AN release. When the UE requests a PDU session modification for a PDU session without an established user plane resource, the N2 SM information provided to (R)AN may include information for establishing a user plane resource.

The N1 SM container carries the PDU session modification command that the AMF should provide to the UE. In order to notify the UE that one or more QoS rules have been added, removed, or modified, the N1 SM container may include QoS rules, QoS rules and QoS related QoS rules operations, if necessary, QoS flow level QoS parameters and QoS flow level QoS parameter operation.

3b) For the modification requested by the SMF, the SMF may invoke Namf_Communication_N1N2MessageTransfer. Namf_Communication_N1N2MessageTransfer may include N2 SM information (PDU session ID, QFI(s), QoS Profile(s), session-AMBR), and N1 SM container (including PDU session modification command). The PDU session modification command may include PDU session ID, QoS rules, QoS rules and QoS flow-level QoS parameters if necessary for QoS related to QoS rules operation and QoS rules, session-AMBR.

When the UE is in the CM-IDLE state and Asynchronous Type Communication (ATC) is activated, the AMF may update and store the UE context based on Namf_Communication_N1N2MessageTransfer, and steps 4) to 7) may be omitted. For reference, when the ATC mode is activated, paging is not performed for the UE in the IDLE state. When the UE is reachable (eg, when the UE enters the CM-CONNECTED state), the AMF may forward an N1 message to synchronize the UE and the UE context.

4) AMF may transmit an N2 PDU session request message to (R)AN. The N2 PDU session request may include N2 SM information received from the SMF, a NAS message (including a PDU session ID, and an N1 SM container (including a PDU session modification command)).

5) (R)AN may issue an AN specific signaling exchange with the UE related to information received from the SMF. For example, in the case of NG-RAN, RRC Connection Reconfiguration may occur when the UE modifies necessary (R)AN resources related to the PDU session.

(R)AN may acknowledge the N2 PDU session request by sending an N2 PDU session Ack message to the AMF. The N2 PDU session Ack message may include N2 SM information (list of accepted/rejected QFIs, AN tunnel information, PDU session ID, Secondary RAT using data) and user location information. In the case of Dual Connectivity, when one or more QFIs are added to a PDU session, the master RAN node transmits one or more QFIs of these QFIs to the NG-RAN node (the NG-RAN that was not previously involved in the PDU session) node) can be assigned. In this case, the AN tunnel information may include a new N3 tunnel endpoint for the QFI allocated to the new NG-RAN node. Accordingly, when one or more QFIs are removed from the PDU session, the (R)AN node is no longer involved in the PDU session, and the corresponding tunnel endpoint is removed from the AN tunnel information. If the QFI cannot meet the user plane security enhancement information for the corresponding QoS profile (eg, due to the UE Integrity Protection Maximum Data Rate being exceeded), the NG-RAN may reject the QFI.

When the PLMN sets a second RAT usage reporting, the NG-RAN node may provide a RAN usage data report.

7) AMF may deliver N2 SM information and user location information received from AN to SMF through Nsmf_PDUSession_UpdateSMContext service operation. The SMF may reply to the AMF with an Nsmf_P-DUSession_UpdateSMContext response. The N2 SM information may include second RAT usage data.

When (R)AN rejects the QFI, the SMF is responsible for updating the QoS flow level QoS parameters if necessary for the QoS rules at the UE and the QoS flows associated with the QoS rules.

8) The SMF may update the N4 session of the UPF related to the PDU session modification by sending the N4 session modification request message to the UPF (refer to Note 3).

When a new QoS flow is generated, the SMF may update the UPF with UL Packet Detection Rules of the new QoS flow.

Note 2: UL packets with QFI of new QoS flow may be delivered via update.

9) The UE may acknowledge the PDU session modification command by sending a NAS message. The NAS message may include a PDU session ID and an N1 SM container (including PDU session modification command Ack).

10) (R)AN may forward NAS message to AMF.

11) AMF may transmit N1 SM container (including PDU session modification command Ack) and user location information received from AN to SMF through Nsmf_PDUSession_UpdateSMContext service operation.

The SMF may reply using the Nsmf_PDUSession_UpdateSMContext response.

If the SMF-initiated PDU session modification procedure is to delete QoS flows that do not contain QoS flows associated with the default QoS rules (eg, when triggered by PCF), and the SMF does not receive a response from the UE, the SMF marks the state of these QoS flows to be synchronized with the UE.

12) The SMF may update the N4 session of the UPF that is not related to the modification of the PDU session by sending the N4 session modification request message (including the N4 session ID) to the UPF. For a PDU session of the Ethernet PDU session type, the SMF may notify the UPF to add or remove an Ethernet Packet Filter Set and a forwarding rule(s).

Note 3: UPFs affected by the PDU session modification procedure depend on the modified QoS parameters and deployment. For example, when the session AMBR of a PDU session having a UL CL (Uplink Classifier) is changed, only the UL CL may be related. This note can also be applied to step 8).

13) When the SMF interacts with the PCF in step 1b) or 2), the SMF may perform the SMF-initiated SM policy association modification procedure to notify the PCF whether the PCC decision is enforced or cannot be enforced.

The SMF may notify any entity subscribed to the user location information related to the PDU session change.

When step 1b) is triggered to perform an application function effect on traffic routing, the SMF may re-establish the user plane of the PDU session.

<PDU Session Release Procedure>

Figure 8A:
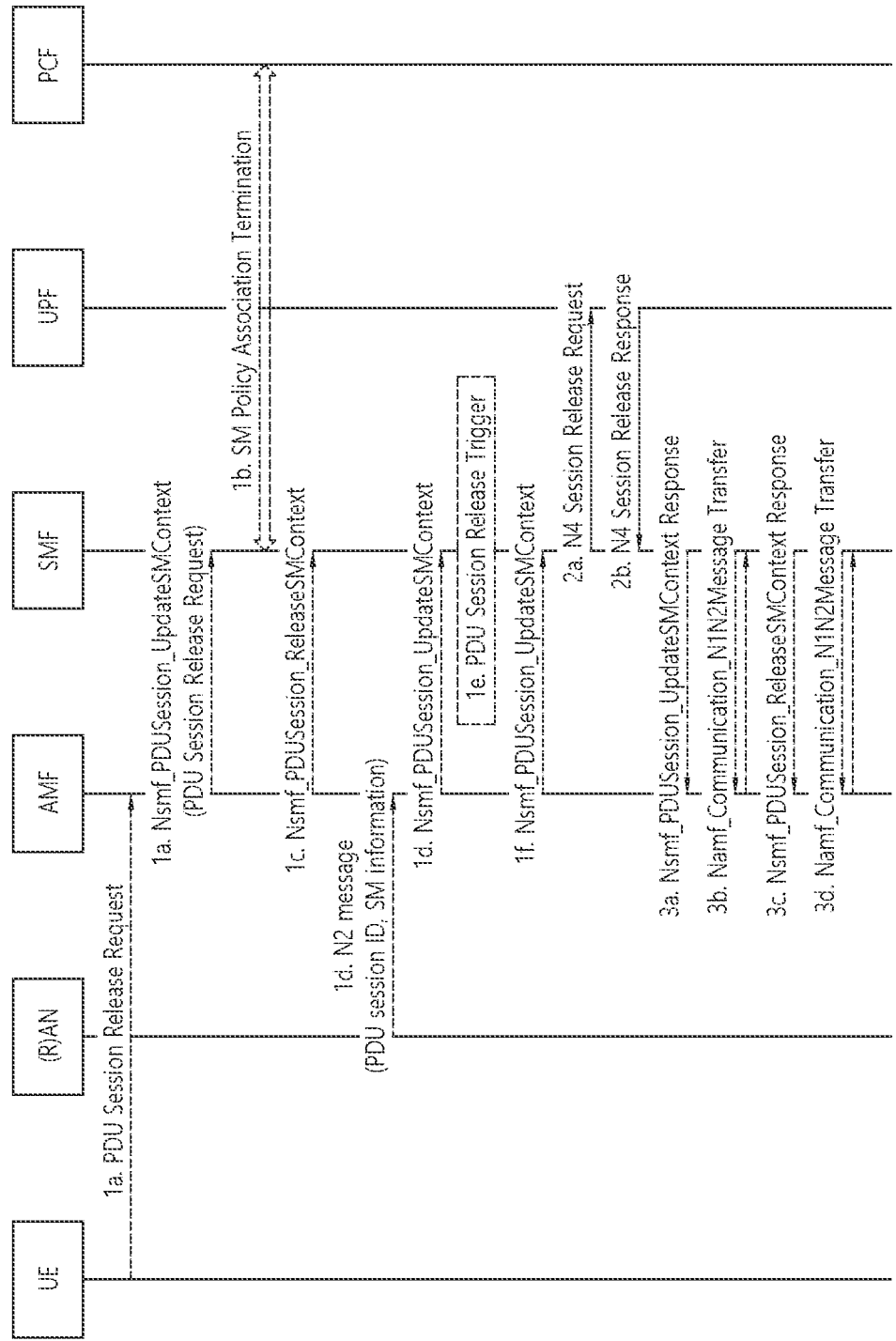
FIGS. 8a and 8b shows an example of a PDU session release procedure.
Figure 8B:
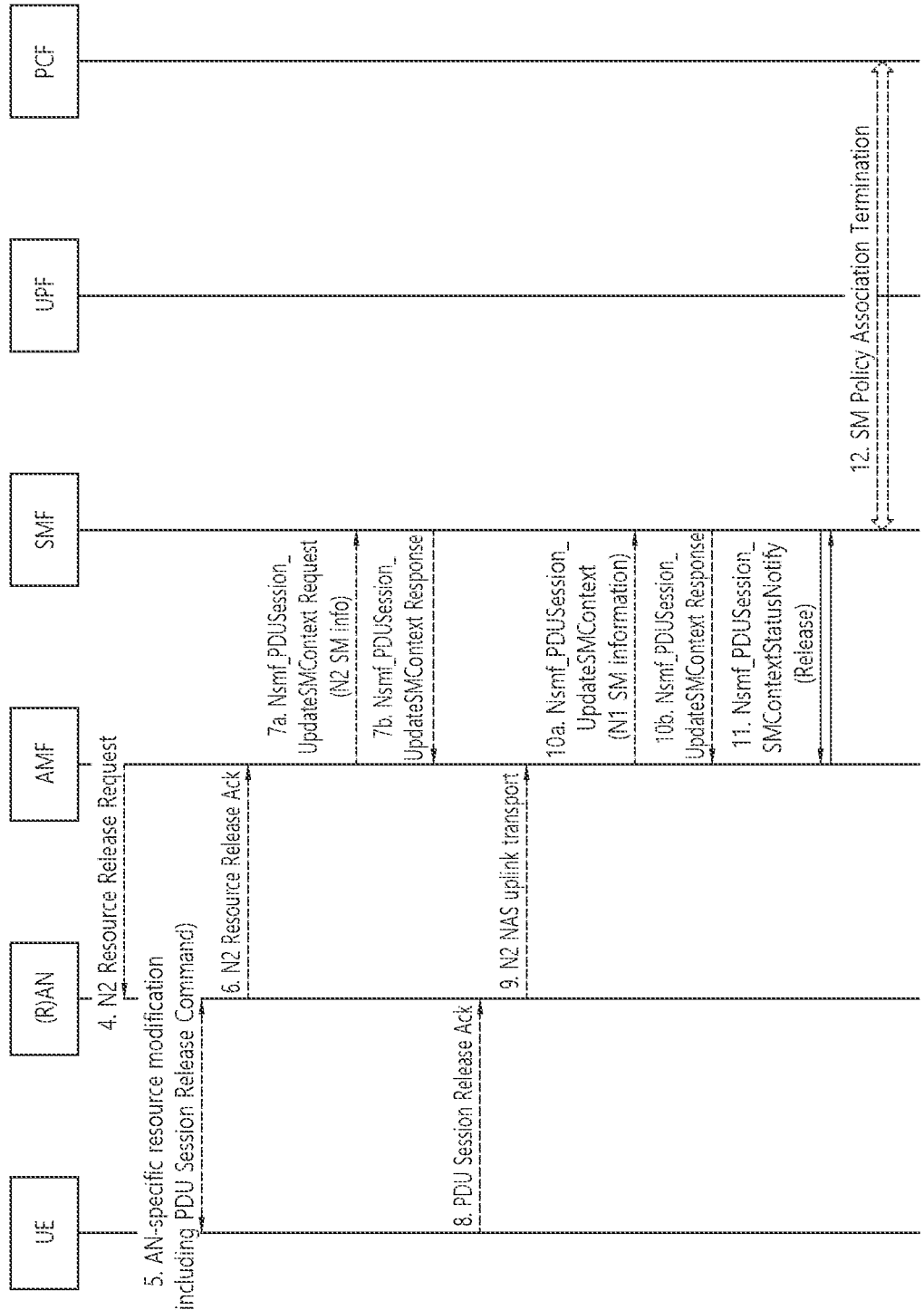

FIGS. 8a and 8b Shows an Example of a PDU Session Release Procedure.

FIGS. 8a and 8b show an example of a PDU session release procedure. The example shown in FIGS. 8a and 8b is an example of a UE or network requested PDU session release procedure in a non-roaming case and a roaming with local breakout case.

Examples of the PDU session release procedure shown in FIGS. 8a and 8b include both a UE Requested PDU Session Release procedure and a network requested PDU Session Release procedure.

The example of the PDU session release procedure shown in FIGS. 8a and 8b allows the UE to release one PDU session. The example of the PDU session release procedure shown in FIGS. 8a and 8b enables the AIVIF, SMF, or PCF to initiate the release of a PDU session.

For reference, in the case of the PDU session release procedure of the LBO case (roaming with local breakout (LBO)) is the same as the PDU session release procedure of the non-roaming case shown in FIGS. 8a and 8b except for the difference that AMF, SMF, UPF and PCF are located in the visited network.

1) The PDU session procedure may be triggered by one of the following events.

1a) (UE requested (requested)) The UE may initiate a UE request PDU session release procedure by sending a NAS message to the AMF. The NAS message may include an N1 SM container and a PDU session ID. The N1 SM container may include a PDU session release request message (including a PDU session ID). The NAS message may be delivered to the AMF along with User Location Information (ULI) by the (R)AN. This message may be relayed to the SMF corresponding to the PDU session ID through AMF and N2. The AMF may transmit a PDU session update related message to the SMF. For example, the AMF may use the Nsmf_PDUSession_UpdateSMContext service to provide the ULI and N1 SM container received from the (R)AN to the SMF.

Note 1: According to the access type, when the UE is in the CM-IDLE state, the UE may trigger a service request procedure before being able to perform the procedure related to the release of the PDU session.

1b) (PDU session release initiated by PCF) The PCF may initiate a session management (SM) Policy Association Termination procedure to request release of the PDU session.

1c) When there is a mismatch in the PDU session state between the UE and the AMF, the AMF may transmit a PDU session release related message to the SMF to request the release of the PDU session. For example, the AMF may transmit the Nsmf_PDUSession_ReleaseSMContext message using the Nsmf_PDUSession_ReleaseSMContext service operation.

1d) (R)AN may decide to inform the SMF that the resource related to the PDU session has been released. For example, when all QoS (Quality of Service) flows of the PDU session are released, the (R)AN may transmit an N2 message(including PDU session ID and SM information) to the SMF to inform that the resource related to the PDU session is released.

Note 2: When the SMF receives the N2 message, the SMF may decide whether to keep the user plane connection of the PDU session in a deactivated state or release the PDU session.

1e) (PDU session release triggered by SMF) The SMF may decide to release the PDU session in a scenario such as the examples below:

if PDU session release is requested from the DN (canceling the UE authorization to access to the DN);

When a PDU session release is requested from a charging function (CHF) or a PDU session release is requested from a UDM (eg, subscription change);

When the SMF receives an event notification from the AMF that the UE is outside the LADN service area; or When a PDU session release is required based on an locally configured policy (eg, the PDU session release procedure may be associated with UPF re-allocation for SSC mode 2/mode 3)

When the SMF receives one of the triggers in steps 1a, 1b, 1c or 1e, the SMF may initiate a PDU session release procedure.

1f) The AMF may perform the Nsmf_PDUSession_UpdateSMContext service operation together with a release indication for requesting release of a PDU session that may require N1 or N2 SM signaling before releasing the SM context. For example, the AMF may send a message related to the PDU session update to the SMF.

2) The SMF may release the IP address, Prefix(es) allocated to the PDU session. The SMF may release user plane resources corresponding to the PDU session. The SMF and UPF may perform the following operations (steps 2a and 2b).

2a) The SMF may transmit an N4 session release request message to the UPF(s) related to the PDU session. The N4 session release request message may include an N4 session ID. When the UPF(s) receives the N4 session release request message, the UPF(s) may drop remaining packets of the PDU Session. UPF may release all tunnel resources and contexts related to the N4 session.

2b) The UPF(s) may acknowledge the N4 session release request message by sending the N4 session release response message (including the N4 session ID) to the SMF.

Note 3: When there are multiple UPFs associated with a PDU session (eg, due to the insertion of UL CL or Branching Point), the session release request procedure of steps 2a and 2b may be performed for each UPF.

3) When the PDU session release procedure is initiated by the PCF and the SMF, and the SMF is notified from the AMF that the UE is unreachable (eg, the UE is in MICO mode (due to the UE is in MICO mode) or Periodical registration failure), the SMF performs step 11, and steps 3 and 4-10 may be omitted.

For example, the SMF may use Nsmf_PDUSession_SMContextStatusNotify to notify the AMF that the PDU session has been released. When the PDU session release procedure is triggered by steps 1a, 1b, 1d or 1e, the SMF may generate an N1 SM including a PDU session release command message (including a PDU session and a Cause value). The Cause value may indicate a trigger for establishing a new PDU session having the same characteristics (eg, when a procedure related to SSC mode 2 is invoked).

3a) (when the PDU session release procedure is initiated by the UE) The SMF may respond to the AMF by sending a response message associated with the PDU session update. For example, the SMF may transmit an Nsmf_PDUSession_UpdateSMContext response message (including an N2 SM resource release request message and an N1 SM container (including a PDU session release command message)) to the AMF.

3b) When the PDU session release procedure is initiated by the SMF, the SMF may perform the Namf_Communication_N1N2MessageTransfer service operation. For example, the SMF may transmit a Namf_Communication_N1N2MessageTransfer message (including an N1 SM container (including a PDU session command message) and a skip indicator) to the AMF.

When the user plane connection of the PDU session is active, the SMF may include an N2 resource release request (including the PDU session ID) in the Namf_Communication_N1N2MessageTransfer message to release (R)AN resources associated with the PDU session.

"skip indicator" may inform the AMF to skip transmitting the N1 SM container to the UE (eg, when the UE is in the CM-IDLE state). Except when the PDU session release procedure is triggered to change the PDU Session Anchor of the PDU session in SSC mode 2, the SMF may include a "skip indicator" in the Namf_Communication_N1N2MessageTransfer message.

When the UE is in the CM-IDLE state and a Namf_Communication_N1N2MessageTransfer message including a "skip indicator" is transmitted to the AMF, the AMF may transmit a Namf_Communication_N1N2MessageTransfer response message to the SMF to acknowledge the operation of step 3b. The Namf_Communication_N1N2MessageTransfer response message may include information "N1 SM Message Not Transferred". And, steps 4 to 10 may be skipped.

3c) When the PDU session release procedure is initiated by the AMF (eg, when the SMF receives the Nsmf_PDUSession_ReleaseSMContext request message from the AMF in step 1c), the SMF may respond to the AMF by sending an Nsmf_PDUSession_ReleaseSMContext response message.

AMF and SMF may remove all contexts (including the PDU session ID) associated with the PDU session (indicated by the UE as released). AMF and SMF can remove all event subscriptions by SMF in AMF. Steps 4 to 11 may be skipped.

3d) The SMF may receive a request message related to the PDU session update. For example, the SMF may receive an Nsmf_PDUSession_UpdateSMContext request message including a release indication (an indication for requesting release of the PDU session according to step 1f).

If a request message associated with a PDU session update is received due to a change in the set of network slices for the UE when the network slice instance is no longer available, and the user plane connection of the PDU session is active, the SMF may perform the Namf_Communication_N1N2MessageTransfer service operation including the N2 resource release request message (including the PDU session ID) in order to release the (R)AN resource associated with the PDU session.

4) When the UE is in the CM-IDLE state and when "N1 SM delivery can be skipped" is not indicated (eg, when the AMF does not receive a "skip indicator"), the AMF may initiate a network initiated service request procedure, in order to transmit a NAS message to the UE. The NAS message may include a PDU session ID and an N1 SM container.

When the UE is in the CM-CONNECTED state, the AMF may transmit SM information to (R)AN. Here, the SM information may be the N2 SM resource request message and the N1 SM container received by the SMF in step 4.

5) When the (R)AN receives the N2 SM request message for releasing the AN resource associated with the PDU session, in order to release the corresponding AN resource, the (R)AN may perform an AN-specific signaling exchange with the UE.

In the case of NG-RAN, RRC Connection Reconfiguration may be performed with the UE in order to release NG-RAN resources related to the PDU session.

While this procedure is being performed, the (R)AN may send the NAS message received from the AMF to the UE.

Here, the NAS message may include an N1 SM container (including a PDU session release command message).

6) [Conditional action] When (R)AN receives an N2 SM request message to release AN resources, (R)AN sends N2 SM resource release Ack (including User Location Information, Secondary RAT usage data) to AMF, thus (R)AN may acknowledge the N2 SM resource release request message.

If the PLMN has set the secondary RAT usage reporting, the NG-RAN node may provide the RAN Usage Data Report to the AMF.

7a) The AMF may transmit a message related to the PDU session update to the SMF. For example, the AMF may send the Nsmf_PDUSession_UpdateSMContext message to the SMF. The Nsmf_PDUSession_UpdateSMContext message may include N2 SM resource release Ack (including Secondary RAT usage data) and User Location Information.

7b) The SMF may respond to the AMF by sending an Nsmf_PDUSession_UpdateSMContext response message.

8) The UE may acknowledge the PDU session release command message by transmitting a NAS message to the (R)AN. The NAS message includes the PDU session ID and the N1 SM container (including the PDU session release Ack message).

9) [Conditional operation] (R)AN may forward the NAS message received from the UE to the AMF. For example, the (R)AN may transmit the NAS message to the AMF by trnamsitting an N2 NAS uplink transport message. The N2 NAS uplink transport message may include a NAS message and User Location information. The NAS message may include a PDU session ID and an N1 SM container (including a PDU session release Ack message).

10a) The AMF may transmit a message related to the PDU session update to the SMF. For example, the AMF may send the Nsmf_PDUSession_UpdateSMContext message to the SMF. The Nsmf_PDUSession_UpdateSMContext message may include an N1 SM container (including a PDU session release Ack message) and User Location information.

10b) The SMF may respond to the AMF by sending a response message related to the PDU session update. For example, the SMF may send an Nsmf_PDUSession_UpdateSMContext response message to the AMF.

For reference, steps 8 to 10 may be performed before steps 6 to 7.

11) If step 3a, 3b or 3d has been performed, the SMF may wait until it receives a response to the N1 and N2 information provided in step 3 as needed.

In order to notify the AMF that the SM context for the PDU session has been released, the SMF may perform a PDU session context status notification related operation. For example, the SMF may transmit an Nsmf_PDUSession_SMContextStatusNotify message to the AMF. The AMF may release the association between the SMF ID and the PDU session ID, the DNN, and the S-NSSAI.

Note 5: The UE and 5GC may synchronize the status of the (released) PDU session when performing the next service request procedure or registration procedure.

12) If Dynamic Policy and Charging (PCC) is applied to the PDU session, the SMF may perform the PCF and SM Policy Association Termination procedure to delete the PDU session.

SMF notifies PDU session release to any entity that has subscribed to User Location Information related with PDU Session change.

If it is the last PDU Session the SMF is handling for the UE for the associated (DNN, S-NSSAI), the SMF may unsubscribe to the session management subscription data changes notification with the UDM. For example, the SMF may unsubscribe by performing a Nudm_SDM_Unsubscribe (including SUPI, DNN, and S-NSSAI) service operation. A UDM may unsubscribe from a subscription notification from a UDR using the Nudr_DM_Unsubscribe (including SUPI, Subscription Data, Session Management Subscription data, DNN, S-NSSAI) service action.

SMF may perform Nudm_UECM_Deregistration service operation including DNN and PDU session ID. UDM may remove association between DNN and PDU session ID related to SMF identity. UDM may update this information using Nudr_DM_Update (including SUPI, Subscription Data, UE context in SMF data) service action.

<Session and Service Continuity>

The next-generation mobile communication network provides various modes to support session and service continuity (SSC).

1) SSC Mode 1

In the protocol data unit (PDU) session establishment procedure, the UPF operating as a PDU session anchor is maintained regardless of the access technology (ie, access type and cell). In the case of an IP-type PDU session, IP continuity is supported regardless of the movement of the UE. SSC mode 1 may be applied to any PDU session type and may also be applied to any access type.

2) SSC Mode 2

When a PDU session has one PDU session anchor, the network may trigger release of the PDU session and instruct the UE to establish the same PDU session. In the process of establishing the new PDU session, a UPF acting as a PDU session anchor may be newly selected. SSC mode 2 may be applied to any PDU session type and may also be applied to any access type.

3) SSC Mode 3

For a PDU session for SSC mode 3, the network may allow the UE to establish a connection using a new PDU session to the same data network before releasing the connection between the UE and the previous PDU session anchor. When the trigger condition is applied, the network may determine whether to select a PDU session anchor suitable for the new condition of the UE, that is, the UPF. SSC mode 3 may be applied to any PDU session type and may also be applied to any access type.

4) Selection of SSC Mode

An SSC mode selection policy may be used to determine the type of SSC mode associated with the UE's application or UE's application group.

The operator may provide the SSC mode selection policy to the UE. The policy may include one or more SSC mode selection policy rules.

II. Problems to be Solved by the Disclosure of the Present Specification

Introduction of edge computing technology to mobile communication systems is being discussed. As various 5G services based on edge computing technology are provided, there is a possibility that communication between a terminal and an application server in a specific area is required more often. The application server may be an application server based on edge computing. For example, the application server may be an edge application server or a multi-access edge computing (MEC) application server. AF may manage one or more application servers (eg, MEC application servers). When it is necessary to change the UP path (eg, when the location of the terminal is changed), the AF may change the application server communicating with the terminal.

For example, as the terminal moves, there may be more cases where communication between the terminal and an application server in a specific area (eg, the area to which the terminal has moved) is required. When the terminal receives a service from the network while the terminal moving its location, the terminal needs to communicate with the most appropriate application server among one or more application servers located in each region. For this reason, there may be a case where it is necessary to change the application server that communicates with the terminal.

In addition, with the introduction of various vertical services, not only the change of the application server according to the movement of the location of the terminal, but also the change of the application server may occur frequently according to the network operation of the operator/service provider regardless of the movement of the location of the terminal.

The application layer of the terminal used to perform communication between the terminal and the application server must be able to recognize the change of the application server and process communication with the application server so that a smooth service can be provided. However, considering the various new services of 5G and the usage environment based on 5G, it may be difficult for the application layer of the terminal to directly find out the IP address of the application server. For this reason, the application layer of the terminal does not recognize the change of the application server and cannot process communication with the application server, so that a smooth service may not be provided.

That is, a communication method related to a change of an application server has not been clearly defined in the prior art. For example, the terminal did not recognize the change of the application server, and did not recognize the information about the changed application server. As another example, the network fails to notify the terminal of the change of the application server, and fails to notify the changed information on the application server.

For example, when a network node related to AF or an application layer changes an application server based on the location of the terminal, the terminal may not have information about the application server according to the location of the terminal. In this case, the terminal may not know to which application server the application server communicating with the terminal is changed. After the path in the optimized core network toward the changed application server is reset, the application layer of the terminal performs a procedure for finding a new server (changed application server), and then information of the changed application server can be obtained. However, since the terminal is not aware of the change of the application server, the network path used by the application layer of the terminal may be optimized for communication with the application server before the change. Accordingly, since the network path is optimized for communication with the application server before the change, the application layer of the terminal may not be able to obtain information on the changed application server.

In this case, the service provision of the terminal is not smooth in the process of changing the application server, which may affect the user experience.

Providing a service related to the changed application server to the user only by processing of the application layer of the terminal may be a constraint in introducing 5G service and constructing a 5G-related network.

III. Disclosure of the Present Specification

The disclosures described below in this specification may be implemented in one or more combinations. Each of the drawings shows an embodiment of each disclosure, but the embodiments of the drawings may be implemented in combination with each other.

The disclosure of the present specification intends to propose a communication method related to a change of an application server. As an example, it is intended to propose a method for the terminal to recognize a change in the application server and to recognize information on the changed application server. As another example, a method for notifying a terminal of a change in an application server in a network and notifying information on the changed application server is proposed. As another example, it is intended to propose a method in which the application layer of the terminal can recognize and process the change of the application server. In addition, it is intended to propose a method in which the 5G core network receives a notification of the change of the application server from the AF so that the 5G core network and the terminal can recognize and utilize the change of the application server and the changed IP address of the application server. When the 5G core network and the terminal quickly recognize the change of the application server, a seamless application server change that can reduce packet loss and reduce service interruption can be provided. For reference, below, the IP address of the application server may be expressed as an application server (AS) IP address or an edge application server (EAS) IP address.

When the application server is changed, the network (eg, SMF node) may transmit a message (eg, NAS message) related to the change of the application server to the terminal. The terminal may perform one or more of the following operations based on the NAS message received from the network. For example, the terminal may perform one or more of the following operations based on the information included in the NAS message:

The terminal can understand directly or indirectly that the change of the application server has occurred in the network. For example, the terminal may directly or indirectly recognize that the change of the application server has occurred based on the NAS message.

The terminal can directly or indirectly understand that the change of the application server in the network can occur. For example, the terminal may directly or indirectly recognize that there is a possibility that the change of the application server may occur based on the NAS message.

The terminal can recognize the changed IP address of the application server. Alternatively, the terminal may acquire the changed IP address of the application server by mapping the information included in the NAS message with preset information. For example, the terminal may acquire the changed IP address of the application server based on the NAS message. For example, based on the NAS message, the terminal may acquire the changed IP address of the application server by mapping information included in the NAS message with preset information stored in the terminal.

The terminal may transmit the changed address of the application server to the application layer of the terminal. For example, the NAS layer of the terminal may obtain the changed IP address of the application server based on the NAS message, and the NAS layer of the terminal may transmit the changed IP address of the application server to the application layer of the terminal.

The terminal may include capability information for a function capable of processing information related to the change of the application server in the NAS message transmitted to the network. For example, the NAS message may be a Session Management (SM) NAS message such as a PDU session establishment request message. The capability information may be information on whether the application layer of the terminal supports the AS (Application Server: Application Server) IP address change. For example, capability information may be information indicating capability for recognizing the changed IP address from the network and determining whether an operation related to the change of the application server can be performed, after an application change (AS (Application Server: Application Server) change). The name of the capability information may be, for example, information of IP address change support.

A network node (eg, an SMF node or an AF node, etc.) may perform a procedure related to application server change. For example, a network node (eg, an SMF node) may perform a relocation decision related to a UPF change for specific traffic (eg, traffic associated with a specific PDU session). As another example, when the application server is changed, the network node (eg, AF node) may provide information about the changed application server (eg, the changed IP address of the application server, etc.) to the SMF node. Specifically, the network node may perform one or more of the following operations.

Network nodes (eg SMF nodes) may subscribe to events related to application server changes provided by AF nodes. For example, the SMF node may directly subscribe to the event related to the change of the application server to the AF node, or may subscribe to the AF node through the NEF node.

A network node (eg SMF node) may receive the changed IP address of the application server from AF. A network node (eg, an SMF node) may provide information on the changed IP address of the application server to the UE. For example, the network node (eg, SMF node) may transmit NAS Protocol Configuration Options (PCO) including the changed IP address of the application server to the terminal.

After the network node (eg AF node) successfully changes the application server, the network node (eg AF node) may transmit information about the changed application server's IP address to the SMF node. For example, the AF node may transmit information on the changed AS IP address (the changed IP address of the application server) to the SMF node directly or to the SMF node through the NEF.

The network node (eg, SMF node) can check whether the terminal has the capability to process information related to the change of the application server. Specifically, a network node (eg, an SMF node) may receive the capability information from the terminal. For example, the network node may check whether the terminal has the capability (e.g. capability that the terminal deliver the changed IP address of the application server to the application layer of the terminal, by recognizing or extracting the IP address of the changed application server, or by obtaining the changed IP address of the application server by mapping the information related to the change of the application server with preset information). The capability information may be information on whether the application layer of the terminal supports the AS (Application Server: Application Server) IP address change. For example, the capability information is a information indicating capability whether the application layer of the terminal recognizes the changed IP address from the network and whether an operation related to the change of the application server can be performed, after an application change (AS (Application Server: Application Server) change). The name of the capability information may be, for example, information of IP address change support.

A network node (eg, an SMF node) that has received the capability information from the terminal may perform an operation for preventing the IP address change of the application server if the terminal does not support the capability. Alternatively, when the network node (eg, SMF node) that has received the capability information from the terminal recognizes the change in the IP address of the application server, if the terminal does not support the capability (that is, when the change in the application server is recognized), regardless of the capability of the terminal, the network node (eg, SMF node) may instruct another network node (eg, UPF node) to perform an operation related to the changed application server so that the network can support the changed IP address of the application server.

The network node (eg, SMF node) may check whether the AF has previously subscribed to the network node (eg, SMF node) to a user plane management event (eg, UP management notification event). For example, the network node may check whether the AF has subscribed to a service that requests notification of an event (eg, UP path change) for a specific traffic from the network node.

A network node (eg, an SMF node) may transmit a notification message related to UP path change for specific traffic to the AF. Additionally, the network node may include information (eg, indication) for requesting the IP address of the application server to be changed in the notification message. For example, when the network node transmits a notification message related to the change of the UP path for specific traffic to the AF, the AF may perform an operation of changing the application server according to the changed UP path. The information for requesting the changed IP address of the application server may be information for requesting the IP address of the application server (ie, the changed application server) after AF changes the application server.

The network node (eg, SMF node) may wait for a response message to the notification message related to the UP path change transmitted to the AF. In particular, when the AF subscribes to a service that requests notification of an event for a specific traffic with an "AF acknowledgment to be expected" indication, the network node must wait for a response message from the AF.

A network node (eg, an SMF node) may receive a response message from the AF. The network node may perform one or more of the operations described in 1-a to 1-c below based on the information included in the response message:

1-a) A network node (eg, an SMF node) may understand, directly or indirectly, that an application server change has occurred based on the information included in the response message.

1-b) In particular, when an AF subscribes to a service that requests notification of an event for a specific traffic with an "AF acknowledgment to be expected" indication, a network node (eg, an SMF node) may perform an operation for controlling the PDU session according to whether the response message received from the AF is a negative response or a positive response. For example, the operation for controlling the PDU session may be an operation associated with a PDU session establishment procedure, a PDU session modification procedure, or a PDU session release procedure.

1-c) The network node (eg, SMF node) may recognize the changed IP address of the application server based on the information included in the response message.

If the above-described operation of 1-c) is described in more detail, the network node (eg, SMF node) may obtain IP address of the changed application server by performing one or more of the following operations (2-a to 2-c):

2-a) The response message sent from the AF may include information about the IP address directly. The network node may acquire the changed IP address of the application server based on information on the IP address included in the response message.

2-b) The network node may acquire the changed IP address of the application server based on the IP address set as per DNAI (Data Network Access Identifier) in the local configuration. For example, the response message transmitted from the AF may include information on DNAI, even if it does not directly include information on the changed IP address of the application server. The network node may acquire the changed IP address of the application server based on the information about the local setting and DNAI stored in the network node.

2-c) The network node may acquire the changed IP address of the application server based on the DNAI included in the Policy and Charging Control (PCC) rule received from the AF and the IP address set as per DNAI. For example, the response message transmitted from the AF may include a PCC rule, and the PCC rule may include information on DNAI. The network node may acquire the IP address of the changed application server based on the DNAI information and the IP address set as per DNAI (eg, the IP address set as per DNAI in the local configuration).

The network node (eg, SMF node) may transmit one or more of the following information (i to v) to the terminal so that the terminal can recognize or extract the changed IP address of the application server. For example, the network node may transmit a message including one or more of the following information to the terminal:

i) IP address included in response message sent from AF. Here, the IP address means the changed IP address of the application server.

ii) DNAI. DNAI can be delivered on the assumption that the terminal and the network have set the mapping between DNAI and IP address in advance. For example, if the terminal and the network set an IP address mapped for each DNAI in advance, the network node may transmit the DNAI to the terminal.

iii) An index representing an IP address (eg, information such as value, number, or bitmap). The index indicating the IP address can be delivered assuming that the terminal and the network have set up the mapping between the index indicating the IP address and the IP address in advance. For example, when the terminal and the network set an IP address mapped to an index indicating the IP address in advance, the network node may transmit the index indicating the IP address to the terminal.

iv) Location information corresponding to service area. For example, the SMF node may receive location information corresponding to a service area (eg, location information corresponding to a service area provided by each of one or more application servers) from AF. The location information corresponding to the service area can be delivered on the assumption that the terminal and the network have configured mapping of location information and IP address in advance. For example, when the terminal and the network configured IP addresses mapped to location information corresponding to the service area, the network node may transmit location information corresponding to the service area to the terminal.

v) QoS (Quality of Service) rule including a packet filter including the changed IP address of the application server.

If the change of the application server is not successful (ie, failed), the network node (eg, SMF node) may receive a negative response message (eg, negative notification response message) from AF. The network node may transmit a NAS message to the terminal based on the negative response message. Here, the NAS message may include a cause value directly/indirectly indicating (or implying) that the change of the application server is not successful.

<Notice Related to Application Server Change>

Hereinafter, a method of supporting the change of the application server based on the notification message of the AF will be described.

During the PDU session establishment procedure is performed, the SMF node may subscribe to notifications (direct subscription or optionally subscription through NEF) related to application changes (eg, application server changes) (in particular, application server IP address changes) provided by AF nodes. For example, in order to receive a notification related to an application change, the SMF node may subscribe to notifications related to an application change (particularly, an IP address change of an application server) provided by the AF node based on UE subscription information and operator's policy. After the application server is changed successfully, the AF node may transmit a notification message to the SMF based on that the SMF subscribed to the AF node. This notification message may trigger the SMF to decide to re-configure the user plane.

Additionally, the AF node may transmit the changed IP address of the application server to the SMF node together with the notification message. The SMF node may support to transmit the changed IP address obtained on the basis of the AF notification (notification message received from the AF) to the terminal through the NAS PCO. For example, the SMF node may include the changed IP address obtained based on the AF notification message in the NAS PCO and transmit it to the terminal. By transmitting the changed IP address to the terminal, the SMF node may quickly provide the changed IP address to support the terminal in discovering the application server. In addition, since the SMF node transmits the changed IP address to the terminal, the quality of the service experience of the user using the terminal may be improved.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 9:
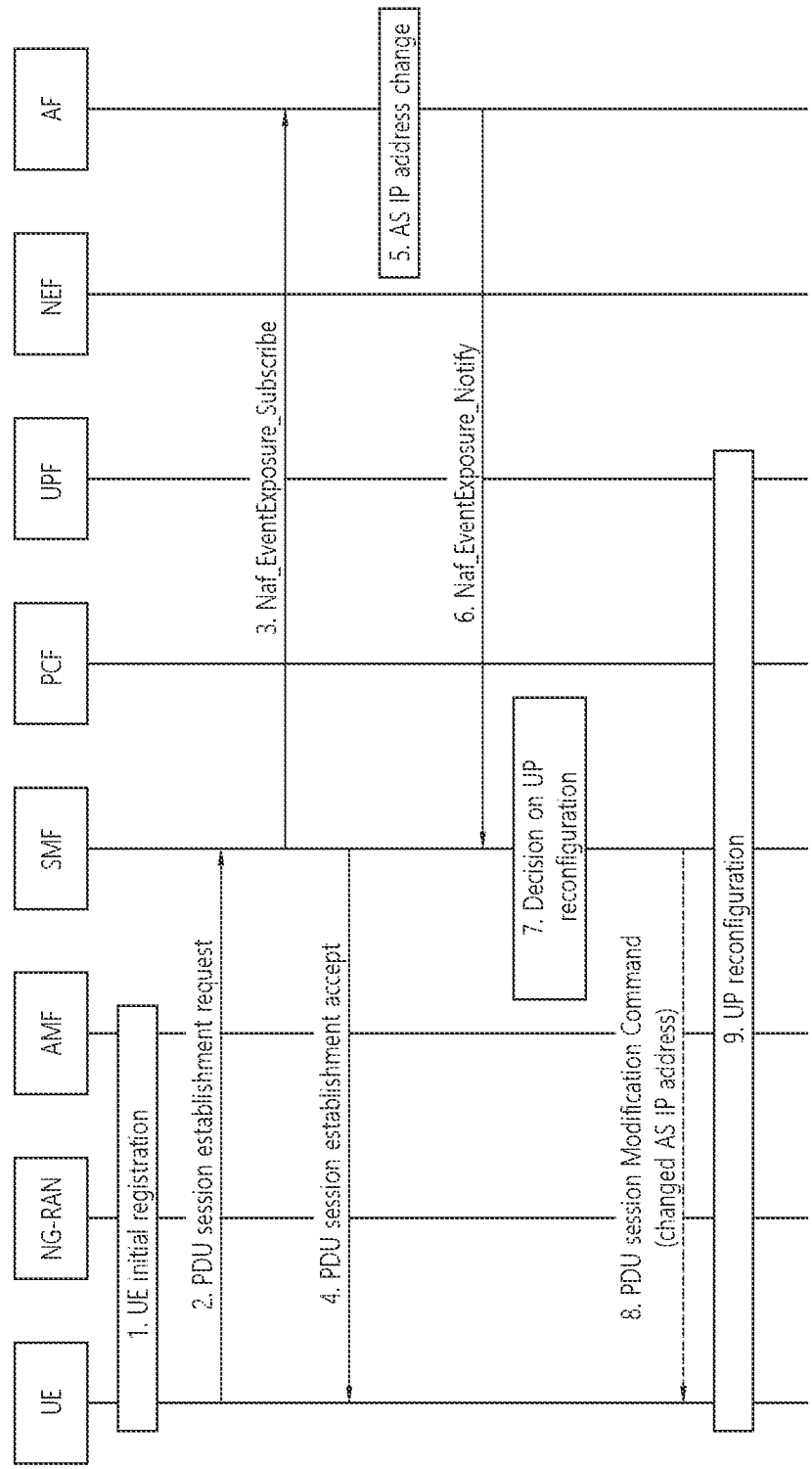
FIG. 9 illustrates an example of a procedure related to a notification related to a change of an application server according to the disclosure of the present specification.

FIG. 9 Illustrates an Example of a Procedure Related to a Notification Related to a Change of an Application Server According to the Disclosure of the Present Specification.

The example of FIG. 9 is an example of a procedure including an operation in which the SMF subscribes to an event of the AF (eg, an event related to a change of an application server) and a procedure in which the AF transmits a notification message, the example of FIG. 9 may be a procedure to support the change of the application server serving the terminal. Here, the AF event may be, for example, an event that transmits a notification message to the SMF when the AF successfully changes the application server.

For reference, when the change of the application server is performed independently of the mobility of the UE (eg, when the change of the application server occurs according to the network operation of the operator/service provider regardless of the location movement of the terminal), the example shown in FIG. 9 can also be applied.

1) A UE (eg, UE) may perform an initial registration procedure for the network. For example, the terminal and the network may perform the registration procedure illustrated in the examples of FIGS. 5A and 5B.

2) The UE may perform a PDU session establishment procedure. For example, the terminal may transmit a PDU session establishment request message to the SMF node.

Additionally, the terminal may transmit capability (capability) information for a function capable of processing information related to the change of the aforementioned application server to the SMF node. For example, the capability information may indicate that the terminal can process the IP address of the changed application server when the network transmits the IP address of the changed application server in the NAS PCO in the future to the terminal. The capability information may be information on whether the application layer of the terminal supports the AS (Application Server: Application Server) IP address change. For example, after an application change (AS (Application Server: Application Server) change), the capability information is a information indicating that the application layer of the terminal recognizes the changed IP address from the network and determines whether an operation related to the change of the application server can be performed. The name of the capability information may be, for example, information of IP address change support.

The network node (eg, SMF) may determine whether the terminal can process information related to the change of the application server based on the capability information. A network node (eg, SMF) may determine whether to support AS IP address change based on the capability information. When the network node (eg SMF) determines that the terminal cannot process information related to the change of the application server, the network node (eg SMF) may perform one or more operation of the following operations (operation a) and operation b)) (for reference, operation a) and operation b) are not shown in FIG. 9):

a) The network node (eg, SMF) may deliver the capability information to the AF node. Alternatively, the network node (eg, SMF) generalizes the meaning of the capability information to transmit information indicating that the application server cannot be changed (that is, change of the IP address of the application server is impossible) to the AF node.

b) When the network node (eg SMF) receives information about IP address of the changed application server from AF (eg, receives information about the changed application server IP address from AF in step 6 to be described later), UPF may instruct to perform an operation related to IP conversion. Specifically, the SMF may perform IP conversion of data packets exchanged with the changed application server separately from the terminal. For example, since the terminal does not have the ability to handle the changed IP address, the SMF may instruct to UPF to perform communication with the terminal using the IP address of the application server before the change, and instruct to UPF to perform communication with the AF using the changed IP address of the application server.

3) A network node (eg, SMF) may decide to subscribe to an event related to application server change provided by AF. For example, a network node (eg, SMF) may determine to subscribe to an event related to application server change provided by AF, based on UE subscription information and/or a policy of an operator. When the network node (eg, SMF) determines to subscribe to an event related to application server change, the network node (eg, SMF) may transmit a subscription message (eg, Naf_EventExposure_Subscribe message) to the AF. The subscription message may be transmitted directly to the AF or may be transmitted to the AF through the NEF.

4) The SMF node may transmit a PDU session establishment accept message to the terminal. The UE may have an established PDU session.

5) AF may change the application server. For example, regardless of UE mobility (e.g., when an application server is changed according to the network operation of an operator/service provider regardless of the location movement of the terminal), the application server serving the terminal may be changed by AF. Since the application server is changed, the IP address of the application server may also be changed.

6) The AF may transmit a notification message (eg, Naf_EventExposure_Notify message) notifying the change of the application server to the SMF node according to whether the SMF has subscribed to the event related to the application server change in step 3. Specifically, when the SMF subscribes to the event related to the application server change in step 3), the AF may transmit the notification message to the SMF node. Additionally, the AF may provide information on the changed IP address (ie, the IP address of the changed application server) to the SMF. For example, the changed IP address may be included in the notification message and transmitted. For reference, the notification message may be transmitted directly to the SMF or may be transmitted to the SMF through the NEF.

7) A network node (eg, an SMF node) may determine whether user plane reconfiguration is required. When it is determined that user plane resetting is necessary, a network node (eg, an SMF node) may trigger a procedure for user plane resetting. For example, the procedure for user plane reconfiguration may be a PDU session modification procedure.

8) If the SMF supports transmission of information on the changed AS IP address of the application server, the SMF may transmit information on the IP address of the changed application server to the terminal. Here, the information on the changed IP address of the application server may be information obtained by the SMF in a notification message from the AF. For example, the SMF may include information on the IP address of the changed application server in a NAS message (eg, a PDU session modification command message) and transmit it to the terminal. As an example, the SMF may transmit information on the IP address of the changed application server to the terminal by including a NAS PCO including information on the IP address of the changed application server in the NAS message.

Upon receiving the NAS message (eg, PDU session modification command message) from the SMF, the NAS layer of the terminal may transmit information on the changed IP address of the application server to an upper layer (eg, application layer). In addition, the application layer of the terminal may immediately recognize information on the changed IP address of the application server, and use the information on the IP address of the changed application server for communication with the changed application server.

9) When the SMF triggers UPF addition, relocation or removal, a procedure for user plane resetting may be performed.

Hereinafter, notification of the aforementioned user plane event (eg, notification transmitted by an SMF node to AF) will be described. A user plane event notification will be described with reference to the example shown in FIG. 10.

<Notification of User Plane Management Event>

The following drawings were created to explain a specific example of the present specification. The names of specific devices described in the drawings or the names of specific signals/messages/fields are presented by way of example, so that the technical features of the present specification are not limited to the specific names used in the following drawings.

Figure 10:
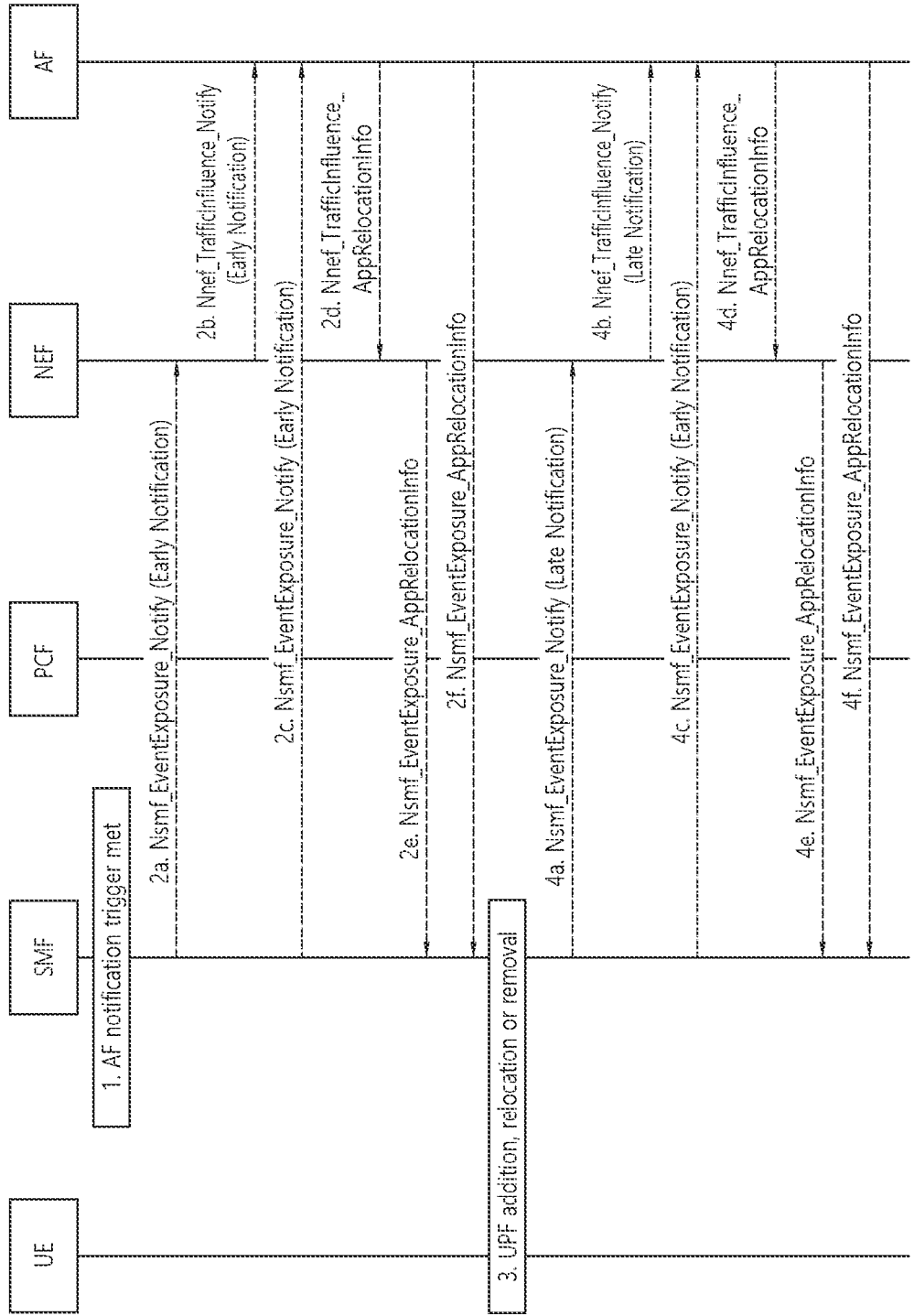
FIG. 10 illustrates an example of a procedure related to notification of a user plane management event according to the disclosure of this specification.

FIG. 10 Illustrates an Example of a Procedure Related to Notification of a User Plane Management Event According to the Disclosure of this Specification.

When an application function (AF) performs a subscription to receive a notification of a user plane (UP) management event, the SMF node may transmit a notification to the AF. The examples below are examples of user plane management events:

When the PDU session anchor identified by the AF subscribe request is established or released
if DNAI is changed
When the SMF node receives a request for AF notification, when the on-going PDU session meets the conditions for notifying the AF For reference, the SMF node may be in a state of subscribing to the "event related to application server change provided by the AF" described in the example of FIG. 9.

In order to transmit a notification message to the AF through the NEF (eg, steps 2a, 2b and 4a, 4b to be described later) or directly to the AF (eg, steps 2c and 4c to be described later), the SMF node may use the notification report information received from the PCF.

1) The conditions for AF notification are met. Then, the SMF node transmits a notification message to the NF (Network Function) subscribed to the notification service of the SMF node. For reference, a specific method for the SMF node to process the notification message may differ depending on the NF that receives the notification message as illustrated in steps 2a to 2c to be described later.

2-0) Step 2-0 is not shown in FIG. 10, but may be a step performed, by the SMF node, after the SMF node performs step 1). The SMF node may determine whether to transmit a notification message to the AF and whether to transmit information requesting the IP address of the changed application server, based on the capability information of the terminal, the location information of the terminal obtained from the AMF, the information of the PDU session related to the AF notification, the service to which the AF has subscribed in advance (eg, UP management event notification service) information, and the policy configured in advance.

2a) When the AF requests early notification to the SMF node through the NEF, the SMF node may notify the NEF of the target DNAI of the PDU session by invoking the Nsmf_EventExposure_Notify service operation. For example, the SMF node may include an early notification message in the Nsmf_EventExposure_Notify message and transmit it to the NEF.

The SMF node may transmit the early notification message together with information requesting information on the IP address of the changed application server when the application server is changed, to the NEF. That is, the SMF node may request information on the changed IP address from the AF through the NEF by transmitting information requesting information on the IP address of the changed application server together with the early notification message.

2b) When the NEF receives the Nsmf_EventExposure_Notify message, the NEF may perform information mapping (that is, the AF Transaction Internal ID included in the Notification Correlation ID in the notification message is mapped to the AF Transaction Internal ID, SUPI is mapped to the GPSI, etc.). And, the NEF may trigger an appropriate Nnef_TrafficInfluence_Notify. For example, the NEF may transmit an Nnef_TrafficInfluence_Notify message including an early notification message to the AF. If step 2b) is performed, step 2c) may not be performed.

According to the SMF's request, the NEF may request information about the IP address of the changed application server from the AF when the application server is changed. For example, the NEF may transmit an early notification message and information requesting information on the IP address of the changed application server to the AF.

2c) When the AF requests direct early notification to the SMF node, the SMF may notify the AF of the target DNAI of the PDU session by invoking the Nsmf_EventExposure_Notify service operation. For example, the SMF may transmit an Nsmf_EventExposure_Notify message including the early notification message and the target DNAI of the PDU session to the AF.

The SMF node may transmit the early notification message together with information requesting information on the IP address of the changed application server to the AF when the application server is changed.

2d) The AF may respond to the Nnef_TrafficInfluence_Notify message by transmitting the Nnef_TrafficInfluence_AppRelocationInfo message immediately or after completing the required application relocation in the target DNAI. For example, if the AF determines that the application relocation cannot be completed successfully, and/or cannot be completed on time, the AF may transmit a negative response message.

Based on the request of the SMF node (eg, when information requesting IP information of the changed application server is received), AF may transmit a response message (eg, acknowledgment message) to the NEF after successful application server change. In this case, the response message transmitted by the AF may include information on the changed IP address of the application server.

2e) When the NEF receives the Nnef_TrafficInfluence_AppRelocationInfo message, the NEF may transmit the Nsmf_EventExposure_AppRelocationInfo message to the SMF.

The Nsmf_EventExposure_AppRelocationInfo message transmitted by the NEF may include information on the IP address of the changed application server received from the AF.

2f) AF may respond to Nsmf_EventExposure_Notify by activating (Invoking) the Nsmf_EventExposure_AppRelocationInfo service operation immediately or after completion of application relocation required in the target DNAI. For example, the AF may transmit an Nsmf_EventExposure_AppRelocationInfo message to the SMF node. The AF may include N6 traffic routing details information corresponding to the target DNAI in the Nsmf_EventExposure_AppRelocationInfo message. For example, if the AF determines that the application relocation cannot be completed successfully, and/or cannot be completed in time, the AF may transmit a negative response message.

Based on the request of the SMF node (eg, when information requesting IP information of the changed application server is received), if AF transmits a response message after successful application server change, AF sends a response message (eg, acknowledgment) message to the SMF node. In this case, the response message transmitted by the AF may include information on the IP address of the changed application server.

In the above-described steps 2d to 2f, when the SMF receives a negative notification response (eg, negative response message) from the AF, the SMF may transmit a NAS message including information indicating that the change of the application server has failed to the terminal. For example, the SMF node may include a cause that directly or indirectly implies (or includes) the meaning that the change of the application server is not successful in the NAS message transmitted to the terminal.

For reference, if the SMF node is subscribed to "event related to application server change provided by AF" described in the example of FIG. 9, in steps 2d), 2e) 2f), the AF may provide the IP address of the changed application server to the SMF node along with response for successful application relocation.

3) The SMF may change DNAI, add, change or remove UPF.

For example, if runtime coordination between 5GC and AF is enabled based on local configuration, according to "AF acknowledgment to be expected" indication sent to SMF by AF while subscribing to the SMF event, the SMF node may wait for a response from the AF to the early notification message before step 3. In this case, the SMF may not perform step 3) until receiving an positive response message from the AF.

4a) When a late notification message via the NEF is requested by the AF, the SMF node may notify the NEF of the target DNAI of the PDU session by invoking the Nsmf_EventExposure_Notify service operation.

When runtime coordination between 5GC and AF is enabled based on local configuration, according to the "AF acknowledgment to be expected" indication sent by AF to SMF while subscribing to SMF event, SMF may transmit late notification message to the NEF. And, before the SMF activates a new UP path, the SMF may wait for an acknowledgment message from the AF.

The SMF may transmit the late notification message together with information requesting information on the IP address of the changed application server when the application server is changed, to the NEF.

4b) When the NEF receives the Nsmf_EventExposure_Notify message, the NEF may perform information mapping (that is, the AF Transaction Internal ID included in the Notification Correlation ID in the notification message is mapped to the AF Transaction Internal ID, SUPI is mapped to the GPSI, etc.). Then, the NEF triggers an appropriate Nnef_EventExposure_Notify message. For example, the NEF may transmit the Nnef_EventExposure_Notify message including the late notification message to the AF. If step 4b) is performed, step 4c may not be performed.

According to the SMF's request, the NEF may request information about the changed IP address of the application server from the AF when the application server is changed. For example, the NEF may transmit a late notification message and information requesting information on the IP address of the changed application server to the AF.

4c) When the AF requests direct late notification from the SMF node, the SMF may notify the AF of the target DNAI of the PDU session by invoking the Nsmf_EventExposure_Notify service operation. For example, the SMF may transmit the late notification message and the Nsmf_EventExposure_Notify message including the target DNAI of the PDU session to the AF.

The SMF node may transmit the late notification message together with information requesting information on the IP address of the changed application server when the application server is changed, to the AF.

4d) may respond to the Nnef_TrafficInfluence_Notify message by sending the Nnef_TrafficInfluence_AppRelocationInfo message immediately or after completing the required application relocation in the target DNAI. AF may include N6 traffic routing details corresponding to the target DNAI in the Nnef_TrafficInfluence_Notify message. For example, if the AF determines that the application relocation cannot be completed successfully and/or cannot be completed within time, the AF may send a negative response message.

Based on the request of the SMF node (eg, when information requesting IP information of the changed application server is received), if AF sends a response message after successful application server change, AF may transmit a response message (eg, positive response message) to the SMF node. In this case, the response message transmitted by the AF may include information on the IP address of the changed application server.

4e) When the NEF receives Nne_TrafficInfluence_AppRelocationInfo, the NEF may transmit an Nsmf_EventExposure_AppRelocationInfo message to the SMF.

The Nsmf_EventExposure_AppRelocationInfo message transmitted by the NEF may include information on the changed IP address of the application server received from the AF.

4f) AF may respond to Nsmf_EventExposure_Notify by activating (Invoking) the Nsmf_EventExposure_AppRelocationInfo service operation immediately after or after the application relocation required in the target DNAI is completed. AF may include N6 traffic routing details corresponding to the target DNAI in the Nsmf_EventExposure_AppRelocationInfo message. For example, if the AF determines that the application relocation cannot be completed successfully, and/or cannot be completed in time, the AF may transmit a negative response message.

Based on the request of the SMF node (eg, when information requesting IP information of the changed application server is received), if AF sends a response message after successful application server change, AF may transmit a response message (eg, acknowledgment) message) to the SMF node. In this case, the response message transmitted by the AF may include information on the IP address of the changed application server.

For reference, when the SMF node is subscribed to the "event related to application server change provided by the AF" described in the example of FIG. 9, in steps 4d), 4e) 4f), the AF may provide the IP address of the changed application server along with response for successful application relocation, to the SMF node.

After the SMF acquires the changed AS IP address from the AF, the SMF may transmit the changed AS IP address to the terminal through the NAS PCO. The application layer of the terminal may deliver the changed IP address of the application server to the application layer of the terminal, and the application layer of the terminal can quickly recognize and use the IP address of the changed application server.

<Procedures Related to Change of PDU Session Anchor>

Figure 11:
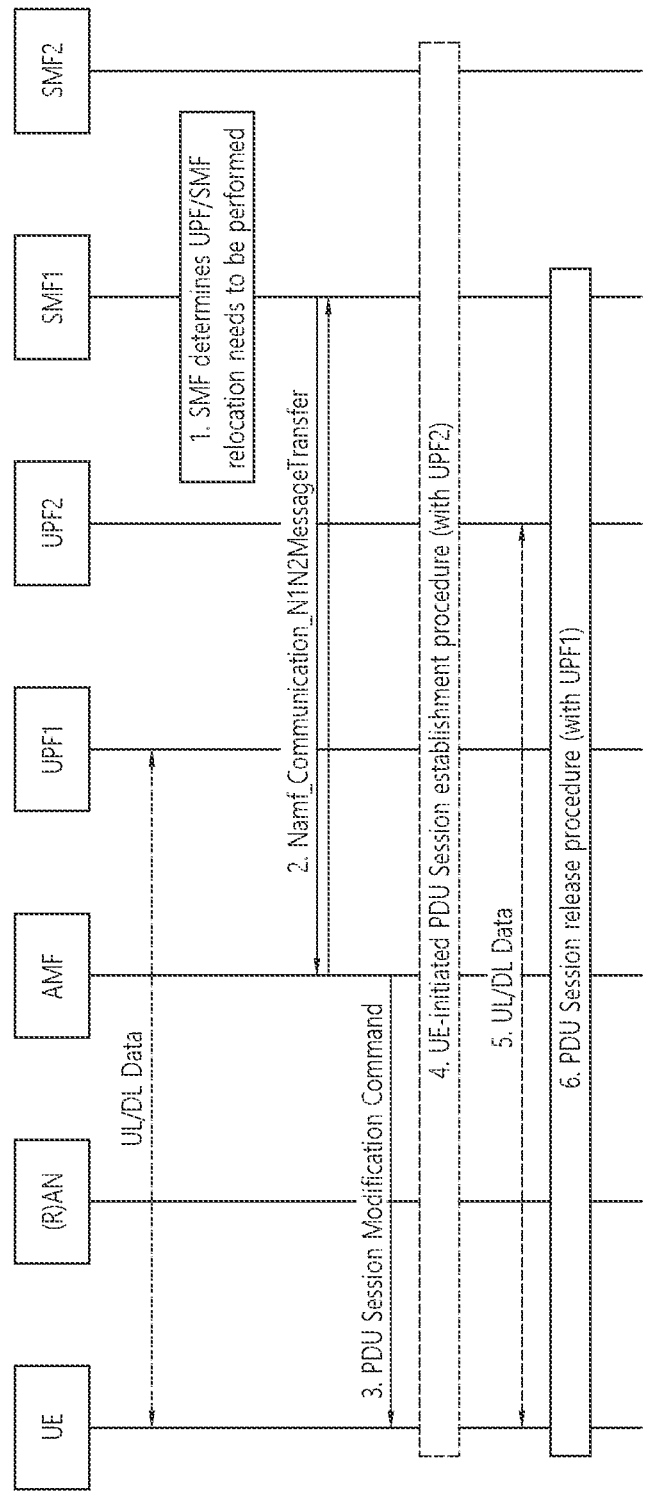
FIG. 11 shows an example of a procedure related to changing a PDU session anchor having multiple PDU sessions in SSC mode 3 according to the disclosure of the present specification.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 11 Shows an Example of a Procedure Related to Changing a PDU Session Anchor Having Multiple PDU Sessions in SSC Mode 3 According to the Disclosure of the Present Specification.

In order to change the PDU session anchor responsible for the PDU session of SSC mode 3 for the UE (or UE), the SMF may trigger a procedure described below.

In the procedure described below, after a new PDU session for the same DN is established with a new PDU session anchor (eg, UPF2 in FIG. 11), the existing PDU session related to the previous PDU session anchor (eg, UPF1 in FIG. 11) can be released. The new PDU session anchor may be controlled by the same SMF as the PDU session anchor. The SMF may determine that a new SMF may need to be reassigned.

1) The SMF may determine that the serving UPF or SMF needs to be changed. When the "Indication of Application relocation possibility" attribute in the PCC rule indicates that the DNAI already selected for the application is not changed, the SMF may determine that the change of the SMF is not necessary.

2-0) Although not shown in FIG. 11, step 2-0 may be performed by a network (eg, SMF 1 in FIG. 11) after step 1) is performed and before step 2) is performed.

The SMF node may determine whether to transmit a notification message to the AF and whether to transmit information requesting the IP address of the changed application server, based on the capability information of the terminal, the location information of the terminal obtained from the AMF, the information of the PDU session related to the AF notification, the service information (eg, UP management event notification service) to which the AF has subscribed in advance, and the policy set in advance.

2) The SMF node may have transmitted an early notification message to the AMF before performing step 2). SMF transmitted an Early Notification message to AF, and when runtime coordination between 5GC and AF is enabled based on local configuration, the SMF may wait for a notification response to the early notification message, according to "AF acknowledgment to be expected" indication, which is transmitted by the AF while the AF subscribing SMF event. When the SMF receives a negative response message from the AF, the SMF may stop the procedure of FIG. 11.

When the PDU session ID indicates the existing PDU session to be relocated, and the cause field indicates that re-establishment of the PDU session for the same DN is required, the SMF may invoke Namf_Communication_N1N2MessageTransfer. For example, the SMF may transmit a Namf_Communication_N1N2MessageTransfer message to the AMF. Here, Namf_Communication_N1N2MessageTransfer may include a PDU session ID, an SMF reallocation requested indication, and an N1 SM container. The N1 SM container may include a PDU session modification command. The PDU session modification command may include a cause and Protocol Configuration Options (PCO). The PCO may include a PDU Session Address Lifetime value.

The SMF may receive a positive notification response from the AF. For example, the SMF may receive a positive response message in response to the notification message sent to the AF. The positive notification response received from the AF may include information related to the IP address of the changed application server. After receiving the positive notification response, the SMF may transmit a PDU session modification command to the terminal. The PDU session modification command may include a NAS PCO, which may include information through which the IP address of the changed application server or Information that enables the terminal to extract (or obtain) the IP address of the changed application server.

The SMF reassignment request indication may indicate whether the SMF is required to be reassigned.

The PDU session address lifetime value included in the PCO is transmitted to the upper layer of the UE, and may indicate how long the network will maintain the PDU session. The SMF may start a PDU session release timer corresponding to the PDU session address lifetime value.

3) The AMF may deliver the NAS message to the terminal (eg, the UE of FIG. 11). When the release timer value is included in the PDU session modification command, the terminal may transmit the release timer value to an upper layer of the terminal.

The terminal may acquire the IP address of the changed application server based on the information received from the SMF. In addition, the terminal may transmit information on the IP address of the changed application server to the application layer of the terminal. For example, the NAS layer of the terminal may obtain the IP address of the changed application server included in the NAS PCO of the PDU session modification command based on the PDU session modification command received from the SMF, and deliver the obtained IP address to the application layer of the terminal. Here, the NAS PCO of the PDU session modification command may include a PDU session address lifetime value (PDU Session Address Lifetime value).

When the SMF node transmits the late notification message to the AF, since the SMF node does not transmit the late notification message to the AF before step 3), the SMF cannot deliver the IP address of the changed application server to the terminal. Therefore, when the SMF node transmits the late notification message to the AF, since the terminal does not receive the IP address of the changed application server in step 3), the AMF may transmit the information that the change of the application server is likely to occur in the future to the terminal directly or indirectly. Here, the information that the change of the application server is likely to occur in the future may be information transmitted by the SMF to the AMF.

4) When the terminal receives the PDU session modification command, the terminal may determine to initiate the PDU session establishment procedure (eg, the PDU session establishment procedure according to the examples of FIGS. 6a and 6b) for the same DN.

To this end, according to the SSC mode, the UE may generate a new PDU session ID. And, the UE may initiate a PDU session establishment request based on the new PDU session ID. For example, the UE may transmit a NAS request message (eg, a PDU session establishment request message) based on the new PDU session ID to the AMF. A new PDU session ID may be included in a PDU session ID field in a NAS request message (eg, a PDU session establishment request message), and an existing PDU session ID indicating an existing PDU session to be released may also be included in the NAS request message.

When SMF reallocation is requested according to step 2), the AMF may select another SMF (eg, SMF 2 in FIG. 11). Otherwise, the AMF may transmit an Nsmf_PDUSession_CreateSMContext request message to the same SMF (eg, SMF 1 in FIG. 11) in charge of the existing PDU session ID.

The AMF may include both the new PDU session ID of the new PDU session and the existing PDU session ID of the existing PDU session in the Nsmf_PDUSession_CreateSMContext request message. The SMF may determine that the PDU establishment request is associated with step 2) based on the existence of the existing PDU session ID in the Nsmf_PDUSession_CreateSMContext request message. The SMF may store a new PDU session ID and select a new PDU session anchor (eg, UPF2 in FIG. 11).

When runtime coordination between 5GC and AF is enabled based on local configuration, according to the "AF acknowledgment to be expected" indication sent by AF to SMF while subscribing to SMF event, SMF may transmit late notification message to the AF, and the SMF may wait response from the AF. When the SMF receives a negative notification response from the AF (eg, when receiving a negative response message, the SMF may terminate the procedure of FIG. 11. Otherwise (eg, when the SMF receives an affirmative response message from the AF), the above The SMF may perform the following procedure to activate the UP path of a new PDU session.

The SMF node (eg, SMF 1) may receive an affirmative notification response from the AF, and may transmit a PDU session establishment request accept message to the terminal. In this case, the SMF node (eg, SMF 1) may include information that allows the IP address of the changed application server or information enabling the terminal to extract (or obtain) the IP address of the changed application server in the NAS PCO in the PDU session establishment request accept message.

The terminal may obtain the IP address of the changed application server based on the information received from the SMF. In addition, the terminal may transmit information on the changed IP address of the application server to the application layer of the terminal. For example, the NAS layer of the terminal may obtain the IP address of the changed application server included in the NAS PCO of the PDU session modification command based on the PDU session modification command received from the SMF, and may deliver the obtained IP address to the application layer of the terminal.

When the SMF node (eg, SMF 1) receives a negative notification response from the AF, the SMF node may transmit a PDU session establishment request rejection message to the terminal. In this case, the SMF may include a cause directly or indirectly implying (or indicating) that the change of the application server is not successful in the PDU session establishment request rejection message and may transmit it to the terminal. In addition, the SMF node may perform an operation to prevent release from the previous PDU session. For example, the SMF node may adjust the PDU session release timer value.

The UE may delete or update the PDU session address lifetime value received in step 3) based on the PDU session establishment request rejection message transmitted by the SMF node (eg, SMF 1) (eg, changing PDU session address lifetime value to 0, or updating the PDU session address lifetime value to another value). The UE may update the PDU session address lifetime value to a value for preventing the previous PDU session from being released. The UE can prevent the release of the previous PDU session (the PDU session associated with UPF 1 in FIG. 11) by deleting or updating the PDU session address lifetime value.

5) After the new PDU session is established, the UE uses the IP address/prefix associated with the new PDU session for all new traffic, and may transfer the existing traffic flow from the previous PDU session to the new PDU session.

6) Before the timer (a timer based on the PDU session address lifetime value received in step 3) expires (e.g., when the UE aggregates all traffic for a new PDU session or the existing PDU session is no longer needed), the previous PDU session may be released by the terminal. Alternatively, the previous PDU session may be released by the SMF according to the expiration of the timer.

<Procedures Related to the Addition of a Branching Point or UL CL and Additional PDU Session Anchors>

The following drawings were created to explain a specific example of the present specification. The names of specific devices described in the drawings or the names of specific signals/messages/fields are presented by way of example, so that the technical features of the present specification are not limited to the specific names used in the following drawings.

Figure 12:
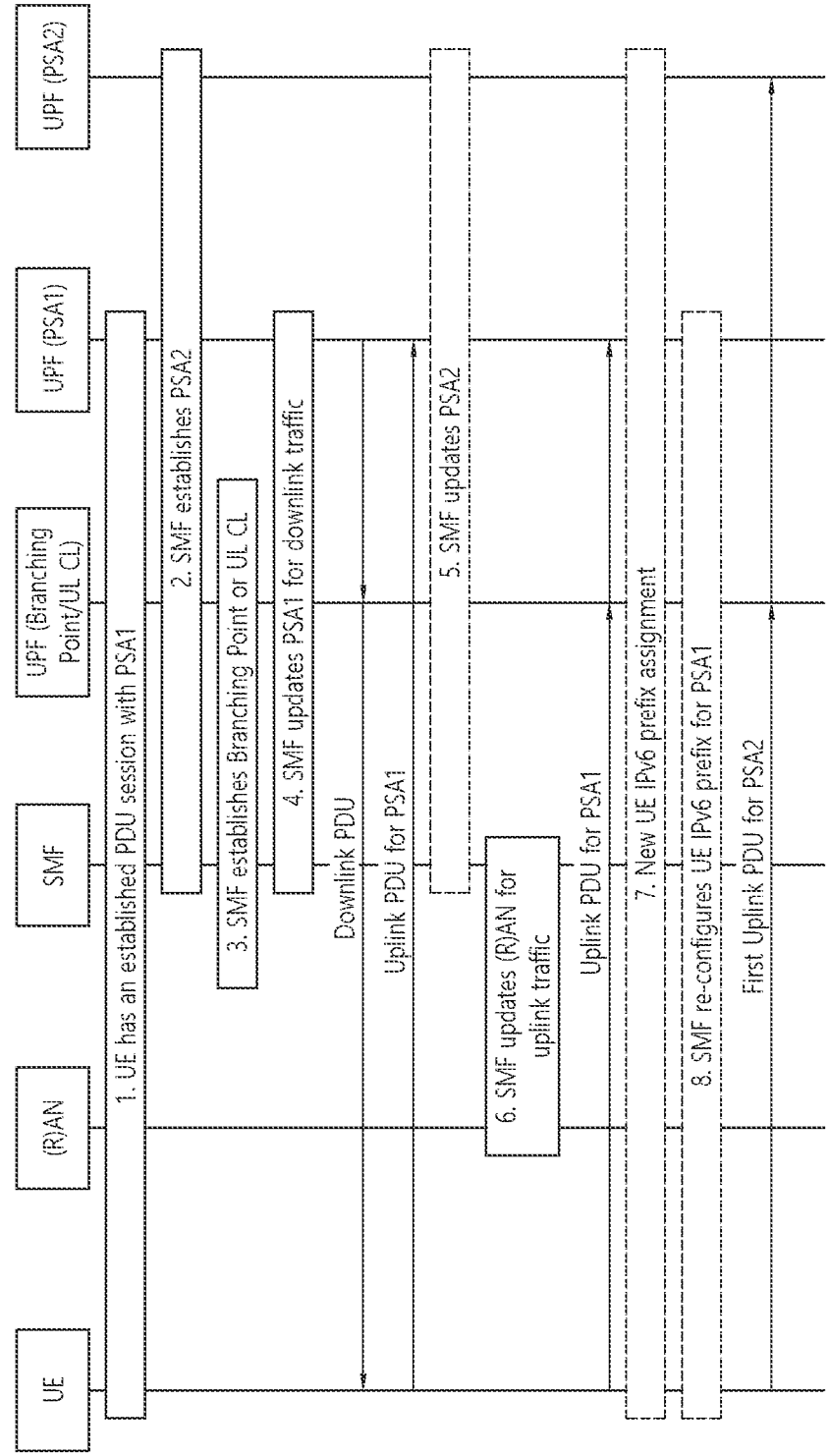
FIG. 12 shows an example of a procedure related to the addition of a branching point or UL CL and an additional PDU session anchor according to the disclosure of the present specification.

FIG. 12 Shows an Example of a Procedure Related to the Addition of a Branching Point or UL CL and an Additional PDU Session Anchor According to the Disclosure of the Present Specification.

The example of FIG. 12 shows an example of a procedure for adding a branching point or UL CL and an additional PDU session anchor to an established PDU session.

1) The UE has an established PDU session with a UPF including PDU session anchor 1 (eg, UPF (PSA1) in FIG. 12). The user plane (UP) of the PDU session may include an access network (AN) and a PDU session anchor 1.

2-0) Although not shown in FIG. 12, step 2-0 may be performed by a network (eg, SMF 1 in FIG. 12) after step 1) is performed and before step 2) is performed. The SMF node may determine whether to transmit a notification message to the AF and whether to transmit information requesting the IP address of the changed application server, based on the capability information of the terminal, the location information of the terminal obtained from the AMF, the information of the PDU session related to the AF notification, the service information (eg, UP management event notification service) to which the AF has subscribed in advance, and the policy set in advance.

2) SMF may decide to establish a new PDU session anchor. For example, due to UE mobility, new flow detection, etc., the SMF may decide to establish a new PDU session anchor. The SMF may select the UPF and establish a new PDU session anchor 2 (eg, PSA2 in FIG. 12) using the N4 reference point. In case of an IPv6 multi-homing PDU session, the SMF may allocate a new IPv6 prefix corresponding to PSA2. In addition, when the PCF subscribes to the IP allocation/release event, the SMF may perform a session management policy modification procedure in order to provide the newly allocated IPv6 prefix to the PCF.

When runtime coordination between 5GC and AF is enabled based on local configuration, according to the "AF acknowledgment to be expected" indication sent by AF to SMF while the AF subscribing to SMF event, after new PSA After (PSA2 of FIG. 12) is selected, the SMF may transmit an Early Notification to the AF. Then, the SMF may wait for a response from the AF before configuring a new PSA. When the SMF receives a negative notification response from the AF, the SMF may stop the procedure of FIG. 12.

3) The SMF may select the UPF, establish a branching point (in case of IPv6 multi-homing) using the N4 reference point, or select a UL CL for a PDU session. The SMF may provide an uplink forwarding rule including PSA1 CN tunnel information and PSA2 CN tunnel information to PSA1 and PSA2. Additionally, AN tunnel information may be transmitted for downlink forwarding. In the case of IPv6 multi-homing, the SMF can provide a traffic filter indicating which traffic should be directed to PSA1 and PSA2 respectively. The traffic filter may be a traffic filter for IPv6 prefixes corresponding to PSA1 and PSA2.

In the case of UL CL, the SMF may provide a traffic filter indicating which traffic should be delivered to PSA1 and PSA2 respectively. When runtime coordination between 5GC and AF is enabled based on local configuration, according to the "AF acknowledgment to be expected" indication sent by AF to SMF while the AF subscribing to SMF event, SMF may transmit Late Notification to the AF, and may wait a response from the AF. When the SMF receives a negative notification response from the AF, the SMF may stop the procedure of FIG. 12.

In case of UL CL (Uplink Classifier) scenario, the following operations may be performed:

When the SMF receives a positive notification response from the AF, the SMF may transmit information about the changed IP address of the application server to the terminal through an independent procedure (eg, PDU session establishment procedure) not shown in the procedure of FIG. 12. For example, so that the terminal can extract (or acquire) the IP address of the changed application server, the SMF may transmit a QoS rule including QoS parameters and a packet filter including the IP address of the changed application server to the terminal. For example, the QoS rule may be transmitted while being included in a PDU session establishment command transmitted from the SMF to the terminal.

When the SMF receives a negative notification response from the AF, the SMF may transmit a separate NAS message to the terminal. Here, the NAS message may include a cause that directly or indirectly implies (or indicates) that the change of the application server is not successful.

In the case of a Branching Point (IPv6 multi-homing) scenario, the following operations may be performed:

When the SMF receives an affirmative notification response message from the AF, the SMF may transmit information about the IP address of the changed application server to the terminal through an independent procedure (eg, PDU session establishment procedure) not shown in the procedure of FIG. 12. For example, so that the terminal can extract (or acquire) the IP address of the changed application server, the SMF may transmit a QoS rule including QoS parameters and a packet filter including the IP address of the changed application server to the terminal. For example, the QoS rule may be transmitted while being included in a PDU session establishment command transmitted from the SMF to the terminal. Alternatively, in the step of transmitting the IPv6 prefix for allocating the new IP address of the terminal, the SMF may transmit information related to the changed IP address of the application server, by using the IPv6 router advertisement message (eg, a method such as including information indicating the IP address related to the IPv6 prefix is not the IP address of the terminal, but the IP address of the changed application server, or a method such as adding a field related to the IP address of the changed application server may be used).

When the SMF receives a negative notification response from the AF, the SMF may transmit a separate NAS message to the terminal. Here, the NAS message may include a cause that directly or indirectly implies (or indicates) that the change of the application server is not successful.

For reference, if the branching point or UL CL and PSA2 are co-located in one UPF, steps 2 and 3 may be merged. If a branching point has already been allocated, step 3 may be omitted.

4) SMF may update PSA1 through N4 reference point. The SMF may provide branching point or UL CL CN tunnel information for downlink traffic. For reference, if the branching point or UL CL and PSA1 are co-located in one UPF, steps 3 and 4 may be merged.

5) SMF may update PSA2 through N4 reference point. The SMF provides branching point or UL CL CN tunnel information for downlink traffic. For reference, if the branching point or UL CL and PSA2 are co-located in one UPF, step 5 may not be performed.

6) SMF may update (R)AN through N2 SM information on N11 reference point. The SMF may provide new CN (Core Network) tunnel information corresponding to UPF (branching point or UL CL). In the case of UL CL, when an existing UPF exists between UL CLs in which (R)AN is newly inserted, the SMF may update the existing UPF instead of the updated (R)AN.

7) In case of IPv6 multi-homing, the SMF informs the UE of the availability of a new IP prefix in PSA2. In addition, the SMF may transmit an IPv6 multi-home routing rule to the terminal according to the IPv6 prefix.

When runtime coordination between 5GC and AF is enabled based on local configuration, according to the "AF acknowledgment to be expected" indication included in AF's subscription to an SMF event, the SMF may transmit Late Notification may to the AF, and the SMF may wait a response from the AF before transmitting a new IP prefix to the UE. If the SMF receives a negative notification response from the AF, the SMF may stop the procedure.

In the case of a Branching Point (IPv6 multi-homing) scenario, the following operations may be performed:

When the SMF receives an affirmative notification response message from the AF, the SMF may transmit information about the IP address of the changed application server to the terminal through an independent procedure (eg, PDU session establishment procedure) not shown in the procedure of FIG. 12. For example, so that the terminal can extract (or acquire) the IP address of the changed application server, the SMF may transmit a QoS rule including QoS parameters and a packet filter including the IP address of the changed application server to the terminal. For example, the QoS rule may be transmitted while being included in a PDU session establishment command transmitted from the SMF to the terminal. Alternatively, in the step of transmitting the IPv6 prefix for allocating the new IP address of the terminal, the SMF may transmit information related to the changed IP address of the application server, by using the IPv6 router advertisement message (eg, a method such as including information indicating the IP address related to the IPv6 prefix is not the IP address of the terminal, but the IP address of the changed application server, or a method such as adding a field related to the IP address of the changed application server may be used).

When the SMF receives a negative notification response from the AF, the SMF may transmit a separate NAS message to the terminal. Here, the NAS message may include a cause that directly or indirectly implies (or indicates) that the change of the application server is not successful.

8) In the case of IPv6 multi-homing, the SMF may reconfigure the UE for the original IP prefix in PSA1. The SMF may transmit an IPv6 multi-home routing rule to the terminal according to the IPv6 prefix.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 13:
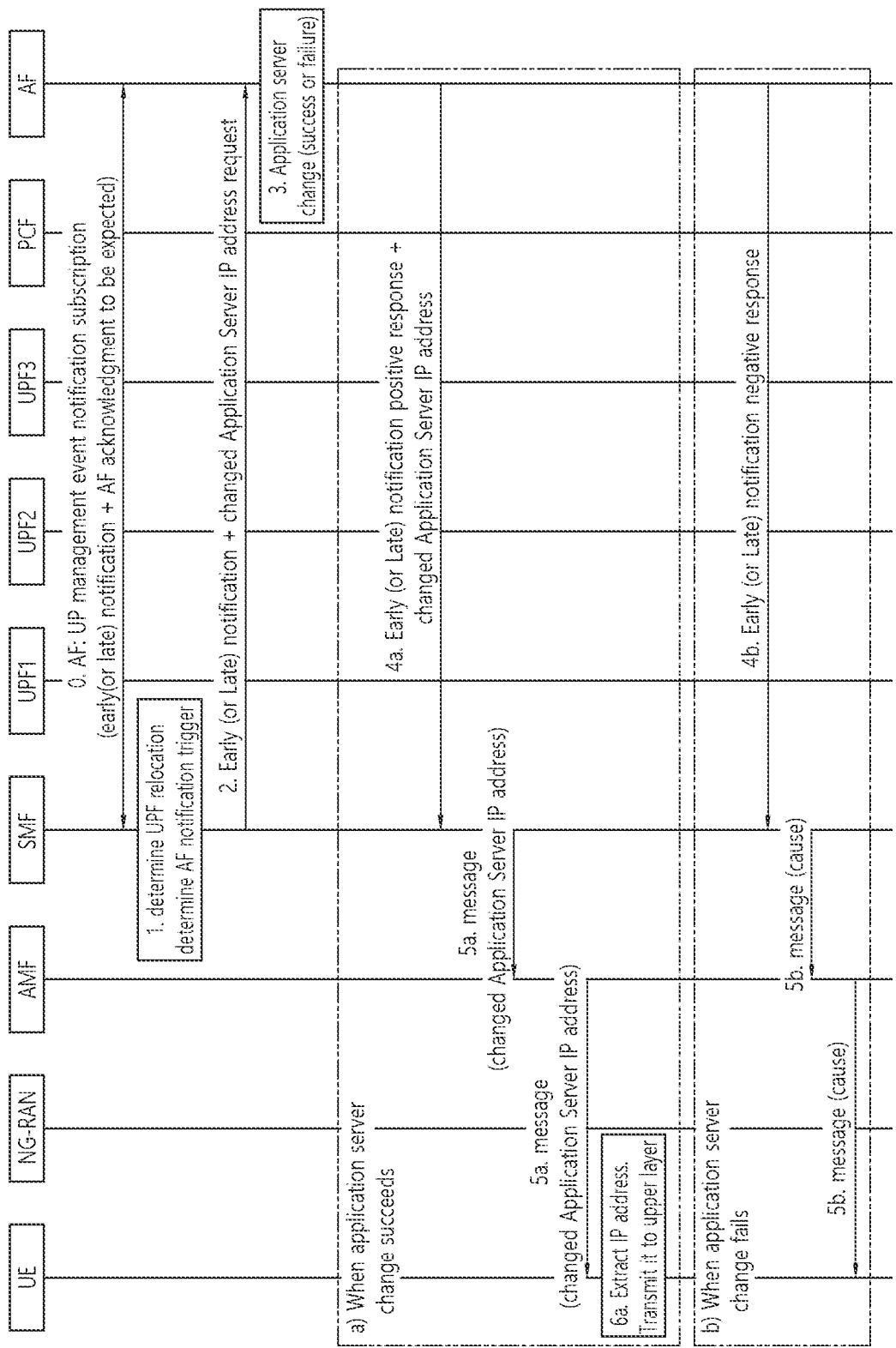
FIG. 13 shows an example of operation of a terminal and a network according to the disclosure of the present specification.

FIG. 13 Shows an Example of Operation of a Terminal and a Network According to the Disclosure of the Present Specification.

FIG. 13 shows an example of terminal and network operation according to the disclosure of the present specification. The operations shown in FIG. 13 are only examples, and although not shown in FIG. 13, the terminal and the network may perform the operations described herein.

0) AF may be in a state of subscribing to a service for UP management event notification for SMF. When the AF requests to subscribe to the service for UP management event notification, the AF may request early notification or late notification from the SMF. In addition, the AF may transmit an "AF acknowledgment to be expected" indication to the SMF. The "AF acknowledgment to be expected" indication may be used to cause the SMF to wait for a response from the AF after the SMF sends an early notification or a late notification to the AF.

1) The SMF may determine the UPF relocation. For example, the SMF may determine to relocate UPF1 to UPF 2 or UPF 3 for a PDU session related to UPF 1. Then, the SMF may determine AF notification triggering. Since the AF requested to subscribe to the UP management event notification in step 0), the SMF may trigger the AF notification when the UPF relocation is determined.

2) The SMF may transmit an early notification message or a late notification message. In this case, the SMF may also transmit information requesting the changed IP address information of the application server.

When the SMF transmits an early notification message, the SMF may perform an operation related to relocation of the UPF (eg, transmission of a PDU session modification command message, etc.) after receiving a notification response from the AF.

When the SMF transmits the late notification message, the SMF may transmit the late notification message to the AF after performing an operation related to relocation of the UPF (eg, transmission of a PDU session modification command message, etc.).

3) AF may perform an operation for changing the application server based on the early notification message or the late notification message received from the SMF. AF may succeed in changing the application server or may fail in changing the application server.

When AF succeeds in changing the application server, operations 4a to 6a shown in FIG. 13 may be performed.

When the AF fails to change the application server, the operations shown in 4b to 5b shown in FIG. 13 may be performed.

4a) If the AF succeeds in changing the application server, it may transmit an early (or late) notification acknowledgment message. The AF may transmit the IP address information of the changed application server based on the information requesting the IP address information of the changed application server from the SMF.

5a) The SMF may transmit a message including the changed IP address information of the application server to the terminal (eg, UE) through the AMF.

6a) The terminal may extract (or obtain) the IP address of the changed application server based on the message received from the SMF. In addition, the terminal may transmit the changed IP address of the application server to an upper layer (eg, an application layer). For example, the NAS layer of the terminal may obtain the IP address of the changed application server based on the message received from the SMF, and transmit the obtained IP address to the application layer.

4b) When the change of the application server fails, the AF may transmit an early (or late) notification negative response message to the SMF.

5b) The SMF may transmit a message including a cause value implying or indicating that the change of the application server has failed to the terminal via the AMF based on the reception of the negative response message from the AF. The terminal may recognize that the change of the application server has failed based on the received message, and may perform a necessary operation according to the failure of the change of the application server.

Hereinafter, various implementations according to the disclosure of the present specification are described.

IV. Various Implementations

Figure 14:
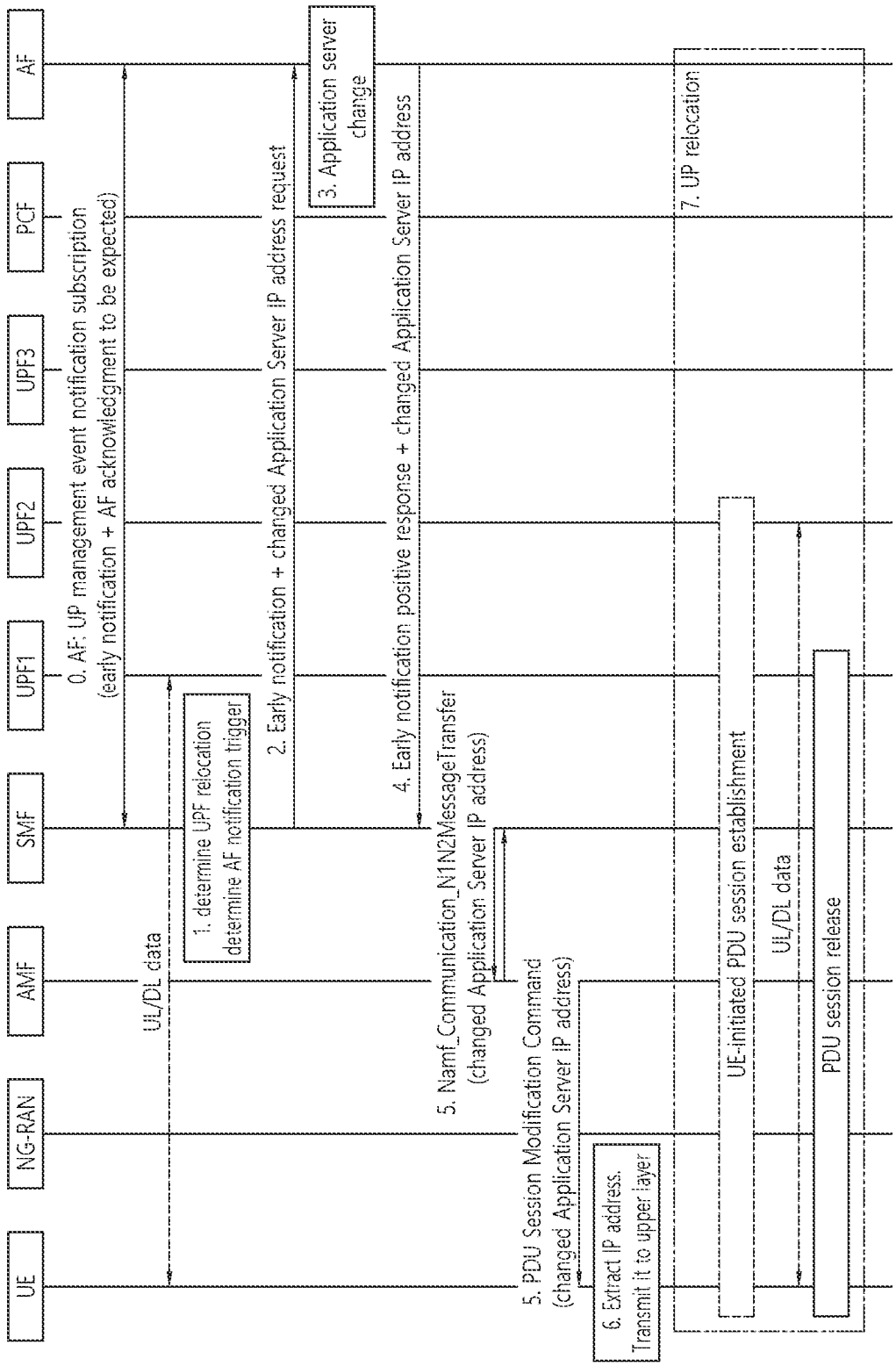
FIG. 14 shows a first example in which an early notification is transmitted in a procedure related to a change of a PDU session anchor in SSC mode 3 according to a first implementation example.
Figure 15:
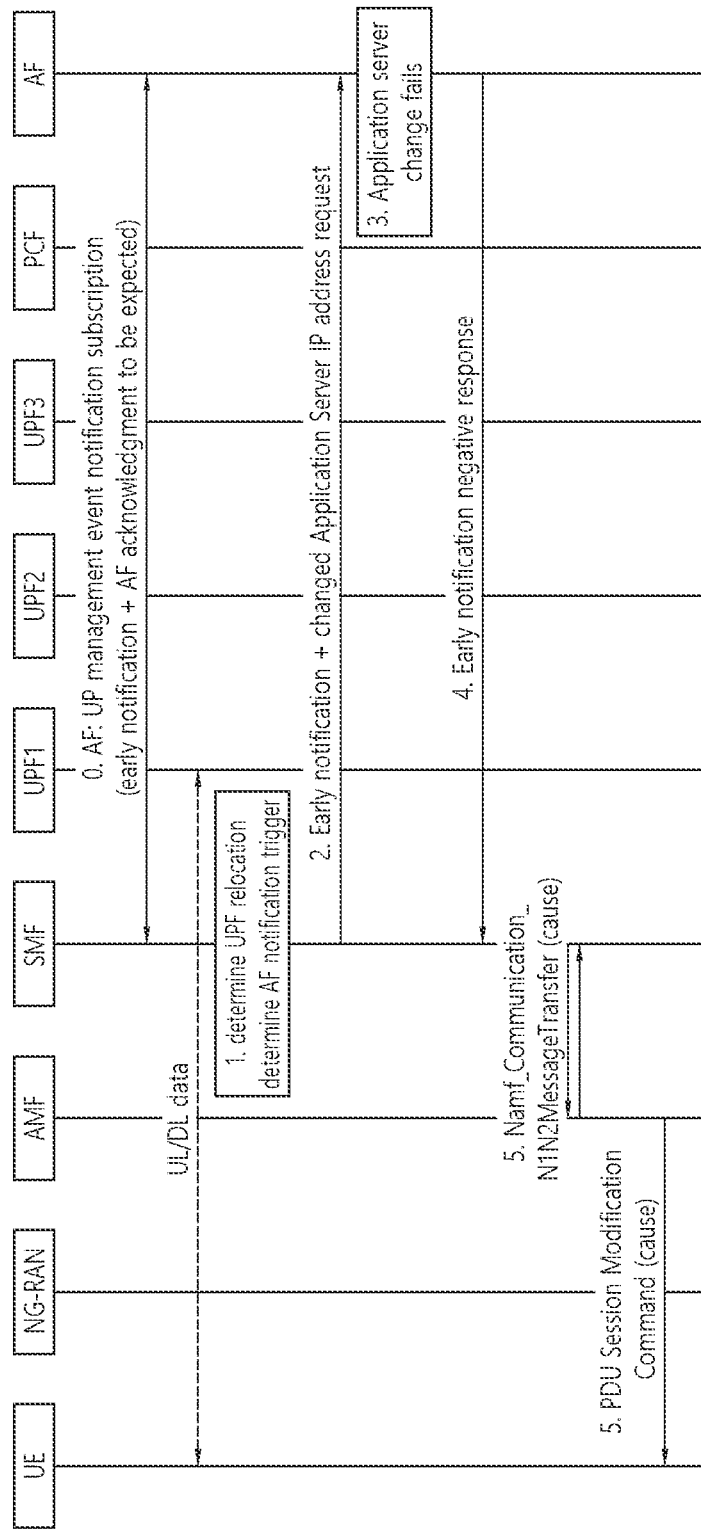
FIG. 15 shows a second example in which an early notification is transmitted in a procedure related to a change of a PDU session anchor in SSC mode 3 according to the first implementation example.

A first implementation example described with reference to FIGS. 14 and 15 shows an example in which an early notification is transmitted in a procedure related to a change of a PDU session anchor in SSC mode 3. The first example of FIG. 14 is an example when AF succeeds in changing the application server, and the second example of FIG. 15 is an example when AF fails to change the application server.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 14 Shows a First Example in which an Early Notification is Transmitted in a Procedure Related to a Change of a PDU Session Anchor in SSC Mode 3 According to a First Implementation Example.

0) AF subscribed to the service for UP management event notification for SMF, and the terminal may be in a state of transmitting UL data or receiving DL data through the network and UPF 1.

The service for notification of the UP management event to which the AF subscribes may be, for example, a notification service for a change of the UP path associated with the identified traffic. The AF may transmit a subscription request message of the notification service for the change of the UP path associated with the identified traffic to the SMF. The subscription request message transmitted by the AF includes information on the type of subscription (A type of subscription), and may optionally include an "AF acknowledgment to be expected" indication.

Here, the type of subscription may include information on subscription for early notification and/or late notification. That is, AF's subscription may be a subscription for early notification and/or late notification. If the AF subscribes for early notification, the SMF may send a notification message to the AF before the (new) UP path is established. If the AF subscribes to late notification, the SMF may send a notification message to the AF after the (new) UP path is established.

Here, the "AF acknowledgment to be expected" indication may indicate that the AF provides a response to the notification of the UP path management event for 5GC. The SMF may decide to wait for a response message from the AF according to the "AF acknowledgment to be expected" indication. For example, in case of early notification, the SMF may decide to wait for a response message from the AF before establishing a new UP path according to the "AF acknowledgment to be expected" indication. For example, in the case of late notification, the SMF may decide to wait for a response message from the AF before activating a new UP path, according to the "AF acknowledgment to be expected" indication.

1) The SMF may decide to relocate the UPF. In addition, the SMF node may determine whether to transmit a notification message to the AF and whether to transmit information requesting the changed IP address of the application server, based on the capability information of the terminal, the location information of the terminal obtained from the AMF, the information of the PDU session related to the AF notification, the service information (eg, UP management event notification service) to which the AF has subscribed in advance.

2) The SMF may transmit an early notification message and information requesting information on the IP address of the changed application server when the AF changes the application server, to the AF.

3) AF can change the application server. The change of the application server can be performed successfully.

4) Based on the information requesting the IP address of the changed application server sent by the SMF in step 2), AF may transmit an early notification positive response message (including information about the IP address of the changed application server) after a successful application server change.

5) The SMF may receive an early notification positive response message from the AF. The SMF may transmit a message including information on the changed IP address of the application server or information through which the terminal can extract (or obtain) the changed IP address of the application server to the terminal through the AMF. For example, the SMF may transmit a PDU session modification command message (including NAS PCO). The PDU session modification command message may be included in the Namf_Communication_N1N2MessageTransfer message and transmitted to the AMF. Here, the NAS PCO may include information on the changed IP address of the application server or information through which the terminal can extract (or obtain) the changed IP address of the application server.

6) The terminal may obtain information on the IP address of the changed application server based on the message received from the SMF. In addition, the terminal may transmit information on the IP address of the changed application server to the application layer. For example, the NAS layer of the terminal may obtain information on the IP address of the changed application server based on the PDU session modification command message, and transmit information about the IP address of the changed application server to the application layer of the terminal.

7) A subsequent procedure for UP relocation (eg, UPF relocation) may be performed. For example, to establish a new PDU session associated with UPF2, a UE-initiated PDU session establishment procedure for UPF2 may be performed. Then, the UE may transmit UL data and receive DL data through the PDU session associated with UPF2. And, in order to release the PDU session (the PDU session associated with UPF 1) before the UP relocation, a PDU session release procedure may be performed.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 15 Shows a Second Example in which an Early Notification is Transmitted in a Procedure Related to a Change of a PDU Session Anchor in SSC Mode 3 According to the First Implementation Example.

Among the procedures shown in FIG. 15, a description of a procedure overlapping with FIG. 14 will be omitted, and FIG. 15 will be described with a focus on differences from FIG. 14.

Steps 0) to 2) may be performed in the same manner as in FIG. 14.

3) Changing the application server may fail. That is, AF may fail to change the application server.
4) AF may transmit an early notification negative response message to the SMF.
5) The SMF may transmit a cause directly or indirectly implying (or indicating) that the change of the application server is not successful (or that it has failed) to the terminal through the AMF. For example, the SMF may transmit a NAS message (eg, a Namf_Communication_N1N2MessageTransfer message) including the cause to the AMF. Then, the AMF may transmit the NAS message including the cause to the terminal. For example, the NAS message transmitted by the SMF may include a PDU session modification command message or a PDU session release command message. The terminal may recognize the fact that the change of the application server has failed based on the cause.

After the UE recognizes that the change of the application server has failed, the PDU session release procedure for the corresponding PDU session (the PDU session related to UPF 1) may be performed. For example, if the PDU session anchor was to be changed from UPF 1 to UPF 2 by the decision of the SMF, but the change of the application server fails, the corresponding PDU session is released. For example, when the terminal receives the PDU session modification command message including the cause, the terminal and the network node (eg, SMF, UPF, etc.) transmit a corresponding PDU session release request message to the SMF to perform the PDU session release procedure. can do. As another example, when the terminal receives the PDU session release command message including the cause, the terminal and the network node (eg, SMF, UPF, etc.) may perform the corresponding PDU session release procedure. The reason why the PDU session release procedure is performed is that the change of the application server fails when the SMF determines that UPF relocation is necessary. For example, in this situation, in order for the terminal to receive an appropriate service at the application level and the core level, the application server needs to be changed, and a PDU session related to the changed application server and UPF 2 needs to be established. However, since the change of the application server has failed, the terminal needs to perform application-level communication through the PDU session related to UPF 1, so that the synchronization between the application level and the core level is not well matched. For this reason, since the terminal cannot receive an appropriate service even at the core level, a PDU session release procedure for releasing the PDU session related to PDU 1 may be performed at the core level. Alternatively, in steps 7 to 9 of an example FIG. 17, after the terminal recognizes that the change of the application server has failed, the PDU session release procedure for the corresponding PDU session is not performed, but a procedure for preventing the release of the corresponding PDU session may be performed.

Figure 16:
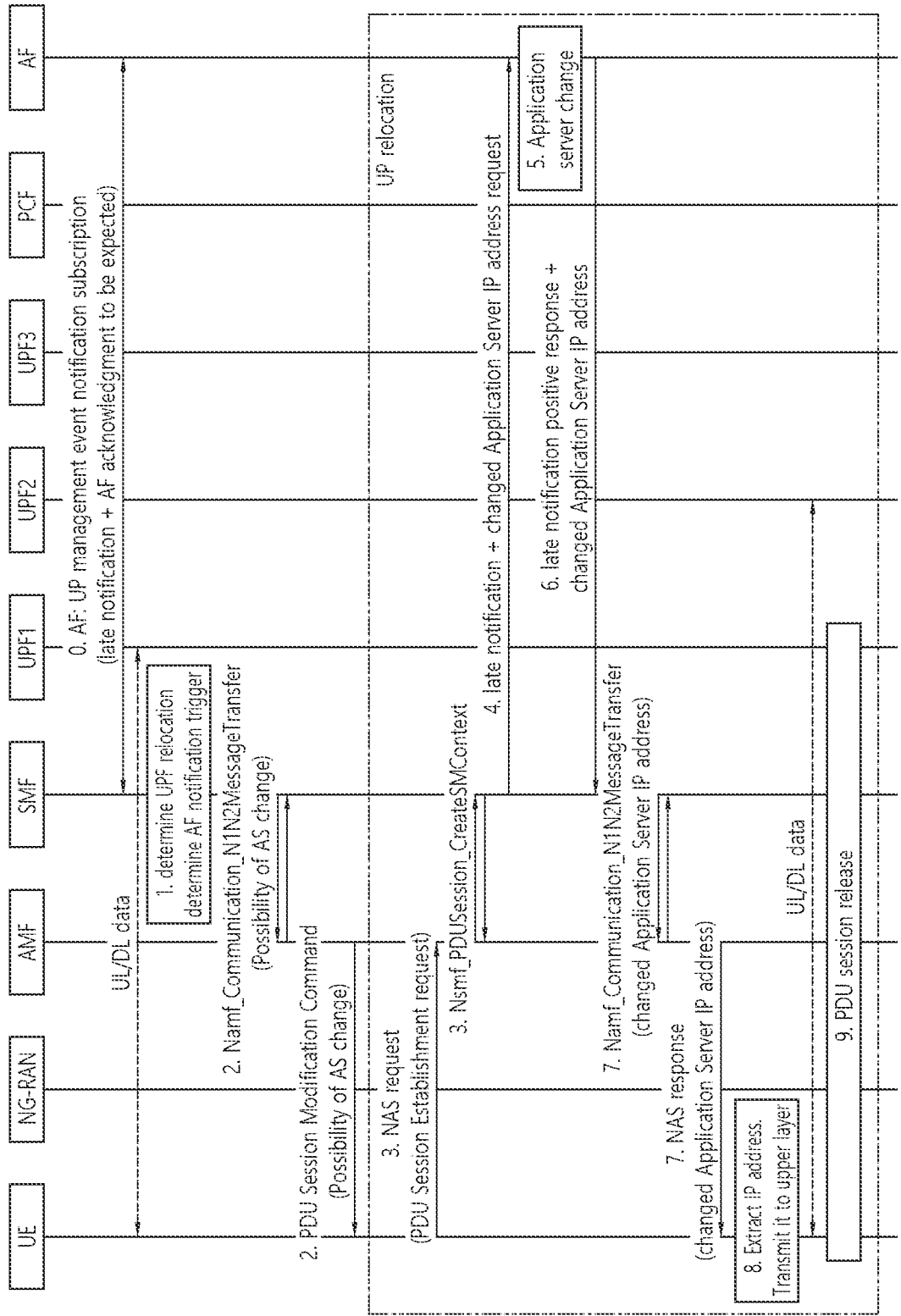
FIG. 16 shows a first example in which a late notification is transmitted in a procedure related to a change of a PDU session anchor in SSC mode 3 according to a second implementation example.
Figure 17:
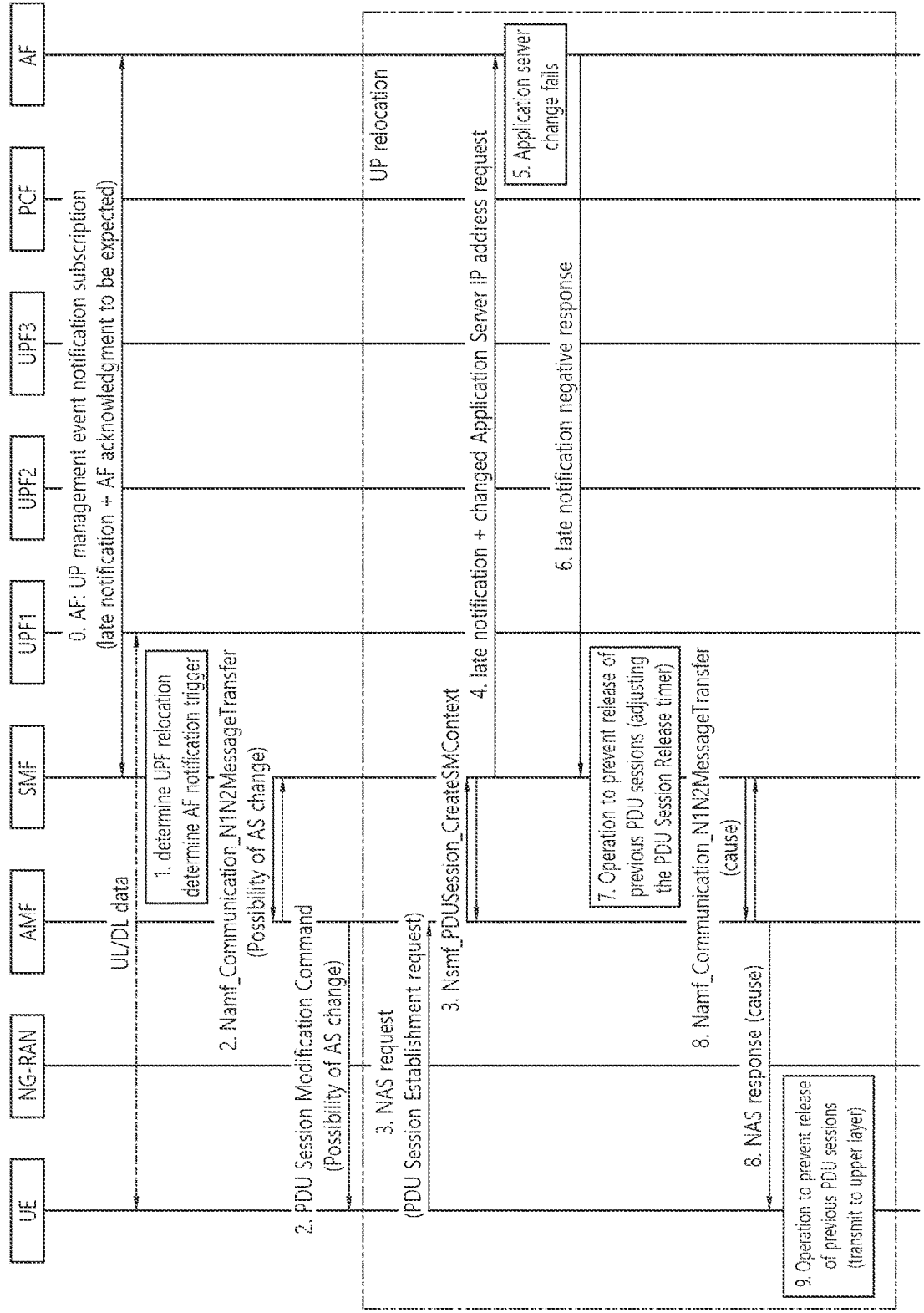
FIG. 17 shows a second example in which a late notification is transmitted in a procedure related to a change of a PDU session anchor in SSC mode 3 according to a second implementation example.

Hereinafter, a second implementation example described with reference to FIGS. 16 and 17 shows an example in which a late notification is transmitted in a procedure related to a change of a PDU session anchor in SSC mode 3. The first example of FIG. 16 is an example when AF succeeds in changing the application server, and the second example of FIG. 17 is an example when AF fails to change the application server.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 16 Shows a First Example in which a Late Notification is Transmitted in a Procedure Related to a Change of a PDU Session Anchor in SSC Mode 3 According to a Second Implementation Example.

Among the procedures shown in FIG. 16, a description of a procedure overlapping with FIG. 14 will be omitted, and FIG. 16 will be described with a focus on differences from FIG. 14.

0) AF subscribed to the service for UP management event notification for SMF, and the terminal may be in a state of transmitting UL data or receiving DL data through the network and UPF 1.

The service for notification of the UP management event to which the AF subscribes may be, for example, a notification service for a change of the UP path associated with the identified traffic. The AF may transmit a subscription request message of the notification service for the change of the UP path associated with the identified traffic to the SMF. The subscription request message transmitted by the AF includes information on the type of subscription (A type of subscription), and may optionally include an "AF acknowledgment to be expected" indication. For reference, information on the type of subscription and the description of the "AF acknowledgment to be expected" indication may be applied in the same manner as described with reference to FIG. 14.

The AF may transmit a service subscription request message for UP management event notification to the SMF. The subscription request message transmitted in step 0) may include the type of subscription including information on the subscription for late notification and an "AF acknowledgment to be expected" indication.

1) The SMF may decide to relocate the UPF. In addition, the SMF node may determine whether to transmit a notification message to the AF and whether to transmit information requesting the changed IP address of the application server, based on the capability information of the terminal, the location information of the terminal obtained from the AMF, the information of the PDU session related to the AF notification, the service information to which the AF has subscribed in advance (eg, UP management event notification service), and policy set in advance.

2) Since the AF has requested late notification, after the SMF performs a procedure related to UP relocation, the SMF transmits a late notification message to the AF and the SMF cannot obtain the changed IP address of the application server until it receives a late notification response message from the AF. Therefore, in step 2), since the IP address of the changed application server cannot be transmitted to the terminal, the SMF can directly or indirectly transmit information that the change of the application server is likely to occur in the future to the terminal. For example, the SMF may transmit a Namf_Communication_N1N2MessageTransfer message including information related to changeability of an application server (AS) to the AMF. Then, the AMF may transmit a PDU session modification command message including information related to changeability of the AS to the terminal. The PDU session modification command message may include a cause and a PCO. The PCO may include a PDU Session Address Lifetime value.

3) Upon receiving the PDU session modification command message, the terminal may initiate a UE-initiated PDU session establishment procedure for UP relocation. For example, the terminal may transmit a NAS request message including a PDU session establishment request message (including information requesting establishment of a PDU session related to UPF2) to the AMF. Then, the AMF may transmit a PDU session establishment request message to the SMF by sending the Nsmf_PDUSession_CreateSMContext message to the SMF.

4) The SMF may transmit information requesting information on the IP address of the changed application server to the AF when the application server is changed together with the late notification message.

5) AF can change the application server. The change of the application server can be performed successfully.

6) Based on the information requesting the IP address of the changed application server sent by the SMF in step 4), AF may trasnmit an early notification acknowledgment message (including information about the IP address of the changed application server) after a successful application server change.

7) The SMF may receive an early notification acknowledgment message from the AF. The SMF may transmit a NAS response message including information on the changed IP address of the application server or information through which the terminal can extract (or obtain) the changed IP address of the application server to the terminal through the AMF. For example, the NAS response message may be a PDU session establishment request accept message (including NAS PCO). Here, the NAS PCO may include information on the changed IP address of the application server or information through which the terminal can extract (or obtain) the changed IP address of the application server.

8) The terminal may obtain information on the IP address of the changed application server based on the message received from the SMF. In addition, the terminal may transmit information on the changed IP address of the application server to the application layer. For example, the NAS layer of the terminal may obtain information on the IP address of the changed application server based on the PDU session establishment request accept message, and transmit information about the IP address of the changed application server to the application layer of the terminal.

9) A subsequent procedure for UP relocation (eg, UPF relocation) may be performed. For example, a procedure (eg, PDU session release procedure) for releasing a PDU session (eg, a PDU session associated with UPF1) that existed before new UP relocation is performed may be performed.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 17 Shows a Second Example in which a Late Notification is Transmitted in a Procedure Related to a Change of a PDU Session Anchor in SSC Mode 3 According to a Second Implementation Example.

Among the procedures shown in FIG. 17, a description of a procedure overlapping with FIG. 16 will be omitted, and FIG. 17 will be described with a focus on differences from FIG. 16.

Steps 0) to 4) are the same as steps 0) to 4) of FIG. 16.

5) Changing the application server may fail. That is, AF may fail to change the application server.

6) AF may transmit an early notification negative response message to the SMF.

7) The SMF may perform an operation to prevent a PDU session (a PDU session associated with UPF 1) that existed before the operation related to UP relocation is performed from being released. For example, the SMF may adjust the PDU session release timer value.

8) The SMF may transmit a cause directly or indirectly implying (or indicating) that the change of the application server is not successful (or that it has failed) to the terminal through the AMF. For example, the SMF may transmit a Namf_Communication_N1N2MessageTransfer message (eg, including a PDU session establishment request rejection message) including the cause to the AMF. Then, the AMF may transmit a NAS response message (eg, a PDU session establishment request rejection message) including the cause to the terminal.

9) The UE may perform an operation to prevent a previously existing PDU session (a PDU session associated with UPF 1) from being released based on the cause. For example, the terminal may deliver the cause to a higher layer (eg, an application layer). The UE may update the PDU session address lifetime value received in step 2). For example, the UE may update the PDU session address lifetime value to a value for preventing the PDU session associated with UPF 1 from being released.

Figure 18:
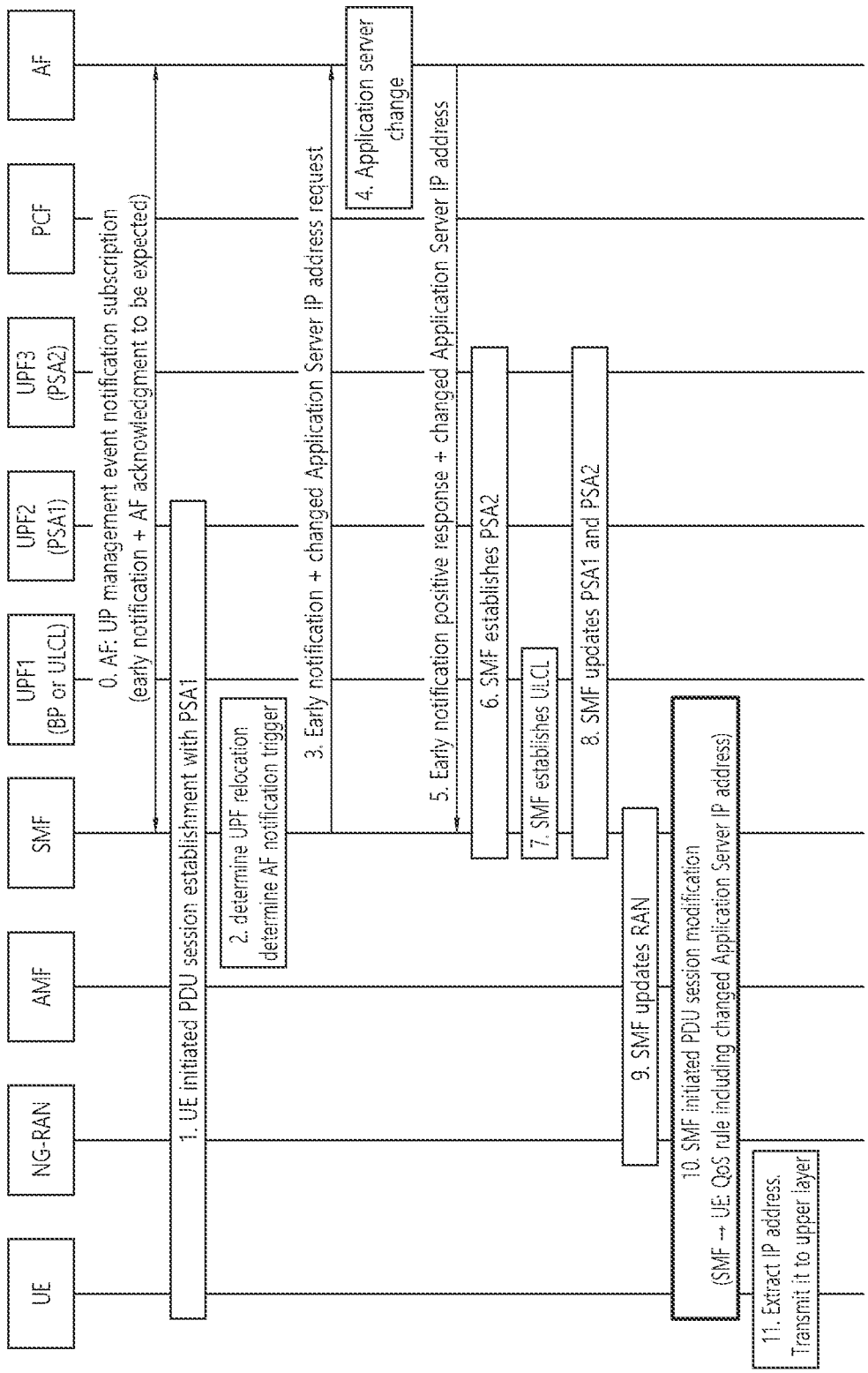
FIG. 18 illustrates a first example in which an early notification is transmitted in a procedure related to addition of a UL CL and an additional PDU session anchor according to a third implementation example.
Figure 19:
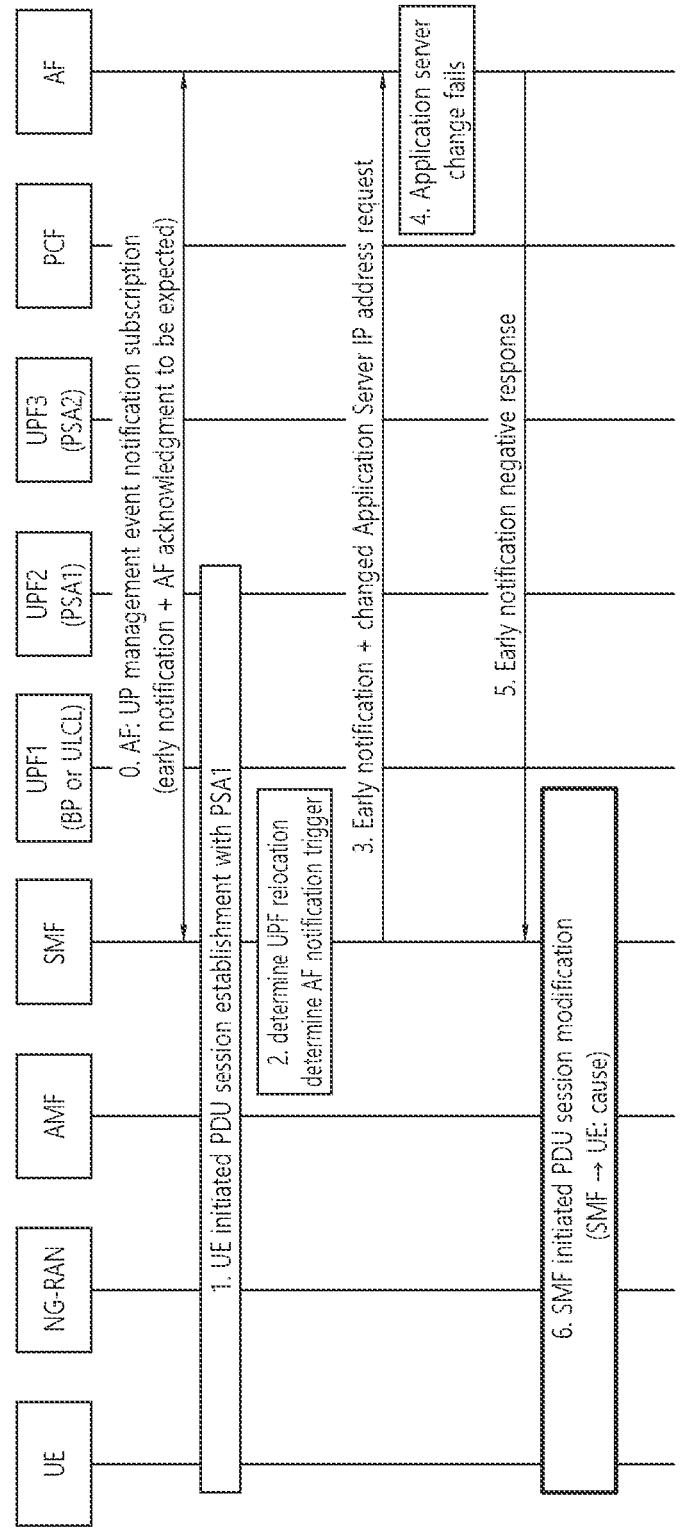
FIG. 19 illustrates a second example in which an early notification is transmitted in a procedure related to addition of a UL CL and an additional PDU session anchor according to a third implementation example.

Hereinafter, a third implementation example described with reference to FIGS. 18 and 19 shows an example in which an early notification is transmitted in a procedure related to addition of a UL CL and an additional PDU session anchor. The first example of FIG. 18 is an example when AF succeeds in changing the application server, and the second example of FIG. 19 is an example when AF fails to change the application server.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 18 Illustrates a First Example in which an Early Notification is Transmitted in a Procedure Related to Addition of a UL CL and an Additional PDU Session Anchor According to a Third Implementation Example.

0) AF may be in a state of subscribing to a service for UP management event notification for SMF.

The service for notification of the UP management event to which the AF subscribes may be, for example, a notification service for a change of the UP path associated with the identified traffic. The AF may transmit a subscription request message of the notification service for the change of the UP path associated with the identified traffic to the SMF. The subscription request message transmitted by the AF includes information on the type of subscription (A type of subscription), and may optionally include an "AF acknowledgment to be expected" indication. For reference, information on the type of subscription and the description of the "AF acknowledgment to be expected" indication may be applied in the same manner as described with reference to FIG. 14.

The AF may transmit a service subscription request message for UP management event notification to the SMF. The subscription request message transmitted in step 0) may include the type of subscription including information on subscription for early notification and an "AF acknowledgment to be expected" indication.

1) The UE may perform a UE-initiated PDU session establishment procedure for connection with PSA1. For example, the terminal may transmit a PDU session establishment request message to the SMF through the AMF
2) The SMF may decide to relocate the UPF. In addition, the SMF node may determine whether to transmit a notification message to the AF and whether to transmit information requesting the IP address of the changed application server, based on the capability information of the terminal, the location information of the terminal obtained from the AMF, the information of the PDU session related to the AF notification, the service to which the AF has subscribed in advance (eg, UP management event notification service) information, and policy set in advance.
3) The SMF may transmit an early notification message and information requesting information on the IP address of the changed application server when the AF changes the application server, to the AF.
4) AF may change the application server. The change of the application server can be performed successfully.
5) Based on the information requesting the IP address of the changed application server sent by the SMF in step 3), AF may transmit an early notification positive response message (including information on the IP address of the changed application server) after a successful application server change.
6) SMF may perform a procedure for UP relocation (eg, UPF relocation). For example, the SMF may perform a procedure for establishing a PSA2 node with UPF3.
7) SMF may perform the procedure for UP relocation. For example, the SMF may perform a procedure for establishing a UL CL node with UPF 1.
8) SMF may perform the procedure for UP relocation. For example, the SMF may update the setting of PSA1 and the setting of PSA2.
9) SMF may perform the procedure for UP relocation. For example, the SMF may update the settings of the RAN (eg, a base station).
10) Independently of the procedure described in steps 6) to 9) described above (ie, step 10) is performed before steps 6) to 9) are performed, or while steps 6) to 9) are being performed or may be performed after steps 6) to 9) are performed), the SMF may transmit the QoS rule to the UE through an independent procedure (eg, a PDU session modification procedure). For example, the SMF may transmit a PDU session modification command message including a QoS rule to the terminal. In order for the terminal to extract (or obtain) the IP address of the changed application server, the QoS rule may include a packet filter including the IP address of the changed application server and QoS parameters.
11) The terminal may obtain information on the IP address of the changed application server based on the message received from the SMF. In addition, the terminal may transmit information on the changed IP address of the application server to the application layer. For example, the NAS layer of the terminal may obtain information on the changed IP address of the application server based on the PDU session modification command message, and transmit information about the changed IP address of the application server to the application layer of the terminal.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 19 Illustrates a Second Example in which an Early Notification is Transmitted in a Procedure Related to Addition of a UL CL and an Additional PDU Session Anchor According to a Third Implementation Example.

Among the procedures shown in FIG. 19, descriptions of procedures overlapping those of FIG. 18 will be omitted, and FIG. 19 will be described with a focus on differences from FIG. 18.

Steps 0) to 3) are the same as steps 0) to 3) of FIG. 18.
4) Changing the application server may fail. That is, AF may fail to change the application server.
5) AF may transmit an early notification negative response message to the SMF.
6) The SMF may transmit a cause directly or indirectly implying (or indicating) that the change of the application server is not successful (or that it has failed) to the terminal through the AMF. For example, the SMF may transmit a NAS message including the cause to the terminal. For example, the NAS message transmitted by the SMF may include a PDU session modification command message or a PDU session release command message. As an example, the SMF may transmit the cause to the terminal using a PDU session modification procedure and a PDU session modification command message. The terminal may recognize the fact that the change of the application server has failed based on the cause. After the UE recognizes that the change of the application server has failed, the PDU session release procedure for the PDU session anchor (eg, UPF2 (PSA 1)) may be performed. For example, UPF 3 (PSA2) was scheduled to be added by SMF's decision, but if the change of the application server fails, the PDU session release procedure for releasing the corresponding PDU session (PDU session for UPF2 (PSA 1)) can be performed. For example, when the terminal receives the PDU session modification command message including the cause, the terminal and the network node (eg, SMF, UPF, etc.) may transmit a PDU session release request message to the SMF to perform the PDU session release procedure. As another example, when the terminal receives the PDU session release command message including the cause, the terminal and the network node (eg, SMF, UPF, etc.) may perform the corresponding PDU session release procedure. The reason why the PDU session release procedure is performed is that the change of the application server fails when the SMF determines that UPF relocation is necessary. For example, in this situation, in order for the terminal to receive an appropriate service at the application level and the core level, the application server needs to be changed, and a PDU session related to the changed application server and UPF 3 needs to be established. However, since the change of the application server has failed, the terminal needs to perform application-level communication through a PDU session related to UPF 2, so that the synchronization between the application level and the core level is not well matched. For this reason, since the terminal cannot receive an appropriate service even at the core level, a PDU session release procedure for releasing the PDU session related to UPF 2 may be performed at the core level.

Alternatively, as in the example of steps 7 to 9 of FIG. 17, after the terminal recognizes that the change of the application server has failed, the PDU session release procedure for the corresponding PDU session is not performed, and the release of the corresponding PDU session is performed, also procedures may be performed to prevent it.

Figure 20:
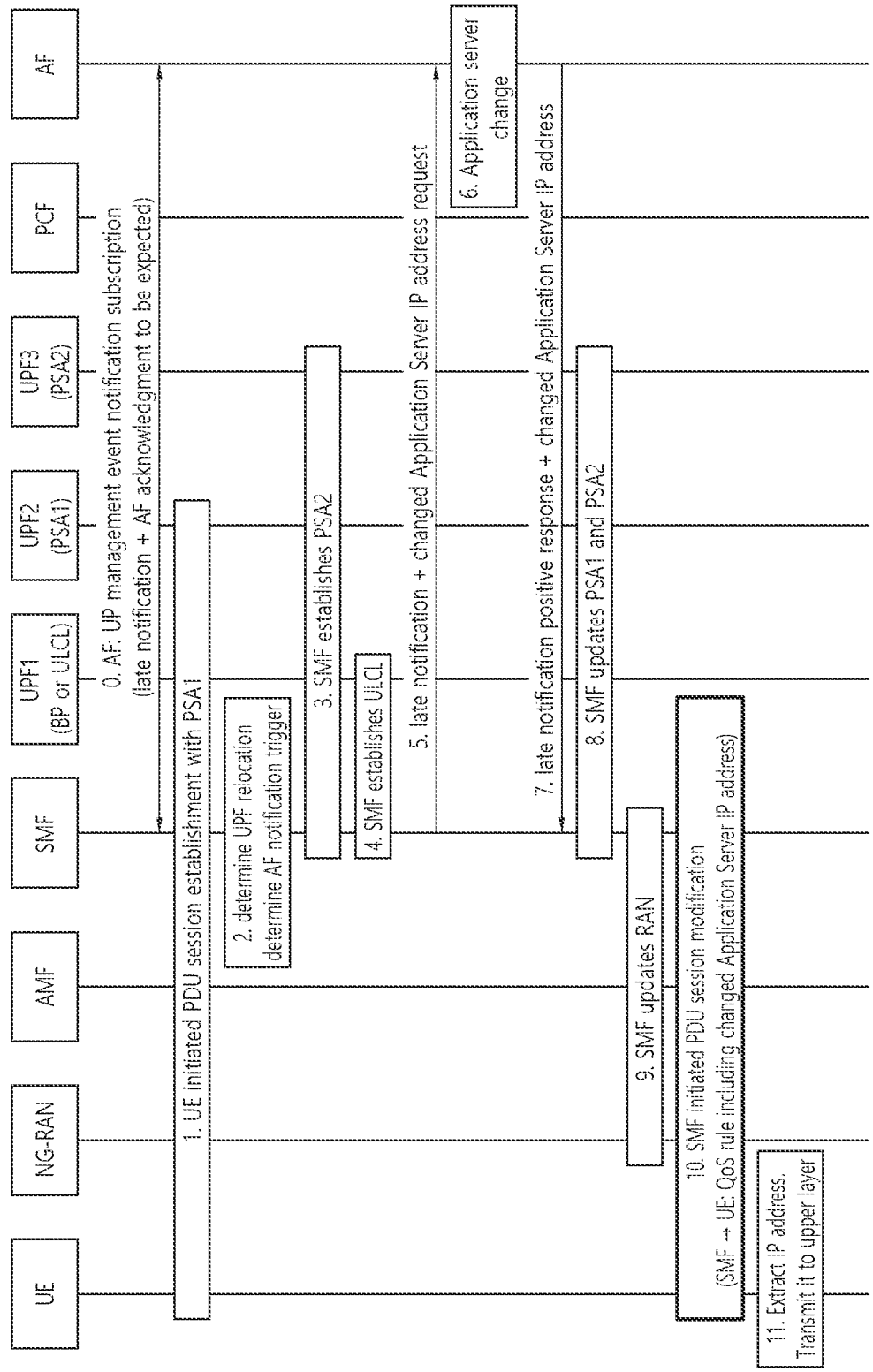
FIG. 20 shows a first example in which a late notification is transmitted in a procedure related to addition of a UL CL and an additional PDU session anchor according to a fourth implementation example.
Figure 21:
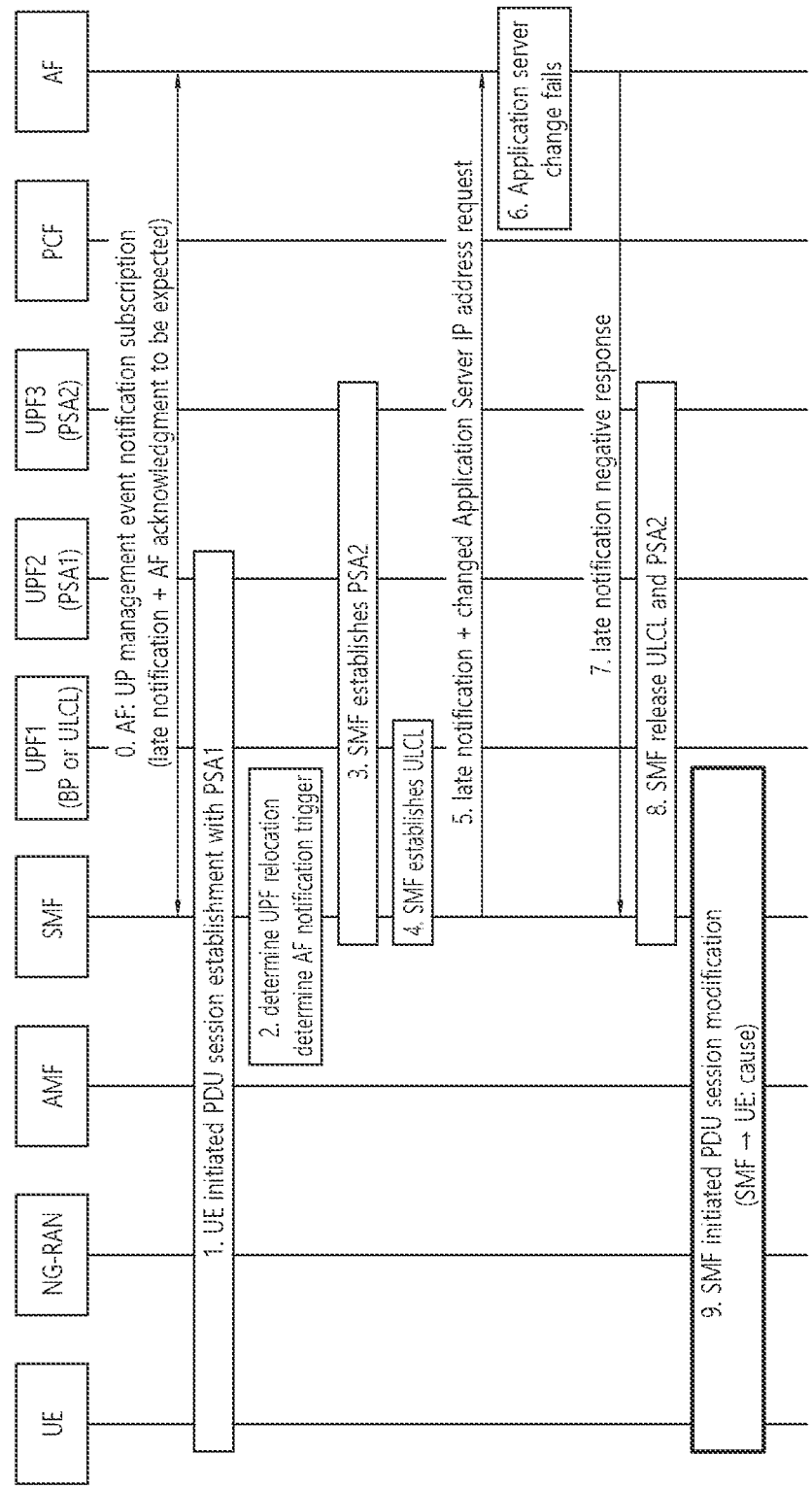
FIG. 21 shows a second example in which a late notification is transmitted in a procedure related to addition of a UL CL and an additional PDU session anchor according to a fourth implementation example.

Hereinafter, a fourth implementation example described with reference to FIGS. 20 and 21 shows an example in which a late notification is transmitted in a procedure related to addition of a UL CL and an additional PDU session anchor. The first example of FIG. 20 is an example when AF succeeds in changing the application server, and the second example of FIG. 21 is an example when AF fails to change the application server.

The following drawings were created to explain a specific example of the present specification. The names of specific devices described in the drawings or the names of specific signals/messages/fields are presented by way of example, so that the technical features of the present specification are not limited to the specific names used in the following drawings. FIG. 20 Shows a First Example in which a Late Notification is Transmitted in a Procedure Related to Addition of a UL CL and an Additional PDU Session Anchor According to a Fourth Implementation Example.

0) AF may be in a state of subscribing to a service for UP management event notification for SMF The service for notification of the UP management event to which the AF subscribes may be, for example, a notification service for a change of the UP path associated with the identified traffic. The AF may transmit a subscription request message of the notification service for the change of the UP path associated with the identified traffic to the SMF. The subscription request message transmitted by the AF may include includes information on the type of subscription (A type of subscription), and may optionally include an "AF acknowledgment to be expected" indication. For reference, information on the type of subscription and the description of the "AF acknowledgment to be expected" indication may be applied in the same manner as described with reference to FIG. 14.

The AF may transmit a service subscription request message for UP management event notification to the SMF. The subscription request message transmitted in step 0) may include the type of subscription including information on the subscription for late notification and an "AF acknowledgment to be expected" indication.

1) The UE may perform a UE-initiated PDU session establishment procedure for connection with PSA1. For example, the UE may transmit a PDU session establishment request message to the SMF through the AMF.

2) The SMF may decide to relocate the UPF. In addition, the SMF node may determine whether to transmit a notification message to the AF and whether to transmit information requesting the changed IP address of the application server, based on the capability information of the terminal, the location information of the terminal obtained from the AMF, the information of the PDU session related to the AF notification, the service to which the AF has subscribed in advance (eg, UP management event notification service) information, and policy set in advance.

3) SMF may perform a procedure for UP relocation (eg, UPF relocation). For example, the SMF may perform a procedure for establishing a PSA2 node with UPF3.

4) SMF may perform the procedure for UP relocation. For example, the SMF may perform a procedure for establishing a UL CL node with UPF1.

5) The SMF may transmit a late notification message and information requesting information on the IP address of the changed application server when the AF changes the application server, to the AF.

6) AF may change the application server. The change of the application server can be performed successfully.

7) Based on the information requesting the IP address of the changed application server sent by the SMF in step 5), AF may transmit a late notification acknowledgment message (including information on the IP address of the changed application server) after successful application server change.

8) SWF may perform the procedure for UP relocation. For example, the SMF may update the setting of PSA1 and the setting of PSA2.

9) SMF may perform the procedure for UP relocation. For example, the SMF may update the settings of the RAN (eg, a base station).

10) Independently of the procedure described in steps 8) and 9) described above (ie, step 10) is performed before steps 8) and 9) are performed, or while steps 8) and 9) are being performed or may be performed after steps 8) and 9) are performed), the SMF may transmit the QoS rule to the UE through an independent procedure (eg, SMF-initiated PDU session modification procedure). For example, the SMF may transmit a PDU session modification command message including a QoS rule to the terminal. In order for the terminal to extract (or obtain) the IP address of the changed application server, the QoS rule may include a packet filter including the IP address of the changed application server and QoS parameters.

11) The terminal may acquire information on the changed IP address of the application server based on the message received from the SMF. In addition, the terminal may transmit information on the IP address of the changed application server to the application layer. For example, the NAS layer of the terminal may obtain information on the IP address of the changed application server based on the PDU session modification command message, and transmit information about the changed IP address of the application server to the application layer of the terminal.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 21 Shows a Second Example in which a Late Notification is Transmitted in a Procedure Related to Addition of a UL CL and an Additional PDU Session Anchor According to a Fourth Implementation Example.

Among the procedures shown in FIG. 21, a description of a procedure overlapping with FIG. 20 will be omitted, and FIG. 21 will be described with a focus on differences from FIG. 20.

Steps 0) to 5) are the same as steps 0) to 5) of FIG. 20.

6) Changing the application server may fail. That is, AF may fail to change the application server.
7) AF may transmit a late notification negative response message to the SMF.
8) The SMF may perform a procedure to cancel a part of the UP relocation procedure that has already been performed. For example, the UL CL node and the PSA 2 node established in the previous steps (step 3) and step 4)) may be released.
9) The SMF may transmit a cause directly or indirectly implying (or indicating) that the change of the application server is not successful (or that it has failed) to the terminal through the AMF. For example, the SMF may transmit a NAS message including the cause to the terminal.

For example, the NAS message transmitted by the SMF may include a PDU session modification command message or a PDU session release command message. As an example, the SMF may transmit the cause to the terminal using a PDU session modification procedure and a PDU session modification command message. The terminal may recognize the fact that the change of the application server has failed based on the cause. After the UE recognizes that the change of the application server has failed, a PDU session release procedure for an additional PDU session anchor (eg, UPF2 (PSA 1)) may be performed. For example, UPF 3 (PSA2) was scheduled to be added by SMF's decision, but if the change of the application server fails, the PDU session release procedure for releasing the corresponding PDU session (PDU session for UPF2 (PSA 1)) can be performed. For example, when the terminal receives the PDU session modification command message including the cause, the terminal and the network node (eg, SMF, UPF, etc.) may transmit a PDU session release request message to the SMF to perform the PDU session release procedure. As another example, when the terminal receives the PDU session release command message including the cause, the terminal and the network node (eg, SMF, UPF, etc.) may perform a PDU session release procedure.

The reason why the PDU session release procedure is performed is that the change of the application server fails when the SMF determines that UPF relocation is necessary. For example, in this situation, in order for the terminal to receive an appropriate service at the application level and the core level, the application server needs to be changed, and a PDU session related to the changed application server and UPF 3 needs to be established. However, since the change of the application server has failed, the terminal needs to perform application-level communication through a PDU session related to UPF 2, so that the synchronization between the application level and the core level is not well matched. For this reason, since the terminal cannot receive an appropriate service even at the core level, a PDU session release procedure for releasing the PDU session related to UPF 2 may be performed at the core level.

Alternatively, as in the example of steps 7 to 9 of FIG. 17, after the terminal recognizes that the change of the application server has failed, the PDU session release procedure for the corresponding PDU session is not performed, and procedures for preventing the release of the corresponding PDU session may be performed.

Figure 22:
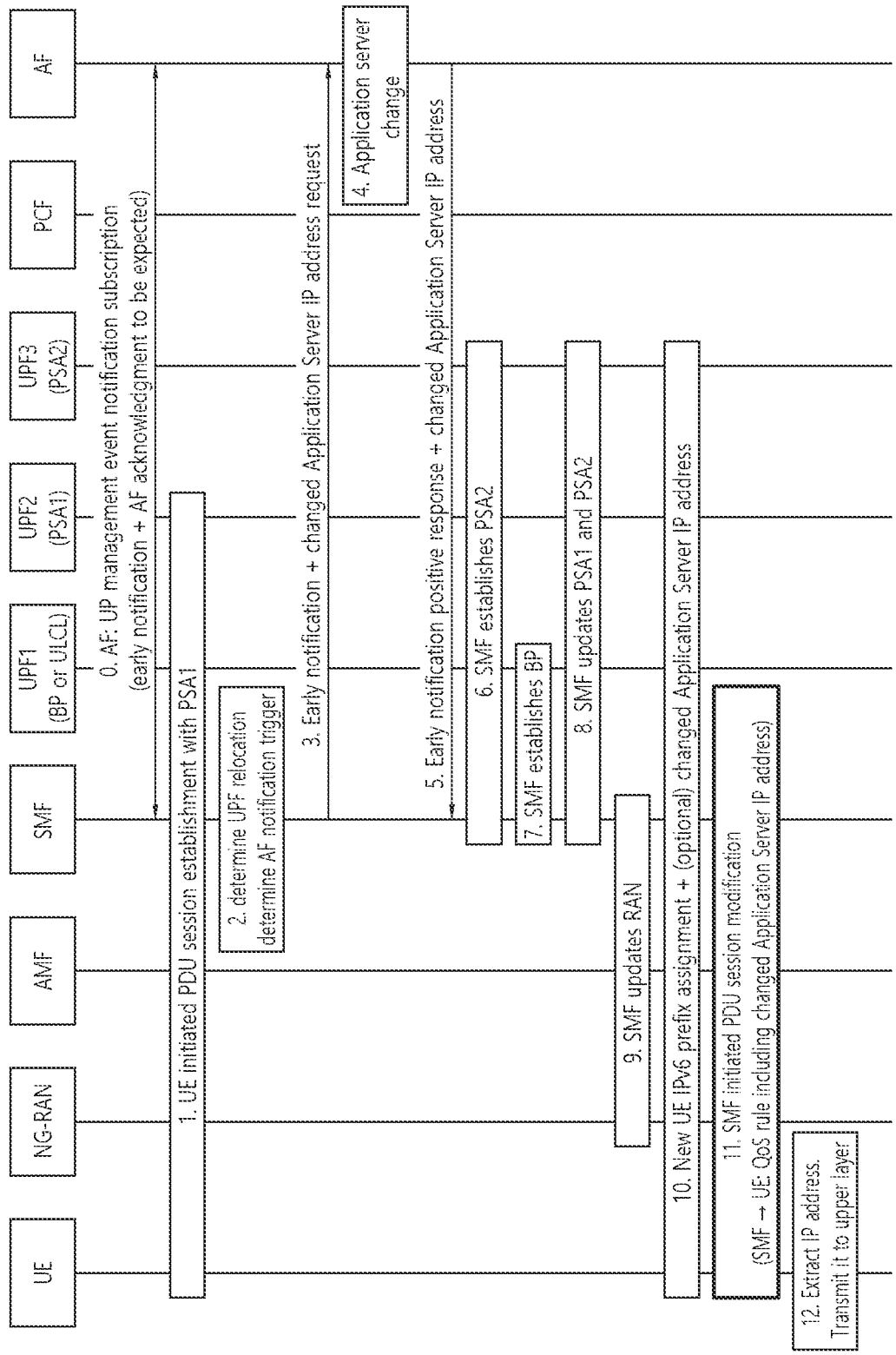
FIG. 22 illustrates a first example in which an early notification is transmitted in a procedure related to addition of a branching point and an additional PDU session anchor according to a fifth implementation example.
Figure 23:
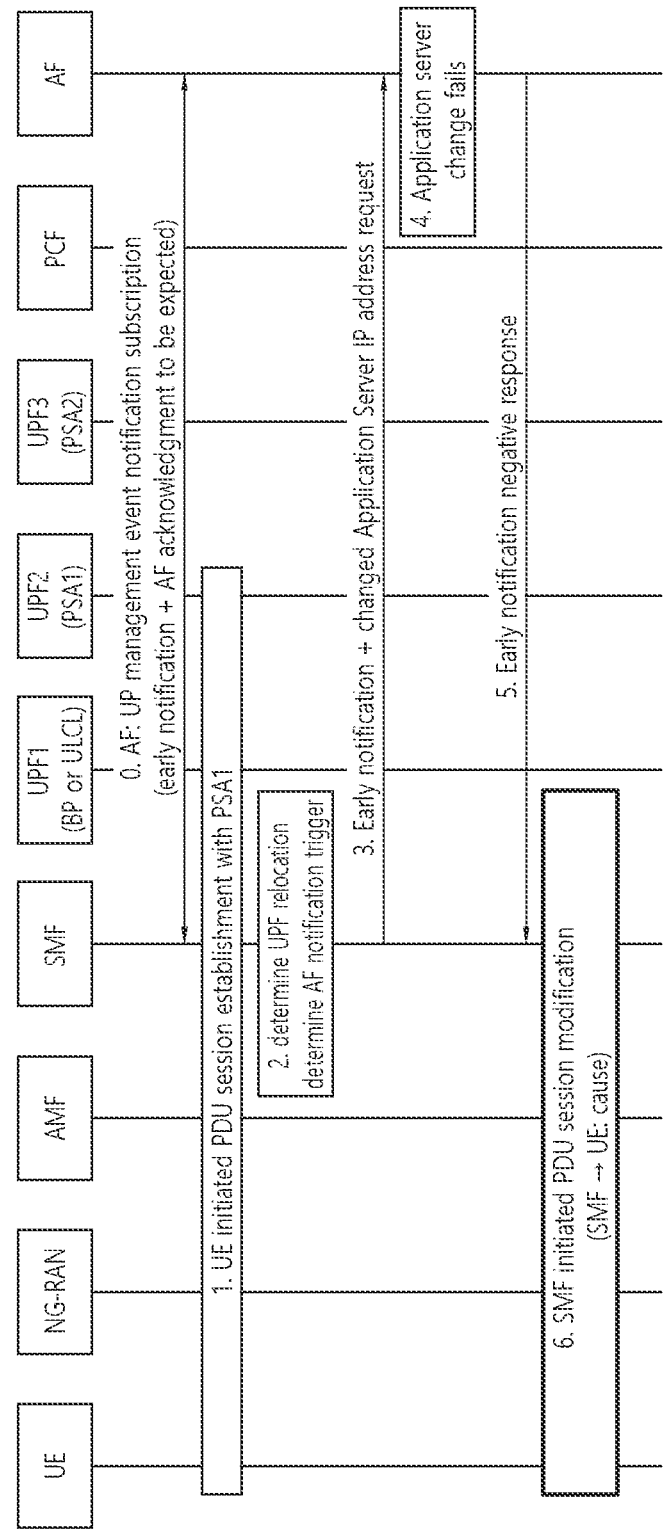
FIG. 23 shows a second example in which an early notification is transmitted in a procedure related to addition of a branching point and an additional PDU session anchor according to a fifth implementation example.

Hereinafter, a fifth implementation example described with reference to FIGS. 22 and 23 shows an example in which an early notification is transmitted in a procedure related to addition of a branching point and an additional PDU session anchor. The first example of FIG. 22 is an example when AF succeeds in changing the application server, and the second example of FIG. 23 is an example when AF fails to change the application server.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 22 Illustrates a First Example in which an Early Notification is Transmitted in a Procedure Related to Addition of a Branching Point and an Additional PDU Session Anchor According to a Fifth Implementation Example.

0) AF may be in a state of subscribing to a service for UP management event notification for SMF.

The service for notification of the UP management event to which the AF subscribes may be, for example, a notification service for a change of the UP path associated with the identified traffic. The AF may transmit a subscription request message of the notification service for the change of the UP path associated with the identified traffic to the SMF. The subscription request message transmitted by the AF may includes information on the type of subscription (A type of subscription), and may optionally include an "AF acknowledgment to be expected" indication. For reference, information on the type of subscription and the description of the "AF acknowledgment to be expected" indication may be applied in the same manner as described with reference to FIG. 14.

The AF may transmit a service subscription request message for UP management event notification to the SMF. The subscription request message transmitted in step 0) may include the type of subscription including information on subscription for early notification and an "AF acknowledgment to be expected" indication.

1) The UE may perform a UE-initiated PDU session establishment procedure for connection with PSA1. For example, the terminal may transmit a PDU session establishment request message to the SMF through the AMF.
2) The SMF may detemine to relocate the UPF. In addition, the SMF node may determine whether to transmit a notification message to the AF and whether to transmit information requesting the changed IP address of the application server, based on the capability information of the terminal, the location information of the terminal obtained from the AMF, the information of the PDU session related to the AF notification, the service to which the AF has subscribed in advance (eg, UP management event notification service) information, and policy set in advance.
3) The SMF may transmit an early notification message and information requesting information on the IP address of the changed application server when the AF changes the application server, to the AF.
4) AF can change the application server. The change of the application server can be performed successfully.
5) Based on the information requesting the IP address of the changed application server sent by the SMF in step 3), AF may transmit an early notification acknowledgment message (including information on the IP address of the changed application server) after a successful application server change.
6) SMF may perform a procedure for UP relocation (eg, UPF relocation). For example, the SMF may perform a procedure for establishing a PSA2 node with UPF3.

7) SMF may perform the procedure for UP relocation. For example, the SMF may perform a procedure for establishing a BP node with UPF1.
8) SMF may perform the procedure for UP relocation. For example, the SMF may update the configuration of PSA1 and the setting of PSA2.
9) SMF may perform the procedure for UP relocation. For example, the SMF may update the configuration of the RAN (eg, a base station).
10) The SMF may perform a procedure for additionally allocating a new IPv6 address to the UE. When SMF sends the IPv6 prefix for allocating a new IP address for the terminal, the SMF may transmit information related to the changed IP address of the application server to the terminal, by using the IPv6 router advertisement message (eg, a method such as including information indicating the IP address related to the IPv6 prefix is not the IP address of the terminal, but the IP address of the changed application server, or a method such as adding a field related to the IP address of the changed application server may be used).
11) Independently of the aforementioned steps 6) to 10) (ie, step 11) is performed before steps 6) to 10) are performed, or step 11) is performed while steps 6) to 10) are performed, or step 11) is performed after steps 6) to step 10) being performed), the SMF may transmit the QoS rule to the UE through an independent procedure (eg, SMF-initiated PDU session modification procedure). For example, the SMF may transmit a PDU session modification command message including a QoS rule to the terminal. In order for the terminal to extract (or obtain) the IP address of the changed application server, the QoS rule may include a packet filter including the IP address of the changed application server and QoS parameters.
12) The terminal may obtain information on the changed IP address of the application server based on the message received from the SMF. In addition, the terminal may transmit information on the changed IP address of the application server to the application layer. For example, the NAS layer of the terminal may obtain information on the IP address of the changed application server based on the PDU session modification command message, and the NAS layer of the terminal may transmit information about the changed IP address of the application server to the application layer of the terminal.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 23 Shows a Second Example in which an Early Notification is Transmitted in a Procedure Related to Addition of a Branching Point and an Additional PDU Session Anchor According to a Fifth Implementation Example.

Among the procedures shown in FIG. 23, descriptions of procedures overlapping those of FIG. 22 will be omitted, and FIG. 23 will be described with a focus on differences from FIG. 22.

Steps 1) to 3) are the same as steps 1) to 3) of FIG. 22.
4) Changing the application server may fail. That is, AF may fail to change the application server.
5) AF may transmit an early notification negative response message to the SMF.
6) The SMF may transmit a cause directly or indirectly implying (or indicating) that the change of the application server is not successful (or that it has failed) to the terminal through the AMF. For example, the SMF may transmit a NAS message including the cause to the terminal. For example, the NAS message transmitted by the SMF may include a PDU session modification command message or a PDU session release command message. As an example, the SMF may transmit the cause to the terminal using a PDU session modification procedure and a PDU session modification command message. The terminal may recognize the fact that the change of the application server has failed based on the cause. After the UE recognizes that the change of the application server has failed, the PDU session release procedure for the PDU session anchor (eg, UPF2 (PSA 1)) may be performed. For example, UPF 3 (PSA2) was scheduled to be added by SMF's decision, but if the change of the application server fails, the PDU session release procedure for releasing the corresponding PDU session (PDU session for UPF2 (PSA 1)) can be performed. For example, when the terminal receives the PDU session modification command message including the cause, the terminal and the network node (eg, SMF, UPF, etc.) may transmit a PDU session release request message to the SMF to perform the PDU session release procedure. As another example, when the terminal receives the PDU session release command message including the cause, the terminal and the network node (eg, SMF, UPF, etc.) may perform the corresponding PDU session release procedure. The reason why the PDU session release procedure is performed is that the change of the application server fails when the SMF determines that UPF relocation is necessary. For example, in this situation, in order for the terminal to receive an appropriate service at the application level and the core level, the application server needs to be changed, and a PDU session related to the changed application server and UPF 3 needs to be established. However, since the change of the application server has failed, the terminal needs to perform application-level communication through a PDU session related to UPF 2, so that the synchronization between the application level and the core level is not well matched. For this reason, since the terminal cannot receive an appropriate service even at the core level, a PDU session release procedure for releasing the PDU session related to UPF 2 may be performed at the core level.

Alternatively, as in the example of steps 7 to 9 of FIG. 17, after the terminal recognizes that the change of the application server has failed, the PDU session release procedure for the corresponding PDU session is not performed, and procedure for preventing the release of the corresponding PDU session may be performed.

Figure 24:
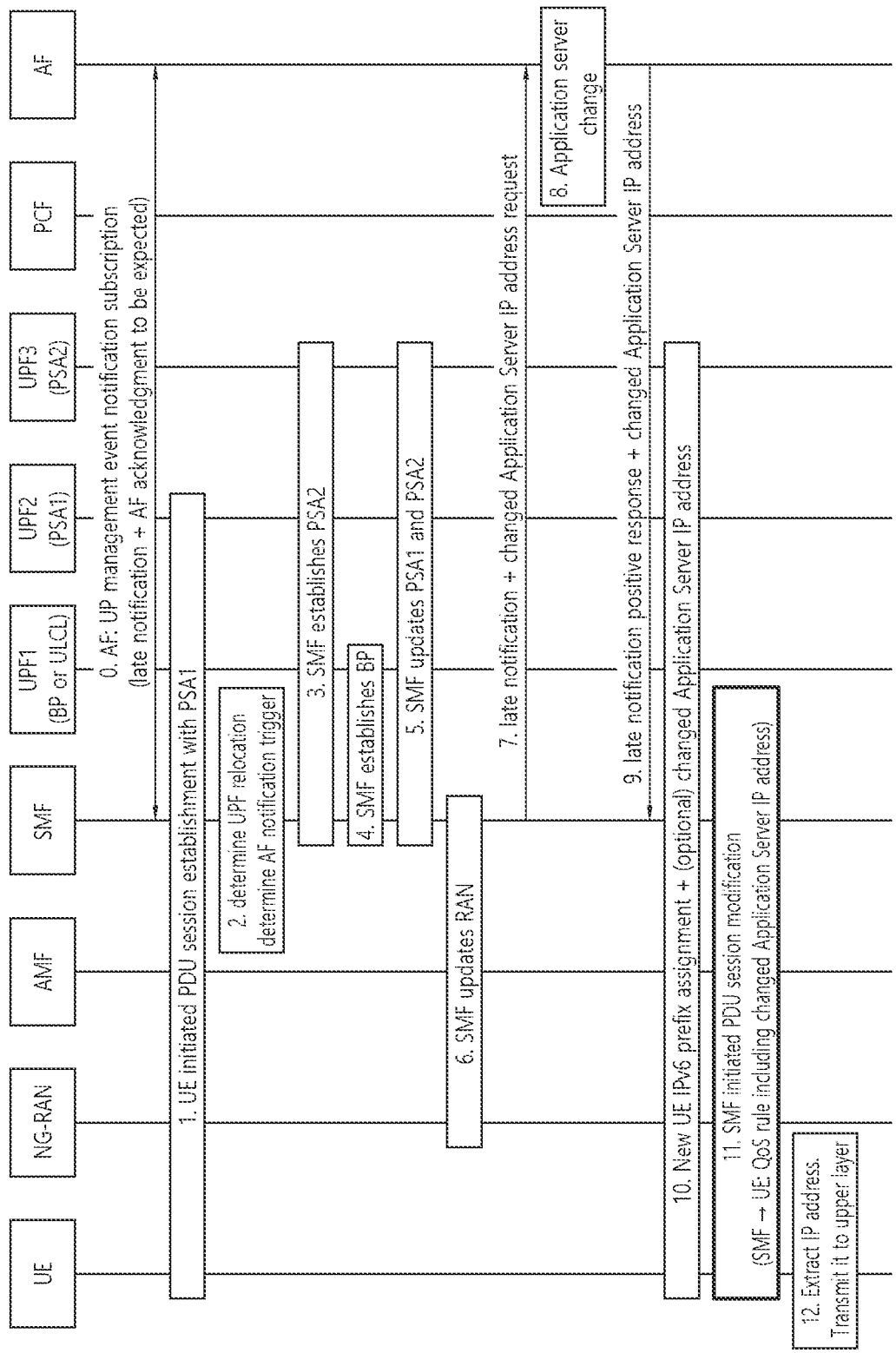
FIG. 24 shows a first example in which a late notification is transmitted in a procedure related to addition of a branching point and an additional PDU session anchor according to a sixth implementation example.
Figure 25:
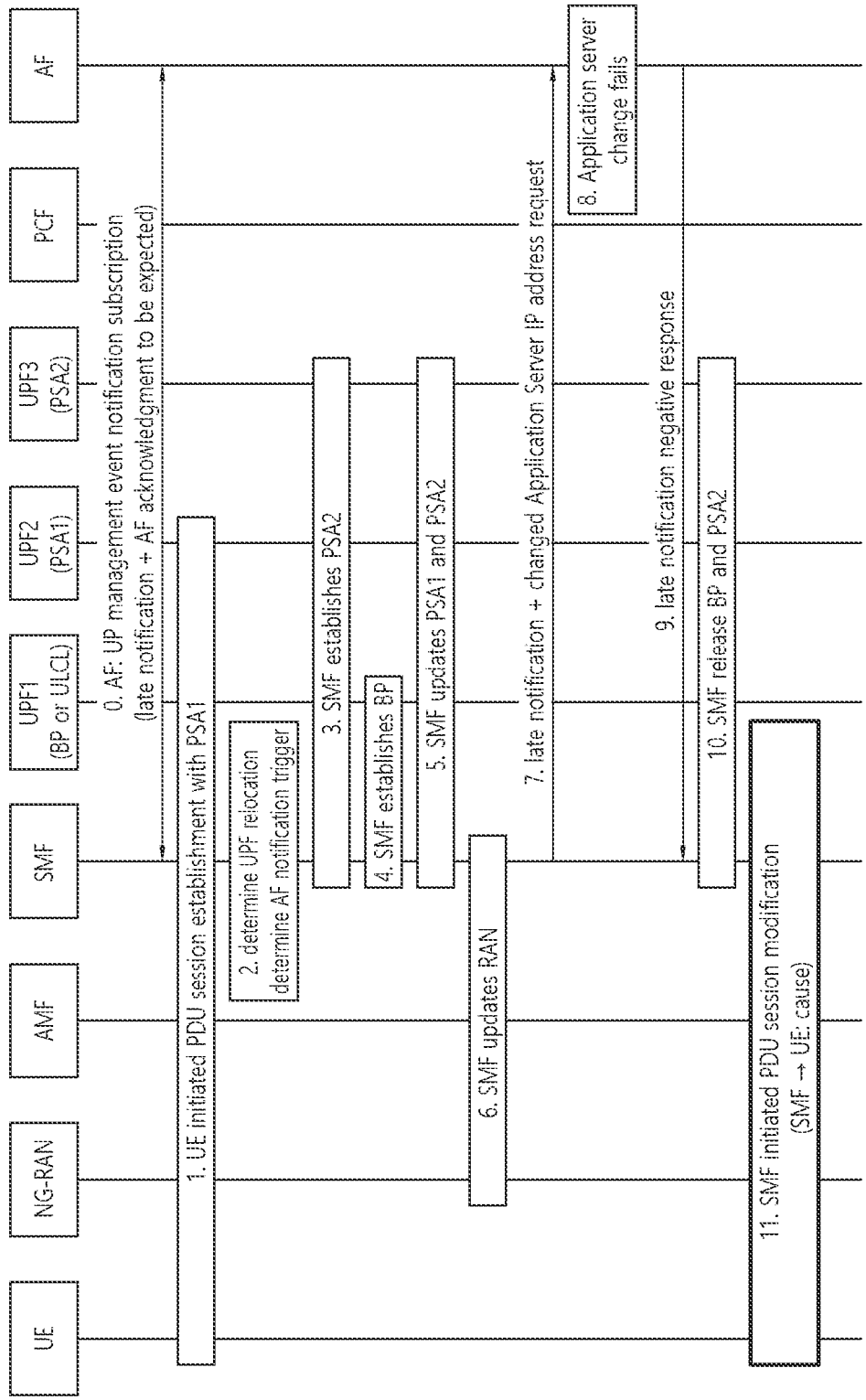
FIG. 25 shows a second example in which a late notification is transmitted in a procedure related to addition of a branching point and an additional PDU session anchor according to a sixth implementation example.

Hereinafter, a sixth implementation example described with reference to FIGS. 24 and 25 shows an example in which a late notification is transmitted in a procedure related to addition of a branching point and an additional PDU session anchor. The first example of FIG. 24 is an example when AF succeeds in changing the application server, and the second example of FIG. 25 is an example when AF fails to change the application server.

The following drawings were created to explain a specific example of the present specification. Since the names of specific devices described in the drawings or the names of specific signals/messages/fields are presented by way of example, the technical features of the present specification are not limited to the specific names used in the following drawings.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 24 Shows a First Example in which a Late Notification is Transmitted in a Procedure Related to Addition of a Branching Point and an Additional PDU Session Anchor According to a Sixth Implementation Example.

0) AF may be in a state of subscribing to a service for UP management event notification for SMF.

The service for notification of the UP management event to which the AF subscribes may be, for example, a notification service for a change of the UP path associated with the identified traffic. The AF may transmit a subscription request message of the notification service for the change of the UP path associated with the identified traffic to the SMF. The subscription request message transmitted by the AF includes information on the type of subscription (A type of subscription), and may optionally include an "AF acknowledgment to be expected" indication. For reference, information on the type of subscription and the description of the "AF acknowledgment to be expected" indication may be applied in the same manner as described with reference to FIG. 14.

The AF may transmit a service subscription request message for UP management event notification to the SMF. The subscription request message transmitted in step 0) may include the type of subscription including information on the subscription for late notification and an "AF acknowledgment to be expected" indication.

1) The UE may perform a UE-initiated PDU session establishment procedure for connection with PSA1. For example, the terminal may transmit a PDU session establishment request message to the SMF through the AMF.

2) The SMF may determine to relocate the UPF. In addition, the SMF node may determine whether to transmit a notification message to the AF and whether to transmit information requesting the changed IP address of the application server, based on the capability information of the terminal, the location information of the terminal obtained from the AMF, the information of the PDU session related to the AF notification, the service to which the AF has subscribed in advance (eg, UP management event notification service) information, and policy set in advance.

3) SMF may perform a procedure for UP relocation (eg, UPF relocation). For example, the SMF may perform a procedure for establishing a PSA2 node with UPF3.

4) SMF may perform the procedure for UP relocation. For example, the SMF may perform a procedure for establishing a BP node with UPF1.

5) SMF may perform the procedure for UP relocation. For example, the SMF may update the setting of PSA1 and the setting of PSA2.

6) SMF may perform the procedure for UP relocation. For example, the SMF may update the settings of the RAN (eg, a base station).

7) The SMF may transmit a late notification message and information requesting information on the IP address of the changed application server when the AF changes the application server, to the AF.

8) AF may perform a change of the application server. The change of the application server may be performed successfully.

9) Based on the information requesting the changed application server IP address sent in step 7), AF may transmit a late notification acknowledgment message (including information about the changed application server IP address) after successful application server change.

10) The SMF may perform a procedure for additionally allocating a new IPv6 address to the UE. When SMF sends the IPv6 prefix for allocating a new IP address for the terminal, the SMF may transmit information related to the changed IP address of the application server to the terminal, by using the IPv6 router advertisement message (eg, a method such as including information indicating the IP address related to the IPv6 prefix is not the IP address of the terminal, but the IP address of the changed application server, or a method such as adding a field related to the IP address of the changed application server may be used).

11) Independently of step 10) described above (ie, step 11) may be performed before step 10) is performed, step 11) may be performed during step 10), or step 11) may be performed after step 10) is performed), the SMF may transmit the QoS rule to the UE through an independent procedure (eg, SMF initiation PDU session modification procedure). For example, the SMF may transmit a PDU session modification command message including a QoS rule to the terminal. In order for the terminal to extract (or obtain) the IP address of the changed application server, the QoS rule may include a packet filter including the IP address of the changed application server and QoS parameters.

12) The terminal may acquire information on the changed IP address of the application server based on the message received from the SMF. In addition, the terminal may transmit information on the changed IP address of the application server to the application layer. For example, the NAS layer of the terminal may obtain information on the changed IP address of the application server based on the PDU session modification command message, and transmit information about the IP address of the changed application server to the application layer of the terminal.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 25 Shows a Second Example in which a Late Notification is Transmitted in a Procedure Related to Addition of a Branching Point and an Additional PDU Session Anchor According to a Sixth Implementation Example.

Among the procedures shown in FIG. 25, a description of a procedure overlapping with FIG. 24 will be omitted, and FIG. 25 will be described with a focus on differences from FIG. 24.

Steps 1) to 7) are the same as steps 1) to 7) of FIG. 24.

8) Changing the application server may fail. That is, AF may fail to change the application server.

9) The AF may transmit a late notification negative response message to the SMF.

10) The SMF may perform a procedure to cancel a part of the UP relocation procedure that has already been performed. For example, the BP node and the PSA 2 node established in the previous steps (step 3) and step 4)) may be released.

11) The SMF may transmit a cause directly or indirectly implying (or indicating) that the change of the application server is not successful (or that it has failed) to the terminal through the AMF. For example, the SMF may transmit a NAS message including the cause to the terminal. For example, the NAS message transmitted by the SMF may include a PDU session modification command message or a PDU session release command message. As an example, the SMF may transmit the cause to the terminal using a PDU session modification procedure and a PDU session modification command message. The terminal may recognize the fact that the change of the application server has failed based on the cause. After the UE recognizes that the change of the application server has failed, the PDU session release procedure for the PDU session anchor (eg, UPF2 (PSA 1)) may be performed. For example, UPF 3 (PSA2) was scheduled to be added by SMF's decision, but if the change of the application server fails, the PDU session release procedure for releasing the corresponding PDU session (PDU session for UPF2 (PSA 1)) can be performed. For example, when the terminal receives the PDU session modification command message including the cause, the terminal and the network node (eg, SMF, UPF, etc.) may transmit a PDU session release request message to the SMF to perform the PDU session release procedure. As another example, when the terminal receives the PDU session release command message including the cause, the terminal and the network node (eg, SMF, UPF, etc.) may perform the corresponding PDU session release procedure. The reason why the PDU session release procedure is performed is that the change of the application server fails when the SMF determines that UPF relocation is necessary. For example, in this situation, in order for the terminal to receive an appropriate service at the application level and the core level, the application server needs to be changed, and a PDU session related to the changed application server and UPF 3 needs to be established. However, since the change of the application server has failed, the terminal needs to perform application-level communication through a PDU session related to UPF 2, so that the synchronization between the application level and the core level is not well matched. For this reason, since the terminal cannot receive an appropriate service even at the core level, a PDU session release procedure for releasing the PDU session related to UPF 2 may be performed at the core level.

Alternatively, as in the example of steps 7 to 9 of FIG. 17, after the terminal recognizes that the change of the application server has failed, the PDU session release procedure for the corresponding PDU session is not performed, and a procedure for preventing the release of the corresponding PDU session may be performed.

As described in the disclosure of the present specification, a communication method related to a change of an application server can be clearly defined. For example, according to the disclosure of the present specification, the terminal may recognize a change in the application server and recognize information on the changed application server. As another example, the network may notify the terminal of the change of the application server and inform the information on the changed application server. As another example, the application layer of the terminal may recognize and process the change of the application server. As another example, since the IP address of the changed application server may be transmitted to the terminal along with the optimized route setting (eg, change of the UP route) of the network (eg, synchronization between the timing of recognizing the change of the application server and the setting timing of the optimized route setting of the is possible), the user experience may be enhanced by introducing services based on edge computing. As another example, since the 5G core network and the terminal can quickly recognize and utilize the change of the application server and the changed server IP address, packet loss can be reduced and service interruption can be reduced. Accordingly, it is possible to increase the quality of experience (QoE) and service quality of the MEC service.

For reference, the operation of the terminal (eg, UE) described in this specification may be implemented by the apparatus of FIGS. 26 to 30 to be described below. For example, the terminal (eg, UE) may be the first wireless device 100 or the second wireless device 200 of FIG. 27. For example, an operation of a terminal (eg, UE) described herein may be processed by one or more processors 102 or 202. Operations of a terminal (eg, UE) described herein may be stored in one or more memories 104 or 204 in the form of instructions/programs (eg instruction, executable code) executable by one or more processors 102 or 202. The one or more processors 102 or 202 may control one or more memories 104 or 204 and one or more transceivers 106 or 206, and may execute instructions/programs stored in the one or more memories 104 or 204 to be used in the present specification. The operation of the UE described in the disclosure may be performed.

In addition, instructions for performing an operation of a terminal (eg, UE) described in the disclosure of the present specification may be stored in a non-volatile computer-readable storage medium. The storage medium may be included in one or more memories 104 or 204. And, the instructions recorded in the storage medium may be executed by one or more processors 102 or 202 to perform the operation of the terminal (eg, UE) described in the disclosure of the present specification.

For reference, the operation of the network node (eg, SMF node, AF node, AMF node, UPF node, etc.) described in this specification may be implemented by the apparatus of FIGS. 26 to 30 to be described below. For example, the network node (eg, SMF node, AF node, AMF node, UPF node, etc.) may be the first wireless device 100 or the second wireless device 200 of FIG. 27. For example, operations of the network nodes (eg, SMF nodes, AF nodes, AMF nodes, UPF nodes, etc.) described herein may be processed by one or more processors 102 or 202. The operation of the network node (eg, SMF node, AF node, AMF node, UPF node, etc.) described in this specification may be stored in one or more memories 104 or 204 in the form of an instruction/program (eg instruction, executable code) executable by one or more processors 102 or 202. The one or more processors 102 or 202 may perform the operation of the network node (eg, SMF node, AF node, AMF node, UPF node, etc.) described in the disclosure of the present specificaiton, by controlling one or more memories 104 or 204 and one or more transceivers 106 or 206, and executing instructions/programs stored in the one or more memories 104 or 204.

V. Examples to which the Disclosure of this Specification is to be Applied

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 26:
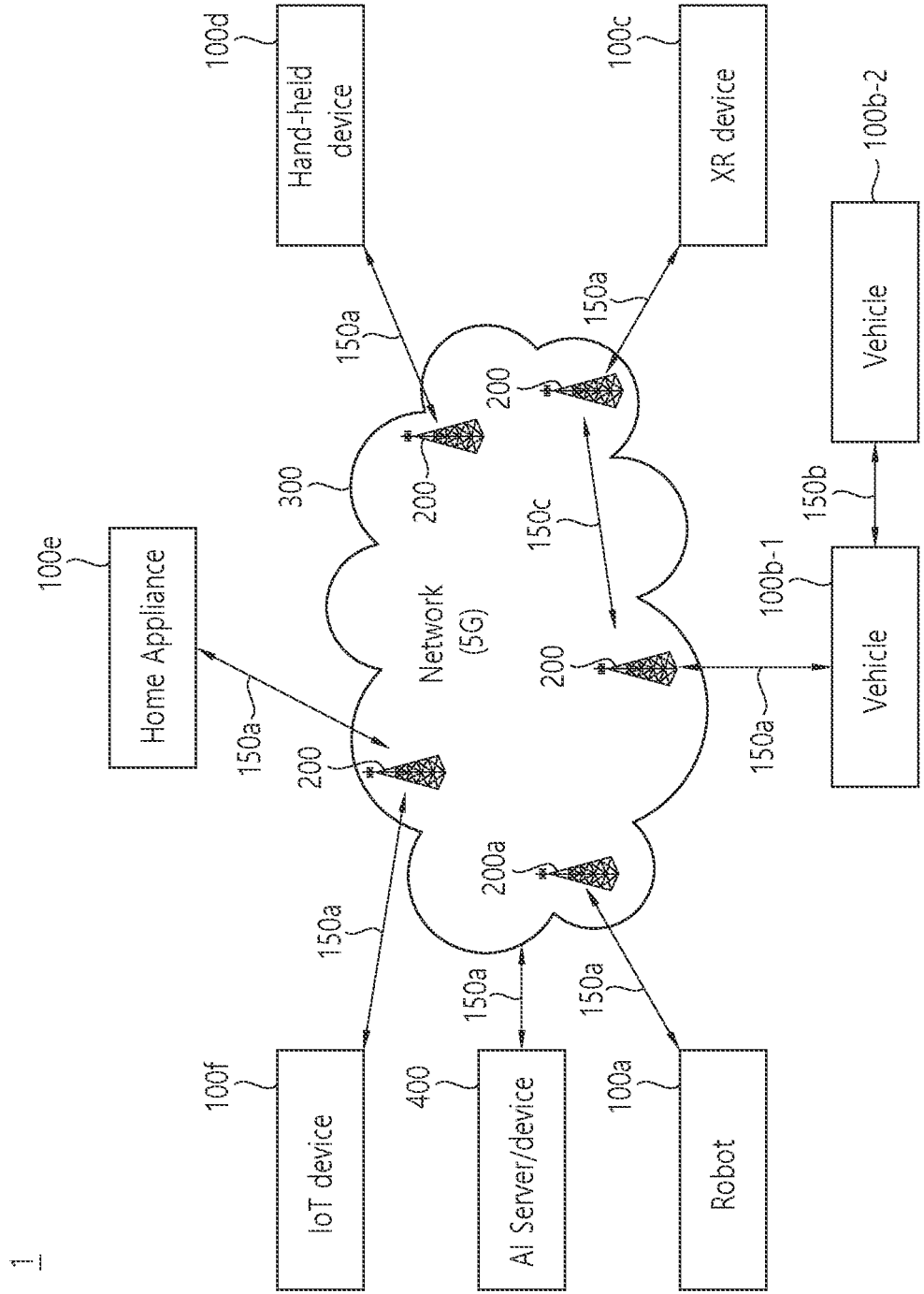
FIG. 26 illustrates a communication system 1 that can be applied to the present specification.

FIG. 26 illustrates a communication system 1 that can be applied to the present specification.

Referring to FIG. 26, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like. Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like. The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300. The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/ base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like. The wireless device and the base station/ wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

Figure 27:
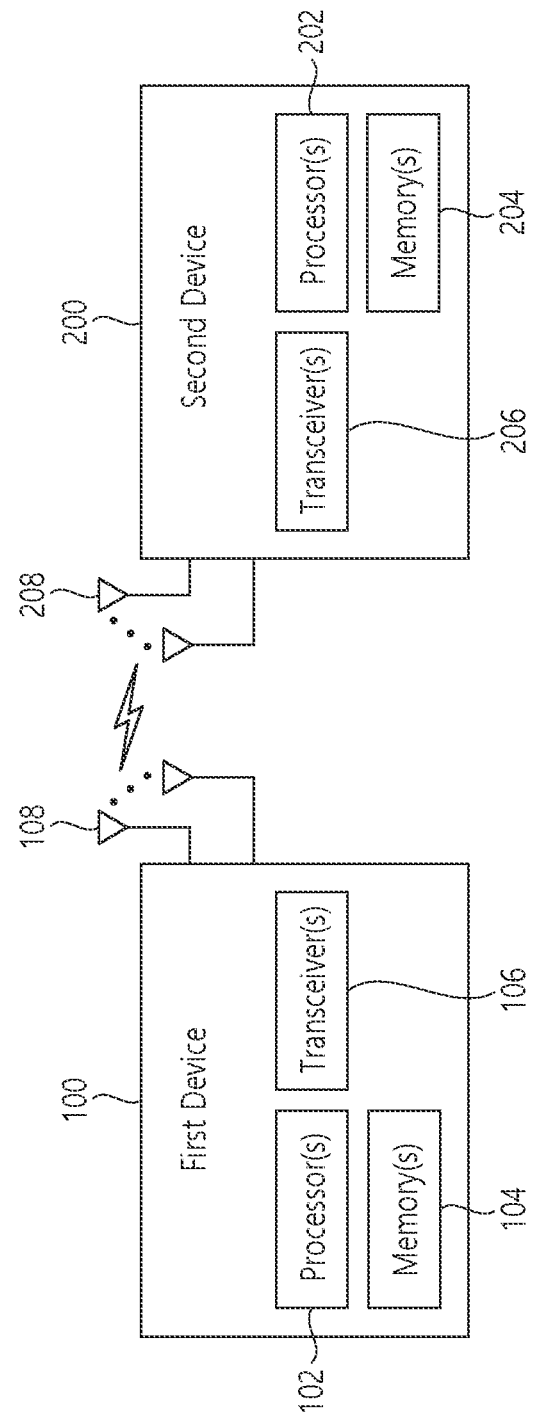
FIG. 27 illustrates an example of a wireless device that can be applied to the present specification.

FIG. 27 illustrates an example of a wireless device that can be applied to the present specification.

Referring to FIG. 27, the first wireless device 100 and the second wireless device 200 may transmit and receive wireless signals through various wireless access technologies (e.g., LTE and NR). Here, the {first wireless device 100 and the second wireless device 200} may refer to the {wireless device 100x, the base station 200} and/or the {wireless device 100x, the wireless device 100x of FIG. 26}. Alternatively, the first wireless device 100 may correspond to the UE, AMF, SMF, or UPF described in the disclosure of the present specification. In addition, the second wireless device 200 may correspond to a UE, AMF, SMF, or UPF that communicates with the first wireless device 100. The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein. For example, the processor 102 may process the information in the memory 104 to generate a first information/signal, and then transmit the wireless signal including the first information/ signal through the transceiver 106. In addition, the processor 102 may receive the radio signal including a second information/signal through the transceiver 106 and store the information obtained from the signal processing of the second information/signal in the memory 104. The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein. Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204. The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein. Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described being mixed with an RF unit. In the present specification, a wireless device may mean a communication modem/circuit/chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto. For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs) and/or one or more Service Data Units (SDUs) based on the descriptions, functions, procedures, suggestions, methods and/or operational flowcharts disclosed herein. One or more processors 102, 202 may generate messages, control information, data or information in accordance with the descriptions, functions, procedures, suggestions, methods and/or operational flowcharts disclosed herein. One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206. One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals. For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208. In the present disclosure, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

Figure 28:
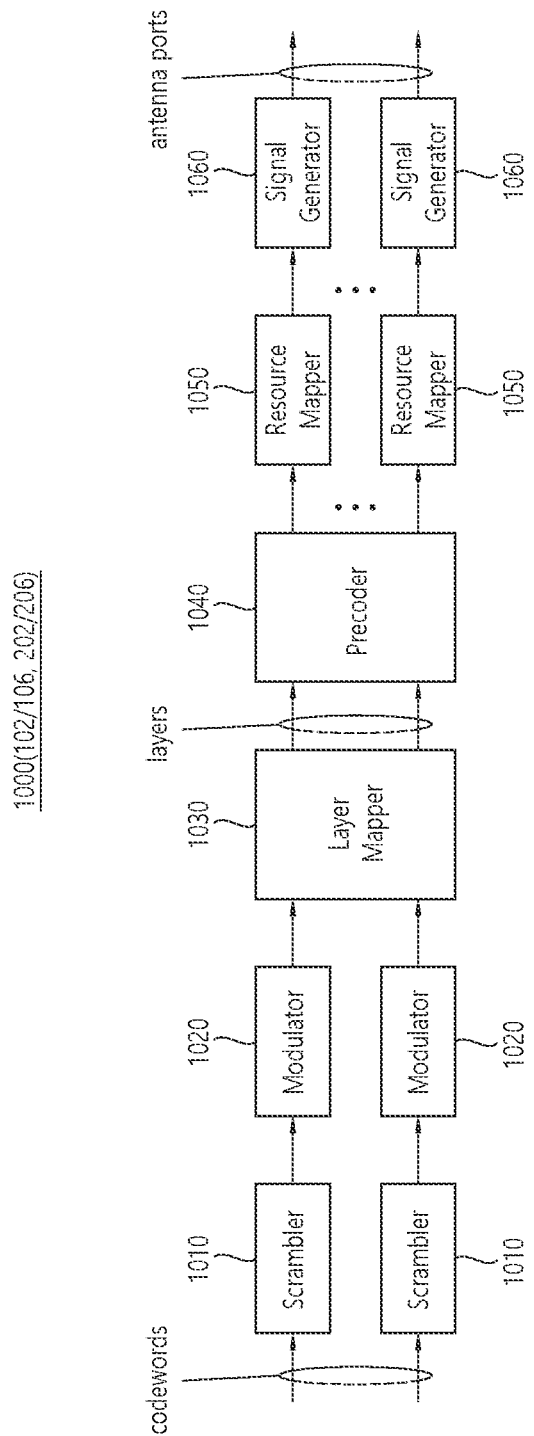
FIG. 28 illustrates an example of a signal processing circuit for a transmission signal that can be applied to the present specification.

FIG. 28 illustrates an example of a signal processing circuit for a transmission signal.

Referring to FIG. 28, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 28 may be performed in the processor (102, 202), the memory (104, 204) and/or transceiver (106, 206) of FIG. 27. The hardware element of FIG. 28 may be implemented in the processors 102 and 202 and/or the transceivers 106 and 206 of FIG. 27. For example, blocks 1010-1060 may be implemented in the processors 102, 202 of FIG. 27. Also, blocks 1010-1050 may be implemented in the processors 102 and 202 of FIG. 27, and block 1060 may be implemented in the transceivers 106 and 206 of FIG. 27.

The codeword may be converted into a wireless signal through the signal processing circuit 1000 of FIG. 28. Here, the codeword is an encoded bit sequence of the information block. The information block may include a transport block (e.g., a UL-SCH transport block and a DL-SCH transport block). The wireless signal may be transmitted through various physical channels (e.g., PUSCH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like. The complex modulation symbol sequence may be mapped to one or more transport layers by the layer mapper 1030. The modulation symbols of each transport layer may be mapped (precoding) to the corresponding antenna port (s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010~1060 of FIG. 28. For example, a wireless device (e.g., 100 and 200 of FIG. 27) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a postcoder, a demodulator, a de-scrambler and a decoder.

Figure 29:
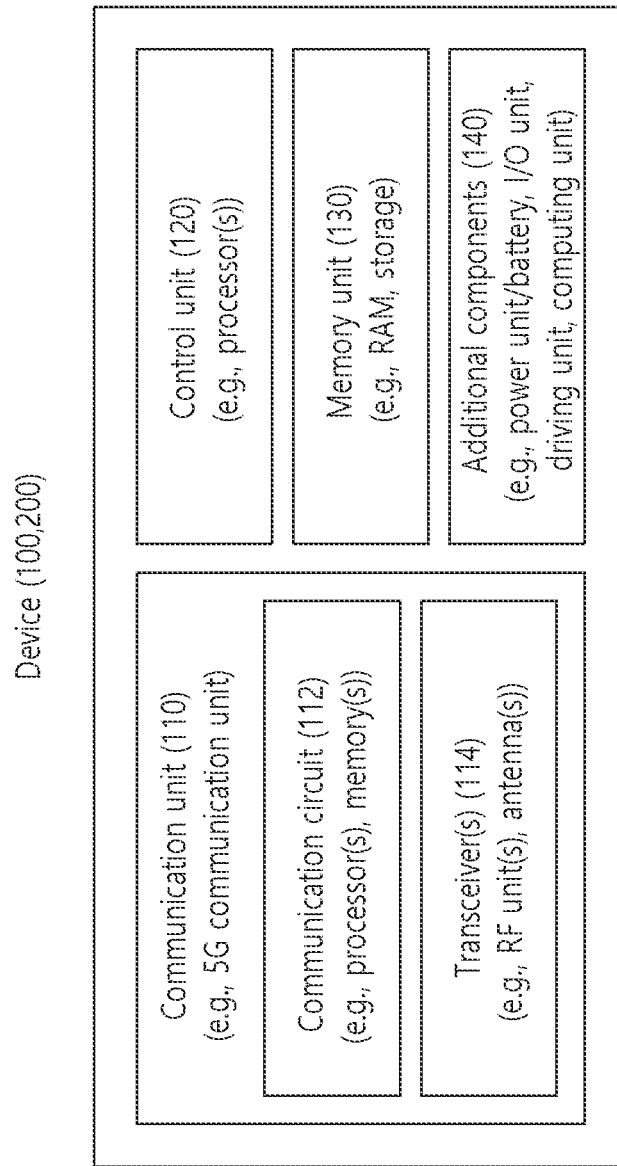
FIG. 29 illustrates another example of a wireless device that can be applied to the present specification.

FIG. 29 illustrates another example of a wireless device that can be applied to the present specification.

The wireless device may be implemented in various forms according to use-examples/services (refer to FIG. 26).

Referring to FIG. 29, the wireless devices 100 and 200 correspond to the wireless devices 100 and 200 of FIG. 27, and the wireless devices 100 and 200 may be configured with various elements, components, units, and/or modules. For example, the wireless device 100, 200 may include a communication unit 110, a control unit 120, a memory unit 130, and additional components 140. The communication unit may include communication circuit 112 and transceiver (s) 114. For example, the communication circuit 112 may include one or more processors 102, 202 and/or one or more memories 104, 204 of FIG. 27. For example, the transceiver (s) 114 may include one or more transceivers 106, 206 and/or one or more antennas 108, 208 of FIG. 27. The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130. In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 27. For example, the memory unit 130 may include one or more memories 104 and 204 of FIG. 27.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 26, 100a), a vehicle (FIG. 26, 100b-1, 100b-2), an XR device (FIG. 26, 100c), a portable device (FIG. 26, 100d), a home appliance. (FIG. 26, 100e), IoT devices (FIG. 26, 100f), terminals for digital broadcasting, hologram devices, public safety devices, MTC devices, medical devices, fintech devices (or financial devices), security devices, climate/environment devices, an AI server/device (FIGS. 12 and 400), a base station (FIGS. 12 and 200), a network node, and the like. The wireless device may be used in a mobile or fixed location depending on the usage-example/service.

In FIG. 29, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Figure 30:
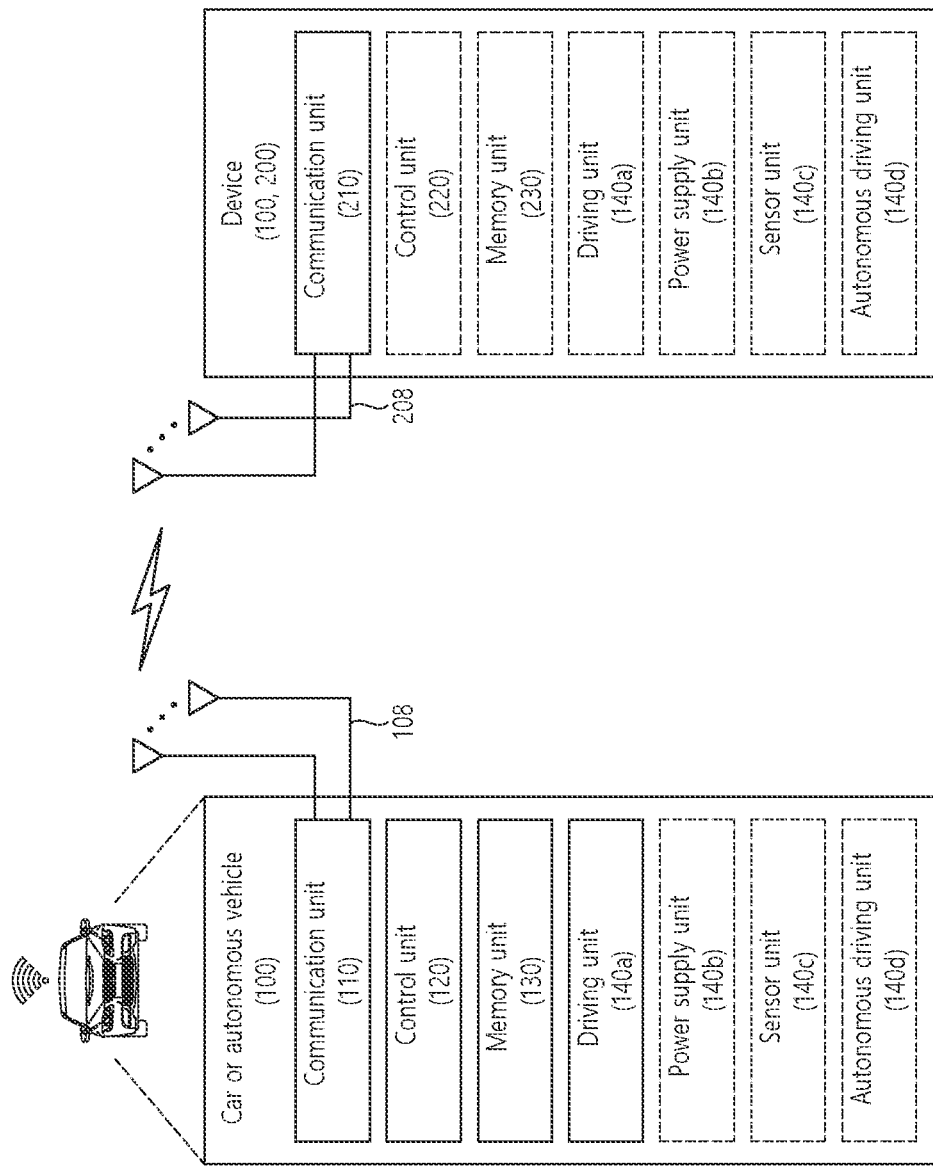
FIG. 30 illustrates an example of a vehicle or an autonomous vehicle that can be applied to the present specification.

FIG. 30 illustrates an example of a vehicle or an autonomous vehicle that can be applied to the present specification.

FIG. 30 illustrates a vehicle or autonomous vehicle applied to the disclosure of this specification. The vehicle or autonomous driving vehicle may be implemented as a mobile robot, a vehicle, a train, an aerial vehicle (AV), a ship, and the like.

Referring to FIG. 30, the vehicle or the autonomous vehicle 100 may include an antenna unit 108, a communication unit 110, a control unit 120, a driving unit 140a, a power supply unit 140b, a sensor unit 140c, and autonomous driving unit 140d. The antenna unit 108 may be configured as part of the communication unit 110. The blocks 110/130/140a to 140d may correspond to blocks 110/130/140 of FIG. 29, respectively.

The communication unit 110 may transmit or receive signals (e.g., data, control signals, etc.) with external devices, such as base stations (e.g. base stations, road side units, etc.), servers, and the like. The control unit 120 may control various elements of the vehicle or the autonomous vehicle 100 to perform various operations. The control unit 120 may include an ECU (Electronic Control Unit). The driving unit 140a may cause the vehicle or the autonomous vehicle 100 to drive on the ground. The driving unit 140a may include an engine, a motor, a power train, wheels, a brake, a steering device, and the like. The power supply unit 140b supplies power to the vehicle or the autonomous vehicle 100, and may include a wired/wireless charging circuit, a battery, and the like. The sensor unit 140c may obtain vehicle status, surrounding environment information, user information, and the like. The sensor unit 140c includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140d may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140d may generate an autonomous driving route and a driving plan based on the obtained data. The control unit 120 may control the driving unit 140a to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles. In addition, during autonomous driving, the sensor unit 140c may acquire vehicle state and surrounding environment information. The autonomous driving unit 140d may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

Figure 31:
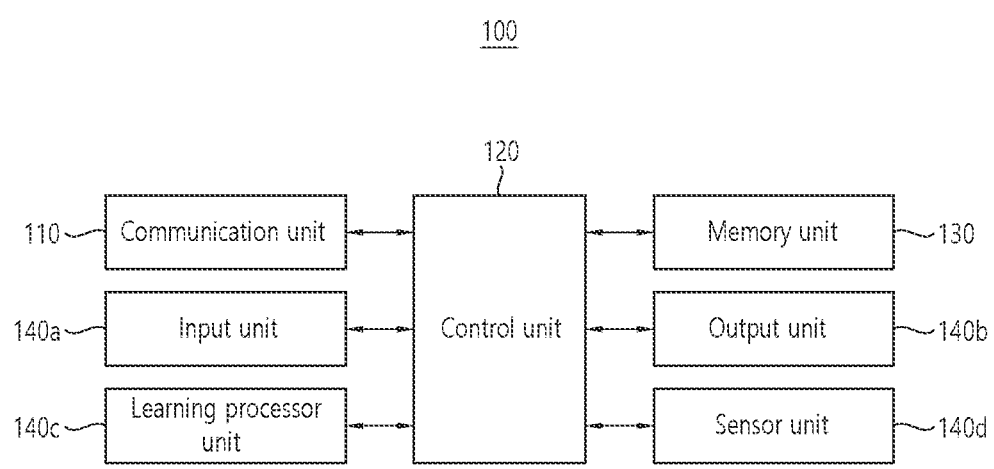
FIG. 31 illustrates an example of an AI device that can be applied to the disclosure of the present specification.

FIG. 31 Illustrates an Example of an AI Device that can be Applied to the Disclosure of the Present Specification.

FIG. 31 illustrates an example of an AI device applied to the disclosure of the present specification. An AI device may be implemented as a fixed device or a mobile device, such as TVs, projectors, smartphones, PCs, laptops, digital broadcasting terminals, tablet PCs, wearable devices, set-top boxes (STBs), radios, washing machines, refrigerators, digital signage, robots, vehicles, and the like.

Referring to FIG. 31, the AI device 100 includes a communication unit 110, a control unit 120, a memory unit 130, an input/output unit 140a/140b, a learning processor unit 140c, and a sensor unit 140d. Blocks 110 to 130/140a to 140d respectively correspond to blocks 110 to 130/140 of FIG. 29.

The communication unit 110 communicates may transmit or receive wired signals and wireless signals (e.g., sensor information, user input, learning model, control signal, etc.) with external devices such as another AI device (e.g., FIG. 1, 100x, 200, 400) or an AI server (e.g., 400 of FIG. 26) by using a wired or wireless communication technology. To this end, the communication unit 110 may transmit information in the memory unit 130 to an external device, or may transmit a signal received from the external device to the memory unit 130.

The control unit 120 may determine at least one executable operation of the AI device 100 based on the information determined or generated using the data analysis algorithm or the machine learning algorithm. In addition, the control unit 120 may control the components of the AI device 100 to perform the determined operation. For example, the control unit 120 may request, search, receive, or utilize data of the running processor 140c or the memory 130. The control unit 120 may control the components of the AI device 100 to execute a predicted or desirable operation among at least one executable operation. In addition, the control unit 120 collects history information including the operation contents of the AI device 100 or the user's feedback on the operation, and stores the information in the memory unit 130 or the running processor unit 140c or transmits the information to an external device such as an AI server(FIG. 26, 400). The collected historical information can be used to update the learning model.

The memory unit 130 may store data supporting various functions of the AI device 100. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary for operation/execution of the control unit 120.

The input unit 140a may obtain various types of data from the outside of the AI device 100. For example, the input unit 140a may acquire training data for model learning, input data to which the training model is applied, and the like. The input unit 140a may include a camera, a microphone, and/or a user input unit. The output unit 140b may generate an output related to sight, hearing, or touch. The output unit 140b may include a display unit, a speaker, and/or a haptic module. The sensing unit 140 may obtain at least one of internal information of the AI device 100, environment information of the AI device 100, and user information using various sensors. The sensing unit 140 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar, and the like.

The learning processor unit 140c may train a model composed of artificial neural networks using the training data. The learning processor unit 140c may perform AI processing together with the learning processor unit of the AI server (FIGS. 12 and 400). The learning processor unit 140c may process information received from an external device through the communication unit 110 and/or information stored in the memory unit 130. In addition, the output value of the learning processor unit 140c may be transmitted to the external device through the communication unit 110 and/or stored in the memory unit 130.

As described above, although the embodiments have been described as examples, since the content and scope of this specification will not be limited only to a particular embodiment of this specification, this specification may be amended, modified, or enhanced to other various forms.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
receiving, by a first network entity related to a session management, a Non Access Stratum (NAS) message including capability information that a User Equipment (UE) is able to process information related to a changed application server, from the UE;
determining relocation of a User Plane Function (UPF) for a Protocol Data Unit (PDU) (Protocol Data Unit) session of the UE;
transmitting, by the first network entity related to the session management, a notification message related to the relocation of the UPF, to a second network entity related to application,
wherein the second network entity manages one or more application servers, and
wherein, based on that the capability information is received, the notification message includes information for requesting an IP address of the changed application server when the application server is changed;
receiving, by the first network entity, a response message from the second network entity,
wherein the response message includes information related to the IP address of the changed application server when the second network entity succeeded in changing the application server; and
transmitting, by the first network entity, a message including information related to the IP address of the changed application server, to the UE through a third network entity related to mobility management.

2. The method of claim 1,
wherein the notification message is an early notification message transmitted before the first network entity initiates a procedure related to the relocation of the UPF or a late notification message transmitted after the first network entity initiates the procedure related to the relocation of the UPF.

3. The method of claim 1,
wherein the message including information related to the IP address of the changed application server includes information related to a Quality of Service (QOS) rule including QoS parameters and a packet filter including the IP address of the changed application server.

4. The method of claim 1,
based on the response message being a positive response message, a message including the information related to the IP address of the changed application server is transmitted.

5. The method of claim 1,
based on the response message being a negative response message, the information related to the IP address of the changed application server is not included in the response message, and the message including information related to the IP address of the changed application server is not transmitted.

6. The method of claim 5,
based on that the response message is a negative response message, the method further comprising transmitting, to the UE through the third network entity, a message including a cause value associated with the failure of the change of the application server.

7. The method of claim 1, further comprising:
transmitting, by the first network entity, a subscription message requesting to subscribe to an event related to the change of the application server, to the second network entity,
wherein, based on the subscription message being transmitted to the second network entity, the information related to the IP address of the changed application server is received.

8. The method of claim 1, further comprising:
when the UE cannot process the information related to the change of the application server based on the capability information, transmitting, by the first network entity, information indicating that the UE cannot process the information related to the change of the application server, to the second network entity.

9. A method comprising:
transmitting, by a User Equipment (UE), a Non Access Stratum (NAS) message including capability information that the UE is able to process information related to a changed application server, to a first network entity related to a session management;
when a second network entity related to application succeeded in changing the application server, receiving, by a Non-Access Stratum (NAS) layer of the UE, a message including information related to an IP address of the changed application server from the first network entity through a third network entity related to mobility management, wherein the second network entity manages one or more application servers, and wherein the capability information is used by the first network entity, to request the IP address of the changed application server and transmit the IP address of the changed application server to the third network entity;

obtaining, by the NAS layer of the UE, information related to the IP address of the changed application server based on the message; and transmitting, by the NAS layer of the UE, information related to the changed IP address of the application server to an application layer of the UE.

10. The method of claim 9, wherein the message including information related to the IP address of the changed application server is a Protocol Data Unit (PDU) session modification command message, wherein the PDU session modification command message includes information related to relocating a UPF of a PDU session used by the UE from a first UPF to a second UPF, and wherein, based on the PDU session modification command message being received, the method further comprises transmitting, to the third network entity, a PDU session establishment request message associated with the second UPF.

11. The method of claim 9, further comprising:

receiving a PDU session modification command message from the third network entity before the message including information related to the IP address of the changed application server is received, wherein the PDU session modification command message includes information related to relocating a UPF of a PDU session used by the UE from a first UPF to a second UPF, and wherein, based on the PDU session modification command message being received, the method further comprises transmitting, to the third network entity, a PDU session establishment request message associated with the second UPF.

12. The method of claim 11, wherein the PDU session modification command message includes information that the application server is likely to change.

13. The method of claim 9, wherein the message including information related to the changed IP address of the application server is a NAS response message, and wherein, based on the NAS response message being received, the method further comprises transmitting, to the third network entity, a PDU session release request message associated with a first UPF.

14. The method of claim 9, wherein the message including information related to the IP address of the changed application server includes information related to Quality of Service (QOS), and wherein the information related to QoS includes information related to the IP address of the changed application server.

15. A User Equipment (UE) configured to perform communication related to a change of an application server, the UE comprising:

at least one processor; and at least one memory for storing instructions and operably electrically connectable with the at least one processor;

wherein the operations performed based on the execution of the instructions by the at least one processor include:

transmitting, by the UE, a Non Access Stratum (NAS) message including capability information that the UE is able to process information related to a changed application server, to a first network entity related to a session management;

when a second network entity related to application succeeded in changing the application server, receiving, by a Non-Access Stratum (NAS) layer of the UE, a message including information related to an IP address of the changed application server from the first network entity through a third network entity related to mobility management, wherein the second network entity manages one or more application servers, and wherein the capability information is used by the first network entity to request the IP address of the changed application server and transmit the IP address of the changed application server to the UE through the third network entity;

obtaining, by the NAS layer of the UE, information related to the IP address of the changed application server based on the message; and transmitting, by the NAS layer of the UE, information related to the IP address of the changed application server to an application layer of the UE.

\* \* \* \* \*